（12） United States Patent
Chen et al.

(10) Patent No.: US 8,934,741 B2
(45) Date of Patent: Jan. 13, 2015

(54) INTEGRATED CIRCUIT WITH OPTICAL DATA COMMUNICATION

(75) Inventors: Baoquan Chen, Bothell, WA (US); Hui Chen, Kirkland, WA (US); Raluca Dinu, Redmond, WA (US); Diyun Huang, Watertown, MA (US); Bing Li, Bothell, WA (US); Eric Miller, Seattle, WA (US); Danliang Jin, Bothell, WA (US); Christopher A. Wiklof, Everett, WA (US); Guomin Yu, Bothell, WA (US)

(73) Assignee: Brphotonics Produtos Optoelectronicos LTDA, Sao Paulo (BR)

( * ) Notice: Subject to any disclaimer, the term of this patent is extended or adjusted under 35 U.S.C. 154(b) by 700 days.

(21) Appl. No.: 12/963,479

(22) Filed: Dec. 8, 2010

(65) Prior Publication Data

US 2012/0163749 A1    Jun. 28, 2012

Related U.S. Application Data

(63) Continuation-in-part of application No. 12/246,957, filed on Oct. 7, 2008, now Pat. No. 8,483,524, and a continuation-in-part of application No. 12/959,898, filed on Dec. 3, 2010, now Pat. No. 8,618,241, which (Continued)

(51) Int. Cl.
*G02B 6/12* (2006.01)
*G02B 6/00* (2006.01)
(Continued)

(52) U.S. Cl.
CPC .......... *G02B 6/1221* (2013.01); *G02B 6/12004* (2013.01)

USPC ................................. 385/14; 385/3; 385/143

(58) Field of Classification Search
USPC ............ 385/1–3, 14, 141–145; 359/237, 238, 359/245, 279; 257/E21.002; 524/299; 398/195; 327/100
See application file for complete search history.

(56) References Cited

U.S. PATENT DOCUMENTS 5,887,116 A    3/1999 Grote
6,716,995 B2    4/2004 Huang et al.

(Continued)

FOREIGN PATENT DOCUMENTS

JP    06-182934    7/1994
JP    2000-256320    9/2000

(Continued)

OTHER PUBLICATIONS

Dalton et al., "Polymeric Electro-optic Modulators: From Chromophore Design to Integration with Semiconductor Very Large Scale Integration Electronics and Silica Fiber Optics" Ind. Eng. Chem. Res., vol. 38 No. 1, 1999.*

(Continued)

*Primary Examiner* — Akm Enayet Ullah
*Assistant Examiner* — Michael Mooney
(74) *Attorney, Agent, or Firm* — Christopher A. Wiklof; Launchpad IP, Inc.

(57) ABSTRACT

An integrated circuit is configured for optical communication via an optical polymer stack located on top of the integrated circuit. The optical polymer stack may include one or more electro-optic polymer devices including an electro-optic polymer. The electro-optic polymer may include a host polymer and a second order nonlinear chromomophore, the host polymer and the chromophore both including aryl groups configured to interact with one another to provide enhanced thermal and/or temporal stability.

41 Claims, 31 Drawing Sheets

Related U.S. Application Data is a continuation-in-part of application No. 12/270,714, filed on Nov. 13, 2008, now Pat. No. 7,902,322.

(60) Provisional application No. 61/088,782, filed on Aug. 14, 2008, provisional application No. 61/003,433, filed on Nov. 16, 2007, provisional application No. 61/315,797, filed on Mar. 19, 2010, provisional application No. 61/383,282, filed on Sep. 15, 2010.

(51) Int. Cl.
*G02F 1/035* (2006.01)
*G02B 6/122* (2006.01)

(56) References Cited

U.S. PATENT DOCUMENTS

| | | | |
|---|---|---|---|
| 7,078,542 | B2 | 7/2006 | Jen et al. |
| 7,106,448 | B1 | 9/2006 | Vawter et al. |
| 7,283,689 | B1 | 10/2007 | Block et al. |
| 2004/0136634 | A1* | 7/2004 | Chowdhury et al. ............ 385/3 |
| 2004/0192940 | A1 | 9/2004 | Huang et al. |
| 2005/0117829 | A1* | 6/2005 | Chang et al. ................... 385/1 |
| 2008/0009620 | A1 | 1/2008 | Goetz et al. |
| 2009/0137772 | A1 | 5/2009 | Huang et al. |
| 2010/0040322 | A1 | 2/2010 | Li et al. |

FOREIGN PATENT DOCUMENTS

| | | |
|---|---|---|
| JP | 2000-319234 | 11/2000 |
| JP | 2004-506630 | 3/2004 |
| WO | WO98-21198 | 5/1998 |

OTHER PUBLICATIONS

R. Gujadhur et al., "Formation of aryl-nitrogen bonds using a soluble copper (I) catalyst", Department of Chemistry, Tetrahedron Letters 42 (2001) pp. 4791-4793.

M. Beller et al., "Synthesis of 2,3-Dihydroindoles, Indoles, and Anilines by Transition Metal-Free Amination of Aryl Chlorides", American Chemical Society (2001), vol. 66, No. 4, pp. 1403-1412.

G. Grasa et al., "Amination Reactions of Aryl Halides with Nitrogen-Containing Reagents Mediated by Palladium/Imidazolium Salty Systems", American Chemical Society (2001), vol. 66 No. 23, pp. 7729-7737.

Transmittal of PCT International Search Report for PCT International Application No. PCT/US2008/083418; Sep. 25, 2009.

PCT International Search Report for PCT International Application No. PCT/US2008/083418; Sep. 25, 2009.

PCT Written Opinion of the International Searching Authority for PCT International Application No. PCT/US2008/083418; Sep. 25, 2009.

Geoffrey A. Lindsay et al. "Multi-month Thermal Aging of Electro-Optic Polymer Waveguides: Synthesis, Fabrication, and Relaxation Modeling." Elsevier, Polymer 48 (2007): 6605-6616.

PCT International Search Report for International Application No. PCT/US2011/051802 mailed Apr. 30, 2012.

* cited by examiner

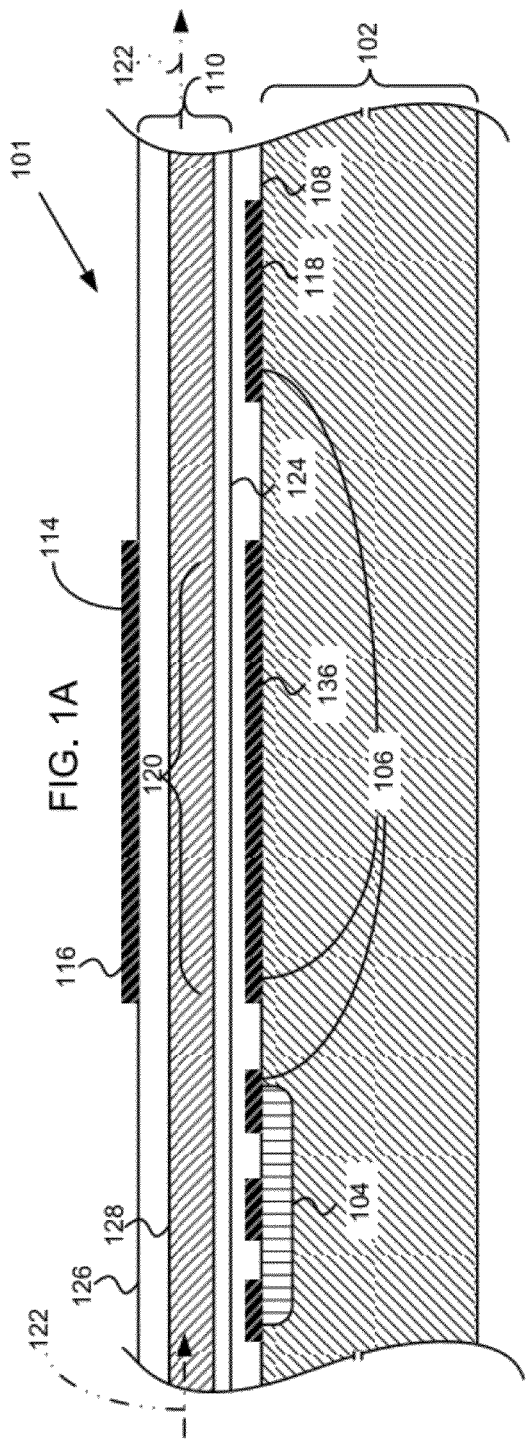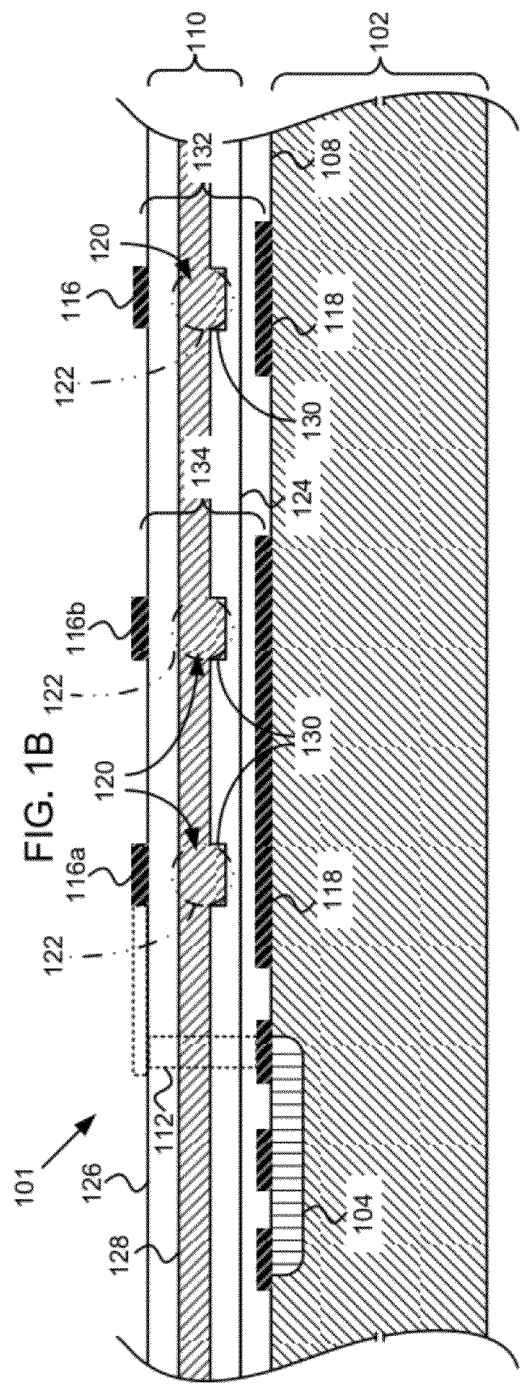

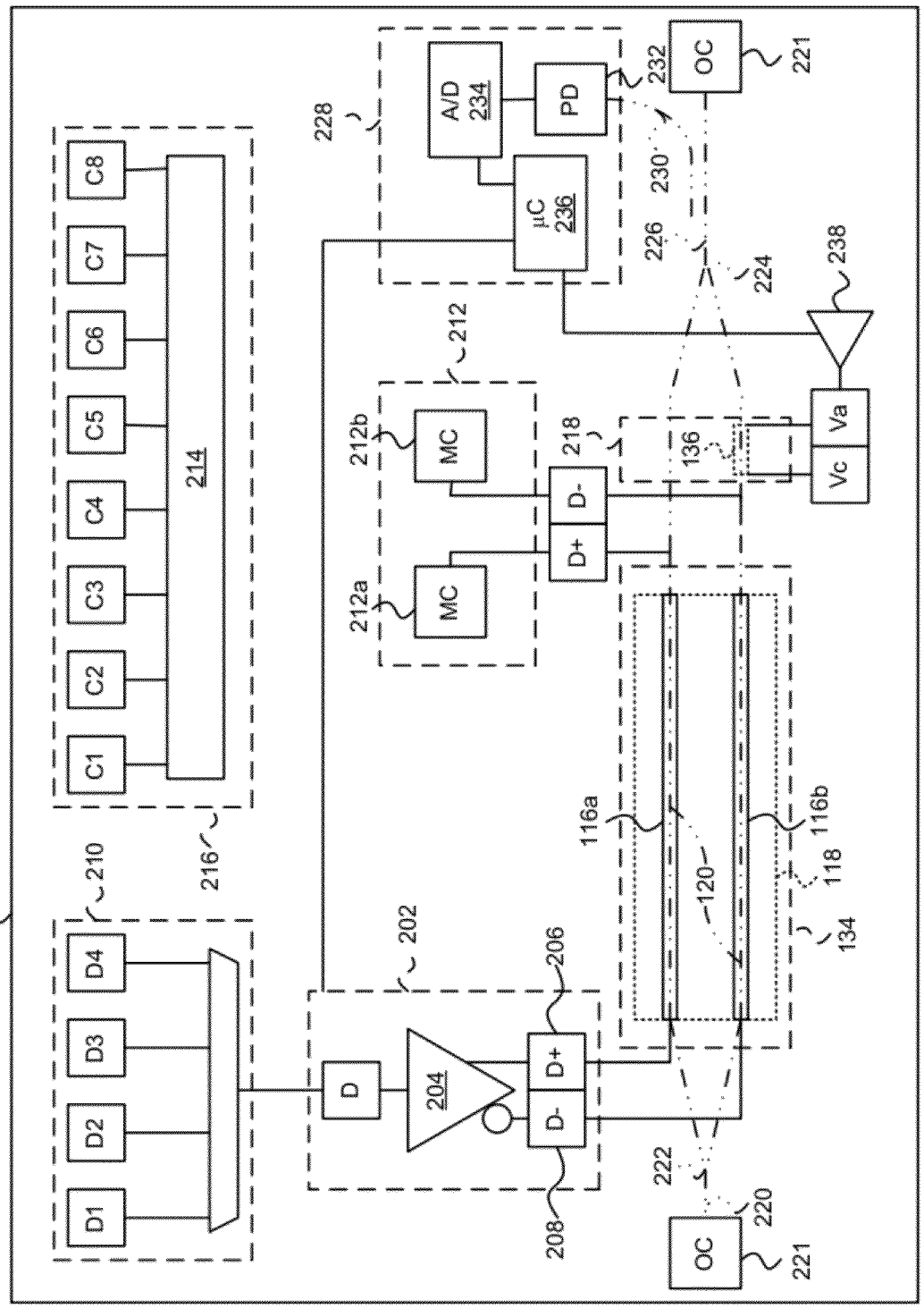

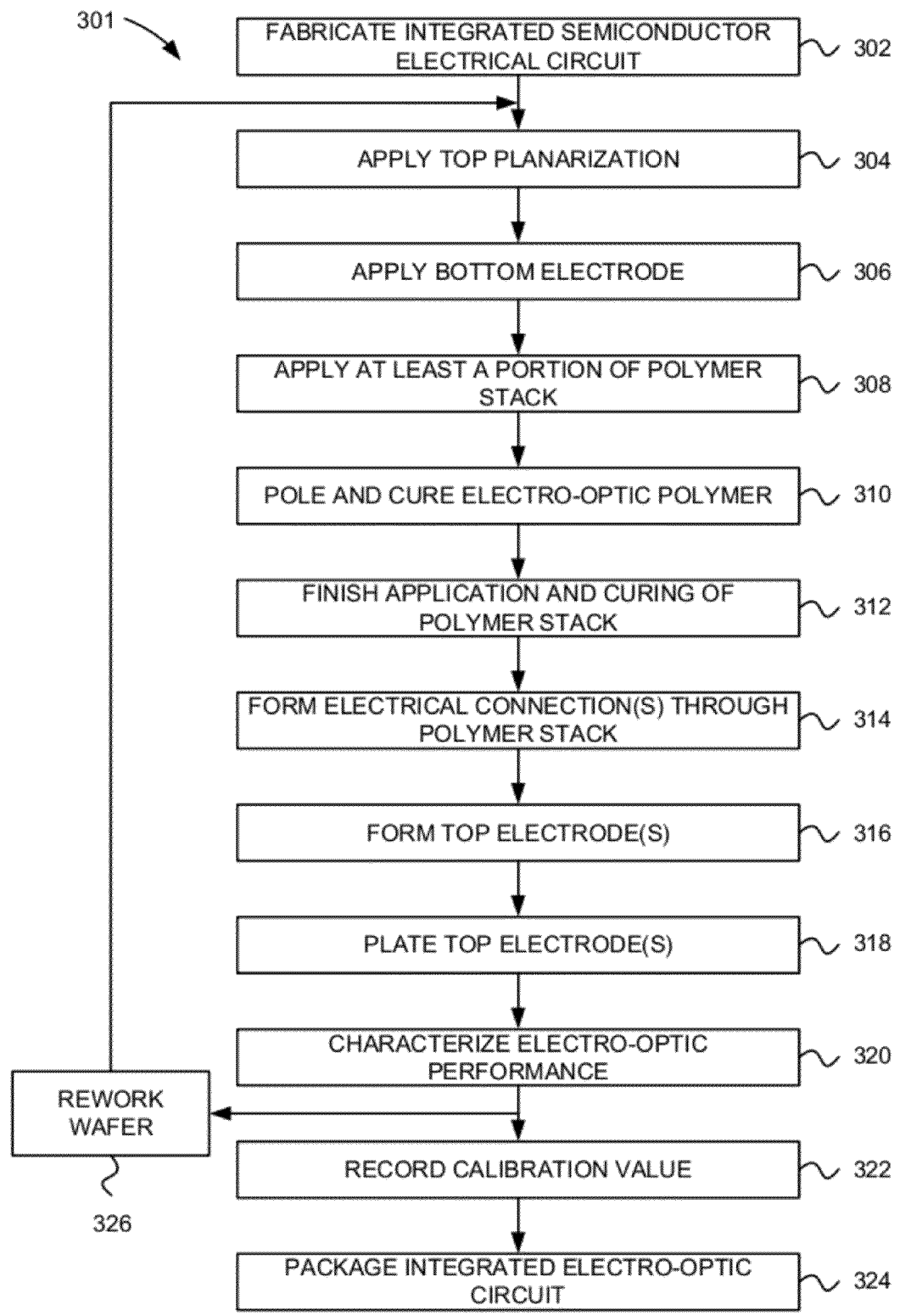

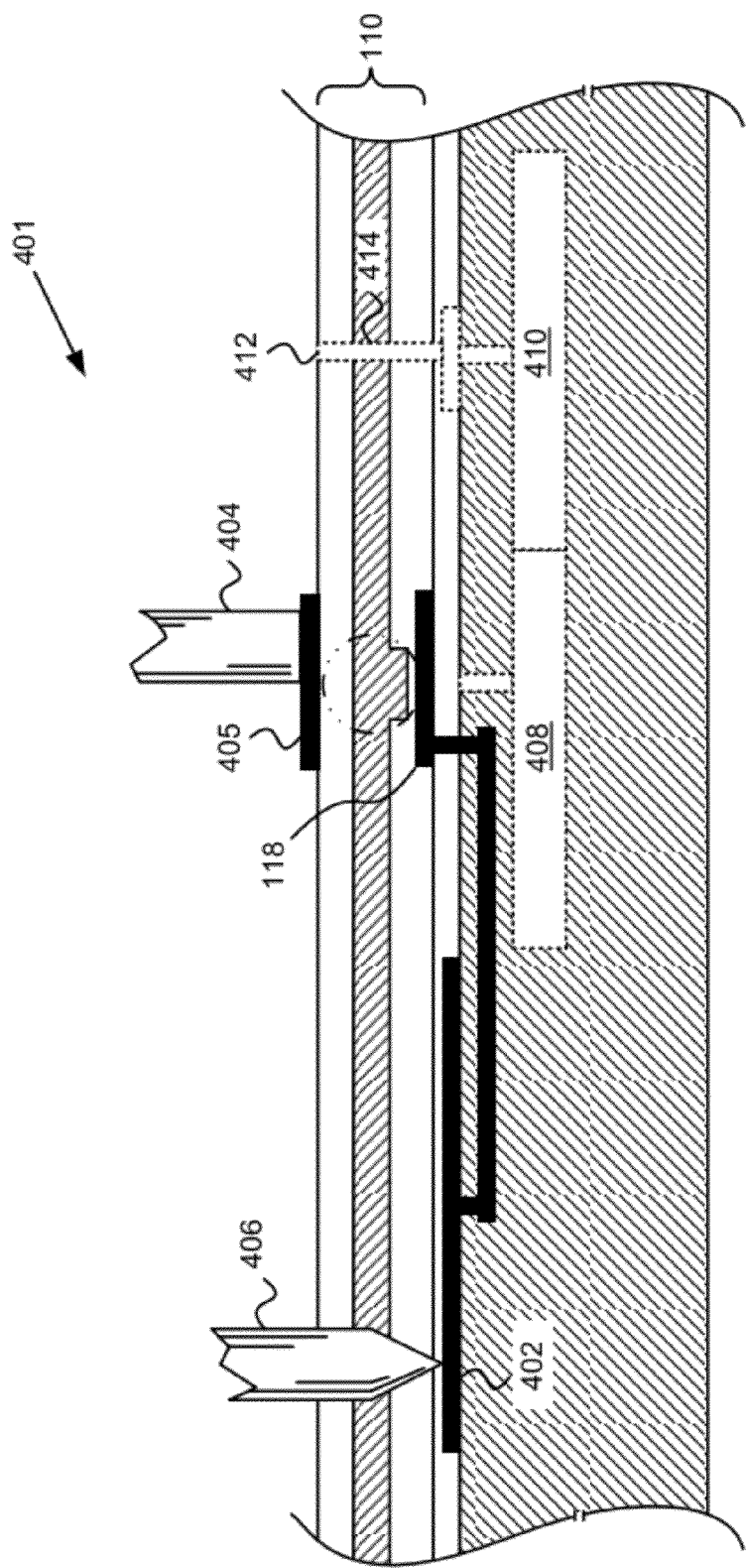

FIG 14
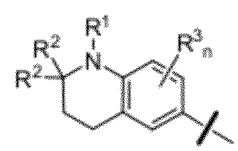
24
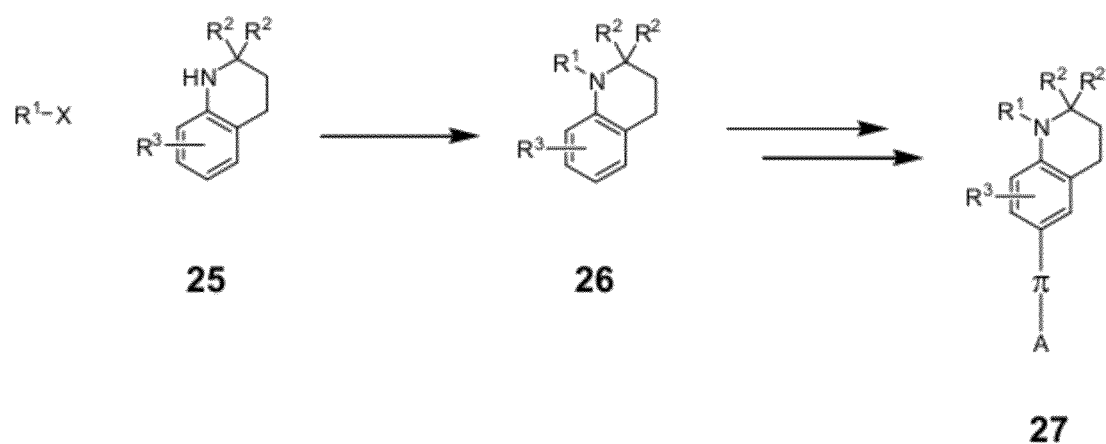
25   26   27

FIG 15
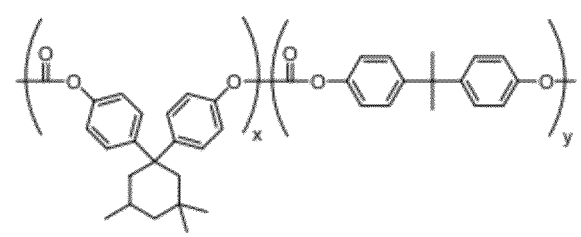
28
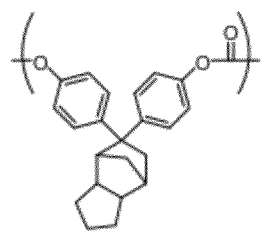
29
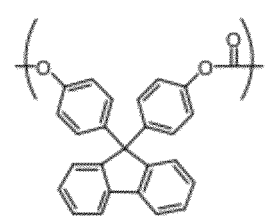
30

FIG 16
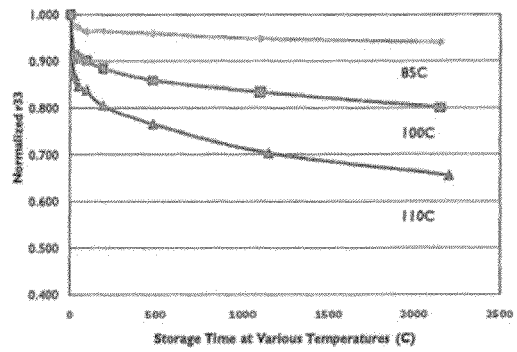
Fig 16A
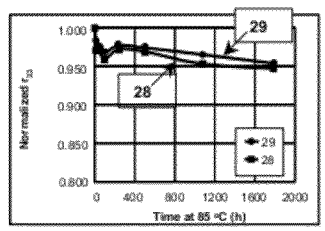
Fig 16B
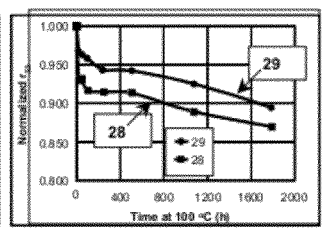
Fig 16C
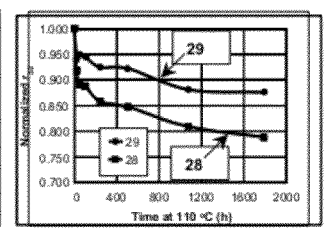
Fig 16D
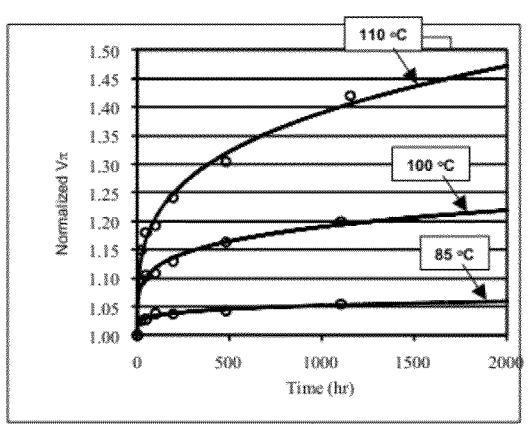
Fig 16E
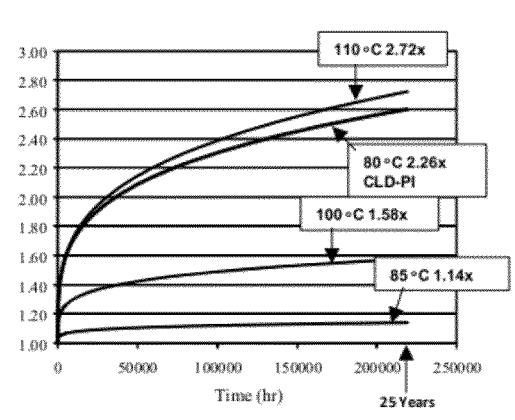
Fig 16F FIG 17
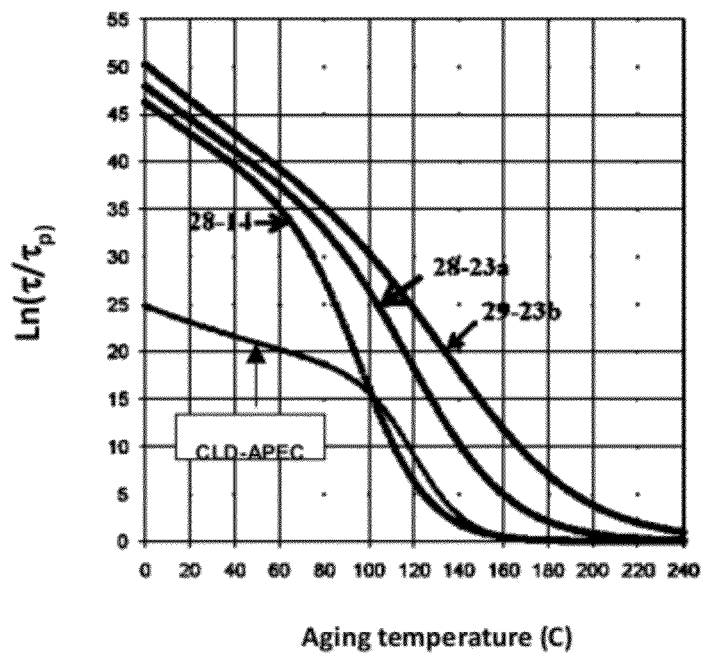
FIG 17A
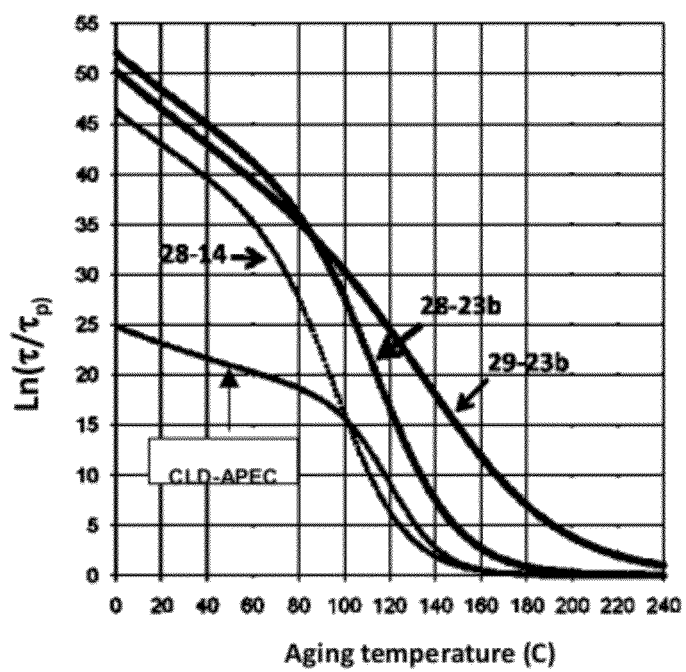
FIG 17B FIG 22
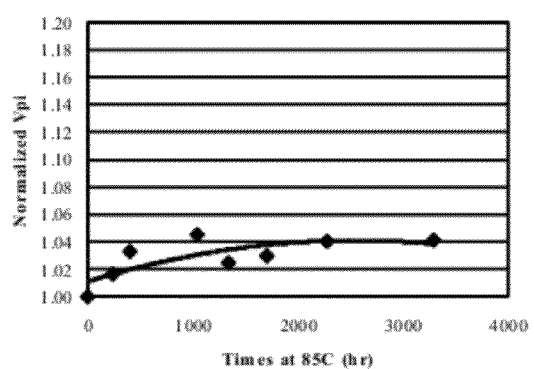
FIG 22A
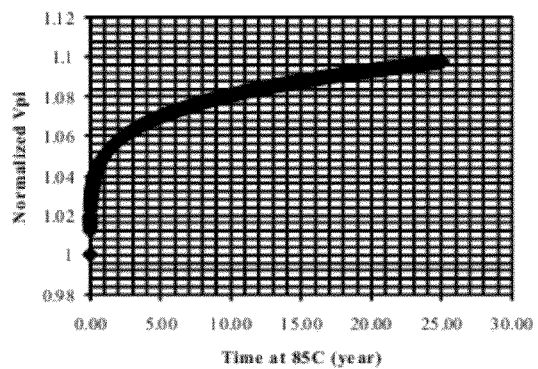
FIG 22B FIG 23
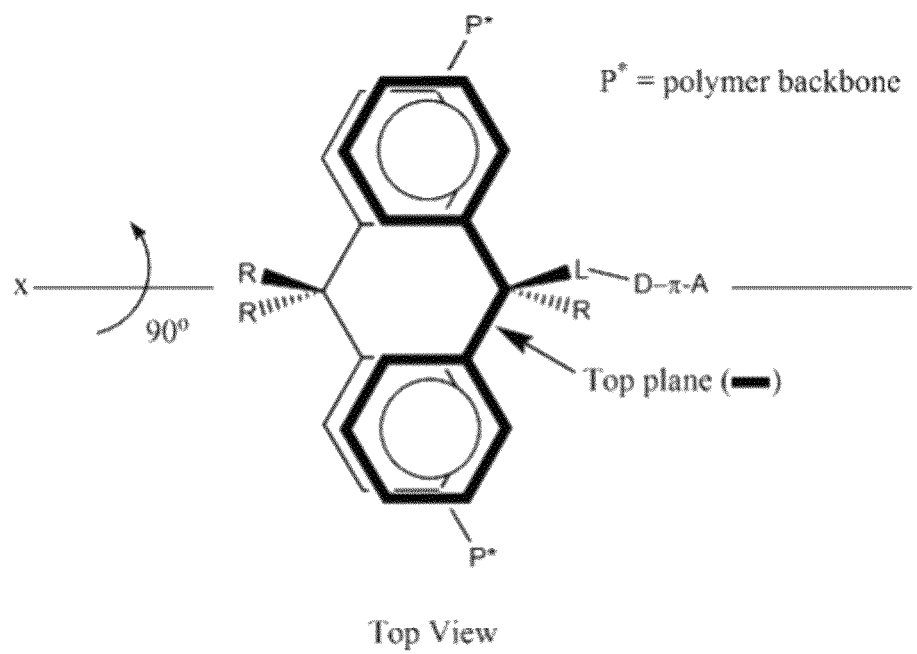
Top View
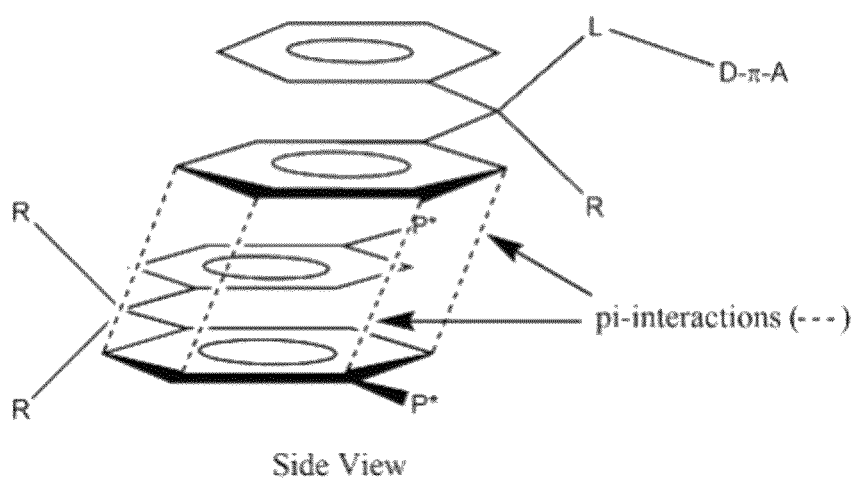
Side View FIG 24
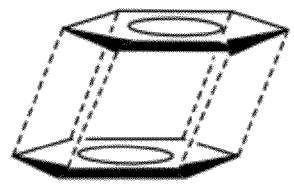
FIG 24A
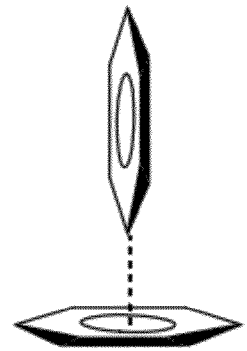
FIG 24B
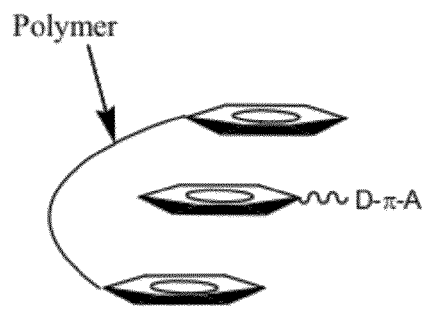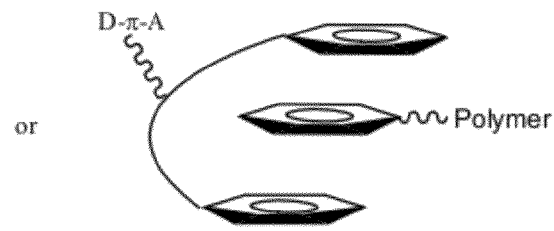
FIG 24C
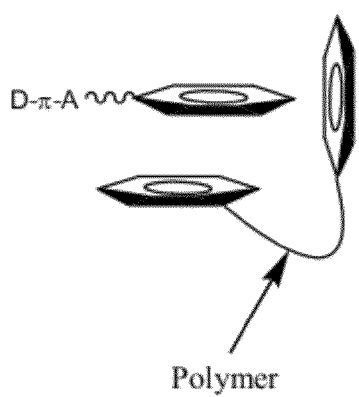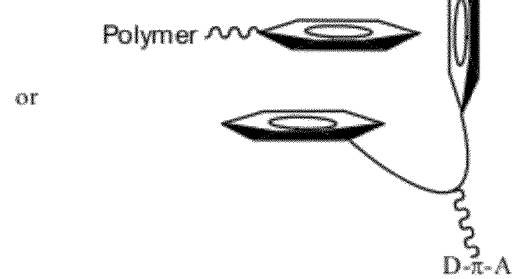
FIG 24D

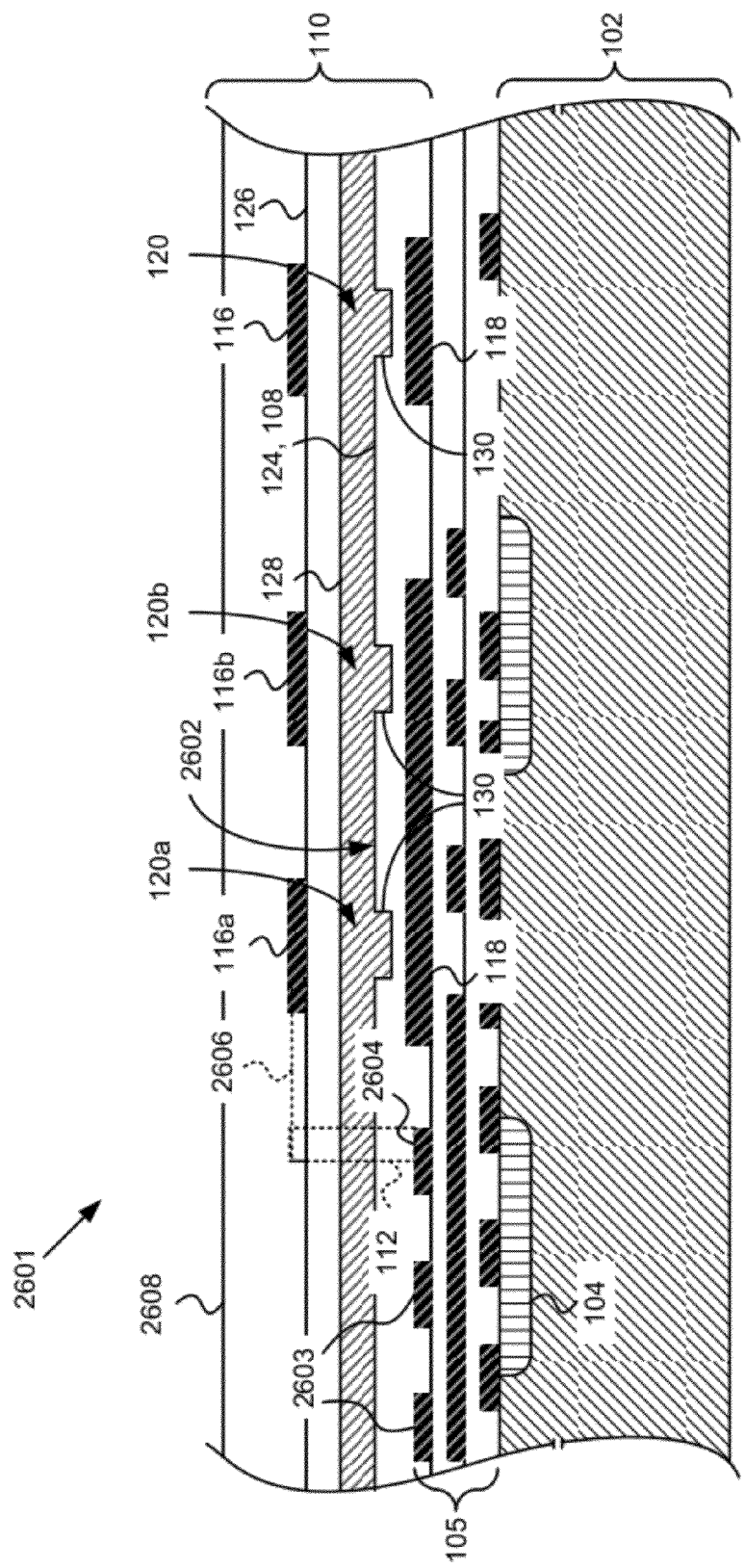

INTEGRATED CIRCUIT WITH OPTICAL DATA COMMUNICATION

CROSS-REFERENCE TO RELATED APPLICATIONS

The present application is a Continuation-in-Part of, and claims priority benefit from copending U.S. patent application Ser. No. 12/246,957, entitled INTEGRATED ELECTRO-OPTIC DEVICE AND METHOD OF MAKING, filed Oct. 7, 2008; which claims priority benefit from U.S. Provisional Patent Application Ser. No. 61/088,782, entitled INTEGRATED ELECTRO-OPTIC DEVICE AND METHOD OF MAKING, filed Aug. 14, 2008; both of which are, to the extent not inconsistent with the disclosure herein, incorporated by reference in their entirety. The present application is also a Continuation-in-Part of, and claims priority from copending U.S. patent application Ser. No. 12/959,898, entitled STABILIZED ELECTRO-OPTIC MATERIALS AND ELECTRO-OPTIC DEVICES MADE THEREFROM, filed Dec. 3, 2010, which is a Continuation-in-Part of, and claims priority from copending U.S. patent application Ser. No. 12/270,714, entitled NONLINEAR OPTICAL CHROMOPHORES WITH STABILIZING SUBSTITUENT AND ELECTRO-OPTIC DEVICES, filed Nov. 13, 2008; which claims priority benefit from U.S. Provisional Patent Application Ser. No. 61/003,433, entitled NONLINEAR OPTICAL CHROMOPHORES WITH STABILIZING SUBSTITUENT AND ELECTRO-OPTIC DEVICES, filed Nov. 15, 2007. The present application and copending U.S. patent application Ser. No. 12/959,898 also claim priority benefit from U.S. Provisional Patent Application Ser. No. 61/315,797, entitled ELECTRO-OPTIC CHROMOPHORE MATERIAL AND DEVICES WITH ENHANCED STABILITY, filed Mar. 19, 2010; and which claims priority benefit from U.S. Provisional Patent Application Ser. No. 61/383,282, entitled ELECTRO OPTIC CHROMOPHORE AND HOST POLYMER SYSTEM FOR which are incorporated by reference in their entirety.

STATEMENT REGARDING FEDERALLY SPONSORED RESEARCH OR DEVELOPMENT

The inventions disclosed herein were made with U.S. Government support pursuant to NRO Contract No. NRO000-07-C-0123 and DARPA Contract No. W31P4Q-08-C-0198. Accordingly, the U.S. Government may have certain rights in the inventions disclosed herein.

BACKGROUND

Integrated circuit (IC) performance can be limited by constraints posed by off-chip communication speed. Electrical interconnections offer only relatively low data rates. Optical communication can be faster, but unfortunately optical interconnections formed using optical devices embedded in silicon occupy valuable substrate real estate that cannot also be used for conventional integrated device circuits. What is needed is an optical interconnection approach for integrated circuits that offers high bandwidth and minimizes consumption of semiconductor area to the exclusion of other circuitry.

Moreover, conventional electro-optic modulation materials such as lithium niobate ($LiNbO_3$) can suffer from requirements for high modulation voltage and can pose contamination problems if used in a silicon IC fabrication facility. What is needed is an optical material that can form active and passive optical devices without posing a substantial contamination risk to a semiconductor processing facility. What is also needed is an optical material that can be formed to include active devices having modulation voltages that are available on a conventional IC. What is also needed is an optical material that can be processed under conditions (e.g., temperature) that do not degrade underlying IC structures.

SUMMARY

According to an embodiment, an integrated circuit (IC) can be formed to include an optical polymer stack disposed over at least portions of (superjacent to) the IC. The polymer stack can include at least one electro-optic polymer layer that can be poled and configured to form a portion of an electro-optic device. The IC can be configured to modulate an electric field across the poled electro-optic polymer, the electric field modulation causing the poled electro-optic polymer to undergo an electro-optic response comprising a modulated index of refraction. The modulation of the index of refraction causes modulation of the data onto one or more optical wavelengths of light operatively coupled to the electro-optic device.

The electro-optic polymer can include a host polymer including an aryl group and a second order non-linear chromophore having two or more substituents that also include aryl groups. The aryl groups of the host polymer and the chromophore can interact to reduce the tendency of the chromophore to rotate from its poled position, thus reducing the tendency of the electro-optic polymer to undergo a reduction in electro-optic response with time and temperature. The host polymer can be selected to have a relatively high glass transition temperature to further stabilize the positions of the chromophore molecules.

According to an embodiment, an integrated circuit configured for optical communication includes an integrated circuit including at least one conductor layer; and an optical polymer stack disposed on the integrated circuit and the at least one conductor layer, the optical polymer stack including at least one electro-optic core The integrated circuit can include circuitry configured to modulate data onto at least one optical wavelength operatively coupled to the at least one electro-optic core The electro-optic core can include a poled electro-optic polymer including a host polymer with at least one aryl group and a poled chromophore including two or more aryl substituents configured to sterically interact with the at least one aryl group of the host polymer to hinder rotation of the chromophore after poling.

According to an embodiment, a method for making an integrated circuit with an optical interface includes providing an integrated circuit including a conductive layer including at least one first electrode and forming, over the integrated circuit, at least a portion of an optical polymer stack including an electro-optic polymer, the electro-optic polymer including a host polymer including an aryl group and a second order non-linear optical chromophore having one or more aryl substituents. The aryl substituents of the chromophore and the aryl group of the host polymer can be selected to interact to stabilize a poled position of the chromophore.

According to an embodiment, an integrated circuit configured for optical communication includes an integrated circuit, an optical polymer stack formed at least partially on the integrated circuit, and an optical detector configured to receive a modulated optical signal and convert the optical signal to a first electrical signal. A circuit module may be formed as a portion of the integrated circuit operatively coupled to the optical detector receive first data corresponding to the first electrical signal and responsively output second data. An electro-optic modulator including an electro-optic polymer formed at least partially in the optical polymer stack, may be operatively coupled to the circuit module and configured to modulate light to output a modulated light signal corresponding to the second data.

According to an embodiment, an integrated circuit with an optical interface includes a semiconductor substrate with a pattern of doped wells on the surface of the semiconductor substrate and a plurality of patterned conductor layers and patterned dielectric layers disposed over the surface of the semiconductor substrate and forming a circuit layer. An optical polymer forming a planarization layer may be disposed over the circuit layer.

According to an embodiment, a method for making an integrated circuit configured for optical communication includes providing an integrated circuit including at least one first electrode and forming an optical polymer stack over the integrated circuit. Forming the optical polymer stack may include forming at least one electro-optic polymer core located over at least a portion of the at least one first electrode.

According to an embodiment, a method for configuring an integrated circuit for optical communication may include applying a bottom optical cladding polymer over the surface of an integrated circuit, curing the bottom cladding polymer to form a bottom polymer clad, and etching one or more features in the bottom polymer clad.

According to an embodiment, a method for making an integrated circuit configured for optical communication may include providing an integrated circuit, applying a bottom polymer optical clad over the integrated circuit, applying an electro-optic polymer over the bottom polymer clad, and etching one or more features in the electro-optic polymer.

According to an embodiment, a polymer electro-optic device includes, disposed between a high speed electrode and an electro-optic polymer, a velocity-matching layer configured cause an electrical propagation velocity through the high speed electrode to approximate an optical propagation velocity through the electro-optic polymer.

According to an embodiment, a method of making a polymer electro-optic device includes forming an electro-optic polymer layer over a substrate, including: forming a velocity-matching layer over the electro-optic polymer layer, and forming a high speed electrode over the velocity-matching layer.

According to an embodiment, an electro-optic polymer stack includes a first polymer layer having a first coefficient of thermal expansion disposed over an integrated circuit or other substrate having a substrate coefficient of thermal expansion, and a second polymer layer having a second coefficient of thermal expansion, wherein the first coefficient of thermal expansion has a value between the substrate coefficient of thermal expansion and the second coefficient of thermal expansion.

According to an embodiment, an electro-optic polymer stack includes an electro-optic polymer layer including one or more polar species, and one or more upper layers disposed over the electro-optic polymer layer, wherein the one or more upper layers include relatively non-polar polymers configured to substantially prevent water vapor from migrating from an environment over the one or more upper layers to the electro-optic polymer layer.

The summary given above is not meant to be limiting but rather to provide a convenient overview for the reader. The full scope and meaning will become apparent in reference to the written description, drawings, and attached claims.

BRIEF DESCRIPTION OF THE DRAWINGS

FIG. 1A is a partial side sectional diagram of an integrated circuit (IC) configured for optical communication, according to an embodiment.

FIG. 1B is a partial cross sectional diagram of the IC configured for optical communication of FIG. 1A, according to an embodiment.

FIG. 2 is a block diagram of an illustrative IC with an optical data interconnection, according to an embodiment.

FIG. 3 is a flow chart illustrating a method for making an electro-optic polymer semiconductor integrated circuit, such as those shown in FIGS. 1A, 1B, and 2, according to an embodiment.

FIG. 4 is a diagram illustrating a poling configuration used to make an integrated circuit configured for optical data communication, according to an embodiment

FIG. 14 illustrates an electron donor for a chromophore and a synthetic scheme for a chromophore including the donor, according to an embodiment.

FIG. 15 illustrates host polymer molecular structures, according to embodiments.

FIGS. 16A-16F include graphs showing Jonscher analyses of temporal stability of electro-optic polymers, according to embodiments.

FIG. 17 is a graph showing hyperbolic tangent model analyses of temporal stability of illustrative electro-optic polymers, according to embodiments.

FIG. 22A is a graph showing a Jonscher analysis of temporal stability of an electro-optic polymer modulator spanning 3000 hours, according to an embodiment.

FIG. 22B is a graph showing a Jonscher analysis showing projected long term temporal stability of an electro-optic polymer modulator spanning 25 years, according to an embodiment.

FIG. 23 is a diagram illustrating pi-interactions between a host polymer including aryl groups and an aryl substituent on a chromophore, according to an embodiment.

FIG. 24A is a diagram illustrating pi-electron interactions between parallel aryl groups of a host polymer and a substituent of a chromophore, according to an embodiment.

FIG. 24B is a diagram illustrating pi-electron interactions between orthogonal aryl groups of a host polymer and a substituent of a chromophore, according to an embodiment.

FIG. 24C is a diagram illustrating additional pi-electron interactions between parallel aryl groups of a host polymer and a substituent of a chromophore, according to an embodiment.

FIG. 24D is a diagram illustrating pi-electron interactions between parallel and orthogonal aryl groups of a host polymer and a substituent of a chromophore, according to an embodiment.

FIG. 26 is a sectional view of an integrated circuit configured for optical communication showing a bottom clad layer configured to provide planarization and a velocity-matching layer, according to other embodiments.

DETAILED DESCRIPTION

Figure 5:
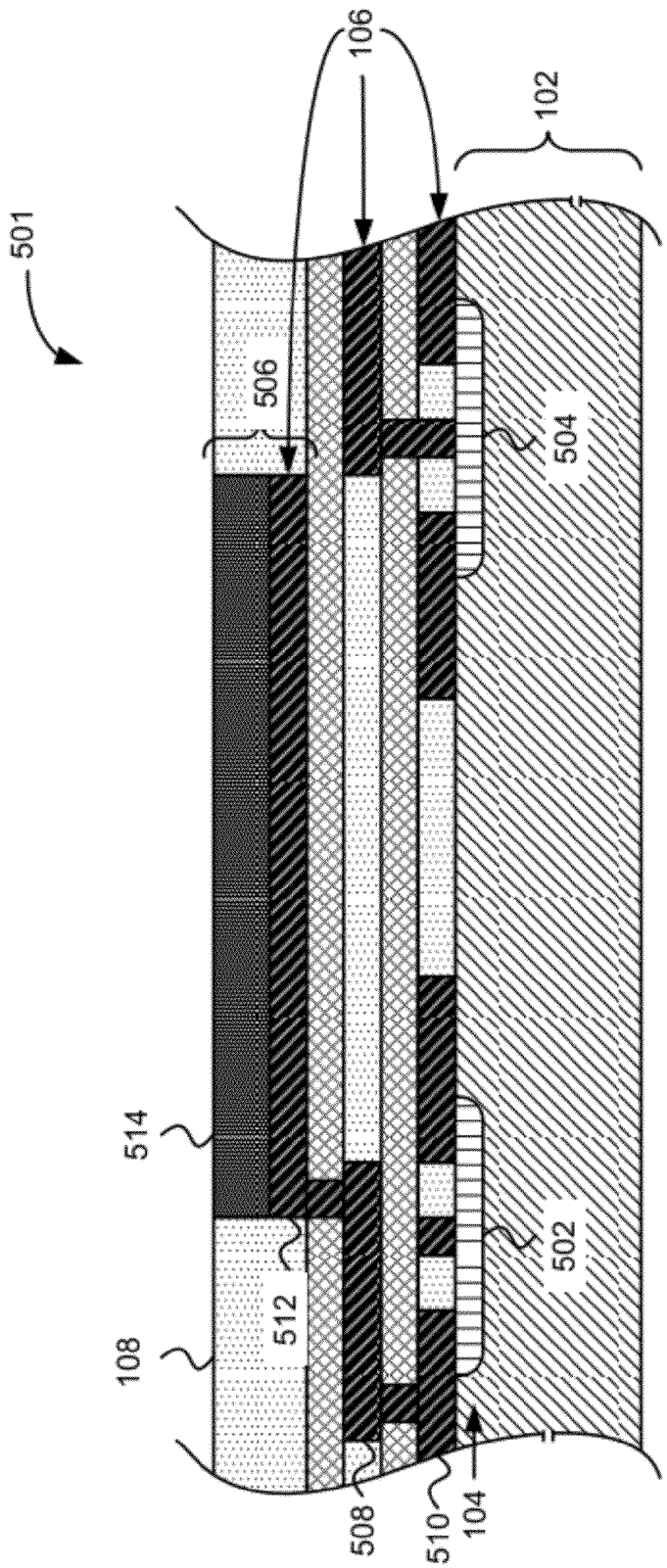
FIG. 5 is a side sectional view of a planarized semiconductor integrated circuit configured to drive a thickened bottom electrode of an electro-optic device, according to an embodiment.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here.

Referring to FIGS. 1A and 1B, according to embodiments, an integrated circuit (IC) 101 may be generally formed to include a semiconductor layer 102 including doped regions 104, a circuit layer 105 of patterned conductors 106 and insulation 107 over the semiconductor layer 102, and an optical layer 110 of patterned optical polymer materials (and optionally one or more electrodes 116) over the circuit layer 105. Various barrier layers, adhesion promotion layers, passivation layers, etc. (not shown) may also be included in the semiconductor 102, circuit 105, optical polymer stack 110 making up the IC 101. Generally, optical components in the optical polymer stack are larger in scale than integrated circuit components. For clarity purposes, in figures herein, integrated circuit conductors 106, insulation 107, and doped regions 104 are shown significantly expanded in scale compared to optical polymer components. Moreover vertical scale can be expanded compared to horizontal scale.

Referring to FIG. 2A, viewing the IC 101 from above, the IC 101 can include a die 205 supporting a plurality of electrical circuit sections 203 configured to perform conventional processing, memory, logic, switching, communication, etc. functions; and can include one or more active and/or passive optical devices 120 disposed over the conventional circuit sections. Actuation or modulation electrodes 136a, 136b, 136c, 136d, 136d' can be formed from one or more patterned conductors 106 included in the circuit layer 105. As may be appreciated from inspection, ICs made according to embodiments can include conventional circuit sections 203 across substantially the entirety of a die 205, and optical communications devices superposed over and above the conventional circuit sections 203.

According to embodiments, a relatively low voltage semiconductor integrated circuit may be configured to drive an electro-optic polymer modulator at a corresponding voltage without additional amplification.

A semiconductor integrated circuit may include a number patterned metal layers. Typically, memory ICs may include about four patterned metal layers, and microprocessors may include about eleven patterned metal layers, for example. A planarization layer may be formed over the top metal layer, and bottom cladding, electro-optic core, and top cladding may be formed over the planarization layer to form an integrated electro-optic device. Optionally, a smooth bottom electrode may be formed over the planarization layer and below the bottom cladding. A plurality of such devices may be disposed on a singulated die. An integrated circuit with an optical interconnection may include one or more signal multiplexers, one or more modulator drivers operatively coupled to the one or more signal multiplexers, and one or more electro-optic modulators operatively coupled to the one or more modulator drivers. The integrated circuit with an optical interconnection may include at least one light phase bias device and may include a calibration circuit configured to provide an indication of electro-optic response to an external system. The integrated circuit with an optical interconnection may include a feedback circuit configured to at least partially control the light phase bias device.

FIGS. 1A and 1B are respective side sectional and cross-sectional views of an integrated circuit configured for optical communication 101, according to an embodiment. A semiconductor substrate 102 includes at least one doping layer 104 patterned across the semiconductor substrate to form portions of semiconductor devices. At least one conductor layer 106 is patterned over the semiconductor substrate. A planarization layer 108 can be disposed at least partly coplanar with and over the at least one conductor layer 106. A optical polymer stack 110 can be disposed over the planarization layer 108. According to an alternative embodiment, the planarization layer 108 can be omitted, and the planarization function can be provided by a portion of the optical polymer stack 110.

At least one via 112 may at least partially extend through the optical polymer stack 110. The at least one via may be operatively coupled to a corresponding location on the at least one patterned conductor layer 106. A top conductor layer 114 is disposed over the optical polymer stack and in electrical continuity with the at least one via 112. Unless context dictates otherwise, the term "top conductor", as used herein, refers to a conductor formed on the top of the optical polymer stack 110.

As an alternative to a via 112, other conductors may be substituted to electrically couple the top conductor layer to at least one location on the at least one patterned conductor layer 106. For example, the at least one conductor may be formed entirely or in combination from a via, a wire bond, a conductive bump, and/or an anisotropic conductive region.

The top conductor layer 114 may be formed to include a metal layer or a conductive polymer, for example. The top conductor may be plated to increase its thickness. The top conductor layer may include at least one high speed electrode 116 formed as a pattern in the top conductor layer 114, the high speed electrode 116 being operatively coupled to receive a signal from the at least one via 112 or other conductive structure from the corresponding location on the at least one patterned conductor layer 106. Thus, the at least one via 112 or other conductive structure is configured to transmit an electrical signal from semiconductor electrical circuitry formed on the semiconductor substrate 102 to the at least one high speed electrode 116 through or around the optical polymer stack 110.

According to embodiments, the at least one patterned conductor layer 106 is configured to form a ground electrode 118 parallel to the at least one high speed electrode 116. An active region 120 of the optical polymer stack 110 is positioned to receive a modulation signal from the high speed electrode 116 and the ground electrode 118. The active region 120 includes an electro-optic composition formed as a poled region that contains at least one second order nonlinear optical chromophore. Chromophores and electro-optic compositions are described more fully below.

The optical polymer stack 110 is configured to support the active region 120. The optical polymer stack 110 can also include passive waveguide structures. For example, a polymer waveguide can receive and guide light 122 to and from the active region and/or to and from the vicinity of the active region. The optical polymer stack 110 may include at least one bottom cladding layer 124 and at least one top cladding layer 126 disposed respectively below and above an electro-optic layer 128. The bottom 124 and top 126 cladding layers, optionally in cooperation with an optional planarization layer 108, are configured to guide inserted light 122 along the plane of the electro-optic layer 128. Light guiding structures 130 are formed in the optical polymer stack 110 to guide the light 122 along one or more light propagation paths through the electro-optic layer 128 and/or non-active core structures (not shown). In the embodiment of FIGS. 1A and 1B, the guidance structures 130 are formed as trench waveguides that include etched paths in the at least one bottom cladding layer 124.

Second order non-linear optical chromophores are generally formed as molecules having a structure D-π-A, where D is an electron donor structure, A is an electron acceptor structure having a relatively higher electron affinity than the electron donor structure D, and π is a pi-orbital conjugated bridge that freely permits electron flow between the donor D and the acceptor A. Such molecules may also be referred to as hyperpolarizable organic chromophores. The molecules are generally linear and nominally polar due to the difference in electron affinities between the donor D and acceptor A. Such molecules may be poled into alignment by applying an electrical poling field during manufacture, with the acceptor A portions being drawn toward a positive potential and the donor D portions being drawn toward a negative potential. The molecules may then be locked into the desired alignment by cross-linking or freezing a polymer matrix in which the chromophores are embedded. For example, poling can occur near a glass transition temperature Tg of a composition including a host polymer and chromophores. Alternatively, the chromophores may be covalently bound or otherwise substantially fixed in their poled positions.

Chromophores and corresponding electro-optic compositions that provide high thermal and/or temporal stability can be advantageous with respect to processing constraints, yield, service temperature constraints, reliability, and service life. Approaches for improving thermal and temporal stability are described more fully below. Other properties that contribute to a successful integration of the optical polymer stack with the IC include good adhesion to metal, oxide, and semiconductor portions of the IC surface, sufficient elasticity to compress or stretch corresponding to thermal expansion of the IC and IC portions, low optical loss, and high electro-optic activity. Such considerations can be satisfied by material systems described herein.

After poling, an electrical modulation field may be imposed through the volume of chromophores. For example, if a relatively negative potential is applied at the negative end and a relatively positive potential applied at the positive end of the poled chromophores, the chromophores will at least partially become non-polar. If a relatively positive potential is applied at the negative end and a relatively negative potential is applied at the positive end, then the chromophores will temporarily hyperpolarize in response to the applied modulation field. Generally, organic chromophores respond very quickly to electrical pulses that form the electrical modulation field and also return quickly to their former polarity when a pulse is removed.

A region of poled second order non-linear optical chromophores generally possesses a variable index of refraction to light. The refractive index is a function of the degree of polarization of the molecules. Thus, light that passes through an active region will propagate with one velocity in a first modulation state and another velocity in a second modulation state. This property, along with the fast response time and a relatively high sensitivity to changes in electric field state make second order non-linear optical chromophores excellent bases from which to construct very high speed optical modulators, phase shifters, micro-ring resonators, variable Bragg grating reflectors, etc.

The IC 101 includes a semiconductor electrical circuit formed from a complex of the doping layer pattern 104 and the at least one patterned conductor 106 in the circuit layer 115. Typically, ICs include greater than one patterned conductor layer. For example, memory circuits may use four or five conductor layers separated by dielectric layers, and microprocessors may use eleven or twelve conductor layers separated by dielectric layers. According to an embodiment, circuitry of the IC can be configured, when in operation, to drive the electrodes 116, 118 with a series of modulated electrical pulses. A resultant modulated electrical field is thus imposed across the active region 120 and results in modulated hyperpolarization of the poled chromophores embedded therein. A complex of electrodes 116, 118, active region 120 and light guidance structures 130 can be designated as an optical device. The modulated hyperpolarization may thus modulate the velocity light passed through the poled active region 120 of the optical polymer stack 110. Repeatedly modulating the velocity of the transmitted light creates a phase-modulated light signal emerging from the active region. Such an active region 120 may be combined with light splitters, combiners (not shown), and other active regions to create light amplitude modulators, such as in the form of a Mach-Zehnder optical modulator. Another arrangement of an optical device can include an input light guide, an optional output light guide, and a ring resonator formed as a poled chromophore active region arranged for wavelength-selective evanescent coupling to the input light guide and optionally to the output light guide.

A combination of at least one electro-optic active region 120, at least two electrodes 116, 118, and corresponding light guiding structures 124, 126, 130 may be considered an electro-optic device 132, 134. A two-channel electro-optic device 134 may be formed from one ground electrode 118 and corresponding pairs of active regions 120 and high speed electrodes 116a, 116b. The two channels of a two channel electro-optic device 134 may operate in cooperation, such as in a push-pull manner to form a Mach Zehnder optical modulator.

Additional devices may be formed using electrodes or resistors 136 that are not configured for high speed operation. The operation of one such illustrated device is described below in conjunction with the description of an optical phase bias device.

FIG. 2 is a diagram of an illustrative IC configured for optical communication 201, according to an embodiment. The IC 201 of FIG. 2 can, for example, be configured as an integrated electro-optic modulator circuit. The IC 201 includes a driver circuit 202 including at least one amplifier 204 formed from a complex of doped semiconductor regions 104 and the patterned at least one conductor layer 106 shown diagrammatically in FIGS. 1A and 1B. The driver circuit 202 is operable to amplify a multiplexed signal to produce a series of relatively low voltage modulated electrical pulses. The modulated electrical pulses are conducted to two high speed electrodes 116a, 116b disposed over corresponding active regions 120 shown diagrammatically in FIGS. 1A and 1B and a combined ground electrode 118.

The illustrative IC 201 includes a push-pull Mach Zehnder modulator 134. Accordingly, an output stage 204 of the driver circuit 202 includes an output 206 that drives a D+ node and a complementary output 208 that is modulated inversely from the output 206 to drive a D− node. The output 206 and complementary output 208 are each conducted to a corresponding high speed electrode 116a, 116b. Each high speed electrode 116a, 116b is thus driven by an electrical signal that is the inverse of the electrical signal delivered to the other high speed electrode 116b, 116a. The driver circuit 202 may be further configured to drive the ground electrode 118 to a desired voltage. While the term "ground" is used generically, and in some cases may equal actual chip ground, a different potential or set of potentials may alternatively be used to form the ground potential.

According to an alternative embodiment, the output stage 204 of the driver circuit 202 includes an output 206 that drives a single node. The output 206 is conducted to a corresponding high speed electrode 116. The high speed electrode 116 is thus driven by an electrical signal that modulates a single channel active region 120. Such an alternative embodiment may form a single channel phase modulator.

According to another alternative embodiment, two output stages may be synchronized (with or without phase offset or inversion), each output stage including an output that drives a single node. Since the output stages are synchronized, they may be used to cooperatively drive respective electro-optic channels, for example as complementary channels, as phase-delayed channels, or in another relationship. The separate synchronized output channels may alternatively be used to drive a single electro-optic modulation channel, for example by combining their outputs in a cascade, by inputting signals at separate signal injection points, or by using one node to drive a signal at the front end of the high speed electrode and using another node to drive a corresponding signal at the back end of the high speed electrode (e.g., in a bipolar drive arrangement). Especially in the latter configuration, signal matching circuitry (described below) may be omitted, the function thereof being provided by the back end drive signal.

The driver circuit 202 can receive the multiplexed signal through a node D from a multiplexer circuit 210 that is also formed from a complex of doped semiconductor regions 104 and the patterned at least one conductor layer 106 shown diagrammatically in FIGS. 1A and 1B. The multiplexer circuit 210 is operable to multiplex a plurality of input signals received at nodes D1, D2, D3, and D4 to produce the multiplexed signal at node D. The nodes D1, D2, D3, and D4 may be operatively coupled to a plurality of package leads for receiving corresponding data signals from a system (not shown) to which the IC 201 is connected.

According to an embodiment, the multiplexer circuit 210 can include an N×M multiplexer. For example, N may be 2, 4, 8, 16, or 32. M may be a frequency such as 2.5 GHz, 10 GHz, 25 GHz, 40 GHz or 100 GHz. According to an embodiment, the multiplexer circuit 210 is a 4×2.5 Gbps multiplexer that produces a 10 Gbps multiplexed signal at node D.

The illustrative integrated circuit 201 can also include integrated matching circuitry 212a, 212b configured to receive pulses from the respective high speed electrodes 116a, 116b and substantially prevent reflections. The matching circuitry 212a, 212b may be formed at least partially from a patterned region of the top conductive layer and may be coupled to the high speed electrodes 116a, 116b at locations selected to tune their frequency response to a desired bandwidth. The matching circuitry may include a plurality of connections to each of the high speed electrodes 116a, 116b. The matching circuitry may be further formed at least partially from a complex of patterned at least one doping layer 104 and patterned at least one conductor layer 106 shown diagrammatically in FIGS. 1A and 1B. Thus, the high speed electrodes are able to support traveling electrical pulses that enter at the left end and propagate left-to-right along their length. Accordingly, high bandwidth pulses may form a traveling waveform that is substantially synchronized with the velocity of light traveling through the active regions.

While processing of optical polymers and second order non-linear optical chromophores may generally be quite repeatable, variations in ambient temperature, processing, material, or fabrication tolerances may create variations in the response of a given optical device or portion of an optical device formed in part by the active region. Such variations in response may be compensated for by providing a phase bias structure and/or by selecting a modulation voltage, phase, duty cycle, etc.

The integrated polymer electro-optic semiconductor circuit 201 may include a calibration storage circuit 214. The calibration storage circuit 214 is configured to store at least one calibration value corresponding to a response of the electro-optic circuit to a signal imposed from a system (not shown) to which the integrated electro optic semiconductor circuit 201 is coupled. The calibration storage circuit 214 includes at least one node C1, C2, C3, C4, C5, C6, C7, C8 216 corresponding to a package lead coupled to the calibration value, the package lead configured to provide the calibration value to the system.

The calibration storage circuit 214 may be formed from an array of fusable links or non-volatile storage memory such as flash, ROM, mask ROM, PROM, EPROM, EEROM, or other memory technology compatible with the processing technology used to form the semiconductor portion of the integrated circuit 201. Alternatively, the calibration storage circuit may be formed in the package but on a structure separate from the semiconductor substrate, and may use a memory technology not necessarily compatible with the integrated circuit 201.

The integrated polymer electro-optic semiconductor circuit 201 may further include at least one second region of the optical polymer stack positioned proximate to a bias resistor 136, also shown in FIG. 1A. An unpoled region of the electro-optic layer 128 including at least one second order non-linear optical chromophore may form a portion of a thermo-optic bias device 218 configured to uniformly phase shift a phase modulated light signal transmitted therethrough. The bias device 218 is responsive to a voltage difference between bias signals Vc, Va received from the system (not shown) (or alternatively, as described below, from a voltage source driven by an integrated feedback circuit) and delivered to the bias resistor 136. The bias signals Vc, Va may be used to heat the region of the electro-optic layer 128 to produce a relatively stable phase offset to a light signal delivered through one of the active regions 120 to produce phase-matched modulated light signals. According to embodiments, the bias resistor 136 is driven to dissipate less than about 10 to 50 microwatts.

The optical bias device 218 can be used to tune the optical output to normally low or normally high at no pulse, may be used create zero crossings at desired points in the pulses, and/or may be used to compensate for device-to-device variations in response.

While the description of FIG. 2 presented heretofore has focused primarily on the electrical portions of the circuitry, optical structures are also present in the IC 201, as described above. Optical transmission paths are shown in long-short dashed lines to make them easier to see relative to the electrical portions of the circuit.

A coherent light signal 122 enters an input waveguide 220. Typically, the light 122 may be provided by a laser, such as an infrared fiber laser and/or distributed feedback laser (not shown) that may be located off chip. The light from an off-chip laser can be coupled to the input waveguide 220 using an optical coupler 221. Optionally, light can be launched into the input waveguide 220 from an integrated laser such as a vertical cavity stimulated light emission (VCSL) laser or a chip laser mounted on the top of the optical polymer stack 110. Light received along an orthogonal axis such as above or below a planar waveguide can be launched into the waveguide by a mirror formed in the optical polymer stack 110.

Light proceeds along the input waveguide 220, guided as described above, and is then split into two components by a splitter 222. From there, the two components propagate to the active regions as described above. The complementary driver circuit 202 drives one electrode 116a to increase in voltage and the other electrode 116b to decrease in voltage corresponding to the multiplexed data signal. Thus, light propagates faster along one active region of the two channel device 134 than the other region of the two channel device. The two phase-shifted channels are then recombined at a combiner 224. Because the input light is coherent, it may constructively interfere if the phase difference between the two channels corresponding respectively to electrodes 116a and 116b is substantially zero or a multiple of $2\pi$ radians offset. Alternatively, the combined light may destructively interfere at the combiner 224 if the phase difference between the channels is other than $2\pi$ radians phase offset, and may reach a maximum modulation depth, including up to substantial extinction, at odd multiples of $\pi$ offset. Thus, the complementary pulses with which the electrodes 116a and 116b drive the two optical channels may be converted from complementary optical phase modulation to optical amplitude modulation. After the light channels are combined, the modulated light propagates out along an output waveguide 226, which may be coupled to other optical devices and/or be transmitted off-chip through an output fiber coupler 221.

The (minimum) voltage at which maximum modulation depth occurs in a device may be referred to as $V\pi$. Depending on context, $V\pi$ may refer to a voltage magnitude applied to each of two push-pull electrodes or a voltage applied to a single modulation channel. Second order non-linear optical chromophore-based electro-optic devices generally have an advantage over prior art electro-optic devices with respect to operating with a smaller $V\pi$. In particular, second order non-linear optical chromophore-based electro-optic devices may be configured to reach acceptable modulation depths when driven at a $V\pi$ as low as voltages that may be directly output by relatively low voltage semiconductor devices, including CMOS devices. Acceptable performance of non-linear chromophore-based push-pull Mach-Zehnder modulators has been achieved at a drive voltage of less than 2 volts, making such materials and devices compatible with conventional on-chip semiconductor voltages.

Material (cladding, host polymer, chromophore) chemistry, properties, and interactions are important for achieving acceptable performance, service life, environmental range, and compatibility with semiconductor, metal, and oxide surfaces. Particular materials that meet known application needs including low voltage modulation compatible with integration over a conventional integrated circuit are described in detail below.

Optionally, an integrated feedback circuit 228 may be configured to measure the modulated light output signal delivered to the output waveguide 226. The feedback circuit 228 may determine the bias voltage Vc and/or Va that drive the bias resistor 136.

For example, the feedback circuit 228 may include a coupling waveguide 230 configured to evanescently receive a small portion of the output signal from the output waveguide 226. The thus tapped light signal may be converted to an electrical signal by a photodetector 232. An analog-to-digital converter 234, which for example may be formed from one or more comparator circuits, may be sampled by an embedded microcontroller 236 at one or more frequencies selected to determine a depth of modulation.

For example a short range modulated light signal may have a desired modulation depth of about 5 dB or more. A long range modulated light signal may have a desired modulation depth of about 20 dB or more. The microcontroller 236 may be operatively coupled to control the gain of an amplifier or attenuator 238 that drives the bias voltage across the bias resistor 136. Additionally or alternatively, the microcontroller 236 may be operatively coupled to control the gain of the driver circuit 202.

FIG. 3 is a flow chart illustrating a method 301 for making an electro-optic polymer semiconductor integrated circuit, such as embodiments shown in FIGS. 1A, 1B, and 2, for example, according to an embodiment.

In step 302, an integrated semiconductor electrical circuit may be formed, for example by using conventional MOS, NMOS, PMOS, or CMOS to form an integrated semiconductor circuit 102. Alternatively, the semiconductor integrated electrical circuit may be fabricated or purchased in the form of a partially or fully processed semiconductor wafer. For electro-optic modulator technologies such as lithium niobate that require higher modulation voltages than the approximate 2 volts or less required by an electro-optic chromophore modulator, other semiconductor technologies that output higher voltages, such as MOS or BiCMOS, may be used to form the semiconductor integrated circuit 102. Optionally, other semiconductor technologies such as III-IV semiconductors may be used to form the semiconductor integrated circuit.

As described above, the semiconductor integrated circuit may include one or more doped semiconductor junctions configured to provide a signal to or receive a signal from the at least one electrode. For example, a doped semiconductor junction may form an output transistor configured to drive the at least one electrode. For example, the at least one electrode may be toggled relative to a ground electrode that is later formed above the optical polymer stack or may maintain the at least one electrode at a selected voltage relative to a toggled electrode that is later formed above the optical polymer stack.

Proceeding to step 304, the surface of the integrated semiconductor circuit can be planarized. The planarization layer may be formed from a variety of transparent or opaque materials. According to an embodiment, the planarization layer may be formed from a heat-reflow material, such as phosphorous- or boron-doped silicon dioxide for example. The planarization layer may additionally or alternatively be mechanically planarized, etched to a planar configuration, be chemical mechanical planarized (CMP), etc. According to an embodiment, the planarization layer may be formed from a material such as a sol-gel, OSG, etc. In some embodiments, it may be desirable to select a planarization material that is relatively transparent and non-scattering to a wavelength of light that is propagated through the optical polymer stack. Forming the planarization may include spinning, spraying, or otherwise applying the planarization material, followed by grinding, polishing, etching, CMP, and/or heat reflowing to planarize.

Optionally, planarization may be provided by application of the bottom clad. In such cases, step 304 can be omitted.

According to an embodiment, planarization produces a surface with a roughness of about 10 nanometers root-mean-average (RMA) or less and a flatness less than or equal to about ±10 microns total thickness variation (TTV).

Proceeding to step 306, a bottom electrode can be formed. The bottom electrode formation step 306 may include etching and filling one or more vias through a planarization layer and/or an insulator layer to one or more conductive pads. The surface of IC can be sputtered, for example with gold or aluminum, and etched to form a patterned seed layer. The patterned seed layer can then be plated to a desired thickness. According to an embodiment, the bottom electrode is planar to about 10 nanometers RMA to minimize optical loss. Alternatively, the bottom electrode can be allowed to be non-planar, and losses can be minimized by planarization provided by the bottom clad.

Optionally, at least one IC conductive layer, such as an upper metal layer, can be plated. This may be used to increase the thickness of the at least one electrode and thereby increase its current carrying capacity.

Steps 302, 304 and 306 result in providing a semiconductor integrated circuit including a plurality of ground electrodes operatively coupled to a plurality of semiconductor junctions. One or more of the steps 302, 304, and 306 may be carried out at a facility that also performs additional steps described below. Alternatively, the semiconductor integrated circuit may be provided by purchasing the circuit from a supply partner.

Proceeding to step 308, the integrated circuit, for example in the form of a processed silicon wafer, has at least a portion of an optical polymer stack applied. At least a portion of the optical polymer stack includes forming at least a bottom cladding layer over the planarized semiconductor integrated circuit, and forming an electro-optic polymer layer including second order non-linear chromophores over the bottom cladding layer.

The bottom cladding layer can include, for example, a polymer, an electro-optic polymer with a lower refractive index than the electro-optic polymer layer, an organic-inorganic hybrid, an inorganic material, or a combination thereof.

Additionally, step 308 can include fabricating additional light guiding structures. In some embodiments, the light guiding structure includes an optical waveguide in the form of a trench, a side clad, a channel, a rib, a quasi trench, or a quasi rib. A top cladding layer and a polling electrode may be formed over the electro-optic layer.

Proceeding to step 310, at least portions of the second order non-linear optical chromophores in the electro-optic polymer adjacent the electrodes are poled and cured to substantially fix the alignment of the chromophores in the electro-optic polymer layer in their poled orientation.

A poling apparatus may include a poling electrode that is held in contact with the surface of the partial optical polymer stack, or a corona discharge mechanism such as a high voltage grid above the surface in which charges are introduced to the surface through ionization of a gas. Typically, in either approach, poling is performed under a substantially inert gas such as helium, nitrogen, or argon. The entire semiconductor wafer or at least the electro-optic polymer layer is cured while the poling voltage is maintained. For example, the assembly may be raised to a temperature of approximately 140 degrees C. while a poling voltage of about 400 to 1100 volts is held across the electro-optic polymer layer. According to some embodiments, the poling voltage may be about 600-1000 volts, and more specifically between 750 and 950 volts. The temperature and poling voltage may be maintained for about 1-2 minutes, the voltage holding the poled orientation of the chromophore molecules while a host polymer is cross-linked to "trap" the chromophores in their poled orientation. Alternatively, a UV or other radiation cured host polymer may be used and curing may include application of cross-linking radiation instead of or in addition to the application of heat. Alternatively, the chromophores themselves may include cross-linking portions and the chromophores may covalently bond to a host polymer and/or to one another to maintain orientation. Alternatively, the host polymer may be fully linked, and curing can include simply lowering the temperature to below the glass transition temperature, $T_g$, of the electro-optic polymer.

In some embodiments, the poling electrode may be wider than a trench, rib, quasi trench, or quasi rib guiding structure so that the electric field generated between the poling electrode and ground electrode is wider than the waveguide. For the rib or quasi rib forms, a top cladding layer or portion of a top cladding layer may be thicker in areas adjacent to the waveguide than in the area between the waveguide and poling electrode. In another embodiment, the electro-optic polymer layer includes a quasi trench and the polymer stack further includes a first polymer side clad and a second polymer side clad adjacent to the quasi trench and overlying the bottom clad layer.

Typically, the poling temperature is within ±15° C. of the glass transition temperature (Tg) of the electro-optic polymer layer; but the poling temperature may be another temperature at which the chromophores are mobile enough for alignment at a given poling field voltage. Further maintenance of the poling temperature may be sufficient to induce curing. Alternatively, the temperature may be raised or lowered to allow curing to progress.

Proceeding to step 312, the remainder of the optical polymer stack is applied and cured. This step may include stripping a poling electrode, if used, prior to applying one or more additional layers. The poling electrode may be removed, for example, by wet etching, dry etching, or a combination thereof. After the poling electrode is removed, the surface may be treated with, for example, plasma, adhesion agents, solvents, or any combination thereof to improve surface quality and adhesion of the upper cladding layer.

A polymer top cladding layer is formed over the electro-optic polymer layer. Depositing the upper cladding layer (or other layer) may include, for example, spin deposition, dip coating, screen printing, evaporation, chemical vapor deposition, sputtering, vacuum deposition, etc. In some embodiments, the top cladding layer is formed from photo-cross-linkable epoxies or a photo-cross-linkable acrylates.

Proceeding to step 314, a plurality of conductive vias are formed through the polymer bottom clad layer, the electro-optic polymer layer, and the polymer top clad layer. For example, such vias may be formed by etching the cured materials and filling the etched voids with a conductive material. The conductive material may include a vacuum deposited metal such as gold or aluminum, or a conductive polymer. Optionally, the etched holes may be lined with an insulating material such as an insulating polymer or other material prior to filling with a conductive material. Alternatively, conductive vias may not be formed and instead gold wirebonds or other structure may be formed to operatively couple portions of the semiconductor circuit to the top electrodes.

Proceeding to step 316, top electrodes are formed. For example top electrodes may include high speed strip electrodes. Alternatively, ground electrodes may be formed on top of the optical polymer stack and the electrodes formed from the at least one semiconductor integrated circuit metal layer may be configured as high speed electrodes.

In optional step 318, the top electrodes may be plated. Plating may be used to increase the current carrying capacity of the top electrodes, and may be especially useful when the top electrode is configured to be voltage toggled.

After the top electrodes are formed (and optionally plated), the process 301 proceeds to optional step 320. In step 320, at least one performance parameter of at least one optical modulation channel is characterized. An optical modulation channel is formed by a corresponding group of a ground electrode, high speed electrode, and poled electro-optic polymer portion. As described in part above, the relative phase, frequency response, extinction ratio, optical loss, and/or other aspects of performance of an electro-optic device may vary according to variations in chemistry, the fabrication process, design, manufacturing equipment or other effects. To provide a relatively uniform response from part to part, it may be desirable to provide to a host system an indication of one or more performance parameters. If, for example, a given device is determined to have somewhat higher optical loss than nominal (but below allowable limits), a system may provide a higher output illumination source into the device to compensate for the higher loss. In another example, if a given amplitude modulation device is found to have somewhat less that complete extinction of light at a nominal off state, then the $V\pi$ modulation voltage may be increased somewhat to achieve more complete extinction (destructive interference) of the light.

In step 320 (which may optionally occur after singulation and/or device packaging) device performance is characterized by measuring a response. According to an example, optical probes may be inserted into the optical polymer stack at locations correlated to a light input location and a light output location. The device may be operated, for example using a bed of nails or other probe, to modulate light received from the test apparatus. An optical signal received at the output optical probe may be measured, compared to nominal values, and a calibration value determined. The calibration value may directly represent a measured response, or alternatively may be a value that corresponds to the response in a known way. According to an embodiment, one or more response aspects may be measured, combined, and the combined value used to access a look-up-table (LUT) to determine a calibration value.

Proceeding to step 322, the calibration value (or a data value corresponding to the calibration value) may be recorded on the integrated circuit for future reference by a system. Optionally, the calibration value may be stored and later written to the integrated circuit after packaging.

Proceeding to step 324, the integrated circuit is packaged to include one or more optical couplers 221 and a plurality of package leads operatively coupled respectively to optical and electrical nodes on the die. As mentioned above, the optical performance of the integrated circuit may optionally be characterized and the calibration data written after packaging.

Optionally, for embodiments where characterization 320 is performed at the wafer level, if the optical polymer stack is found to be detective, the wafer may be reworked, as indicated at 326. Reworking may include etching to remove the detective polymer stack and then repeating processing to form the optical polymer stack.

FIG. 4 is a sectional diagram illustrating a poling configuration 401 used to make an integrated circuit configured for optical communication, according to an embodiment. As shown in FIG. 4, a bottom electrode 118 may be provided electrical continuity with a poling pad 402. The poling pad 402 may be disposed near the bottom electrode 118. Alternatively, the poling pad 402 may be disposed some distance from the bottom electrode 118. According to an embodiment, a poling pad 402 may be provided electrical continuity with a plurality of bottom electrodes 118. Optionally, a poling pad 402 may be configured to have electrical continuity with a plurality of bottom electrodes 118 when the assembly is in wafer form, and then the continuity may be broken (and optionally the poling pad discarded), when the integrated dice are singulated.

The embodiment of FIG. 4 also illustrates an alternative placement of the bottom electrode 118. For comparison, FIGS. 1A-1B illustrates a bottom electrode 118 that is formed at least partly from the topmost metallization layer disposed on the semiconductor integrated circuit 102. In comparison, the bottom electrode 118 of FIG. 4 is formed over a planarization layer 108. The configuration of FIG. 4 may be preferable in some embodiments for maintaining bottom electrode flatness.

With reference to FIG. 4, a contact electrode 404 may be placed to provide a first potential at an upper surface of the optical polymer stack 110. In the example shown, an upper poling electrode 405 is formed over at least a portion of the optical polymer stack 110, and a removable contact electrode 404 is placed in contact with the upper electrode 405. The contact electrode 404 may drive the upper electrode 405 or the surface of the at least partial optical polymer stack at a first poling potential.

A second removable contact electrode 406 may pierce or otherwise pass through the optical polymer stack 110 to make electrical contact with the poling pad 402. Since the poling pad 402 is in electrical continuity with the lower electrode 118, a second poling potential imposed by the second removable contact electrode 406 is communicated to the lower electrode 118. Accordingly, a poling voltage is provided across the electro-optic active region disposed between the upper 405 and lower 118 electrodes. While the first and second poling potentials provide a poling voltage to at least a portion of an active electro-optic chromophore region disposed proximate the electrodes, the electro-optic active region 120 and other uncured portions of the optical polymer stack 110 may be cured as described above.

The top poling electrode 405 formed at the surface of the optical polymer stack prior to applying the poling potential may include a temporary top poling electrode that is in place during poling. In such an embodiment, the top poling electrode 405 may be subsequently removed from the surface of the optical polymer stack after poling and curing the electro-optic polymer, according to procedures described above. Alternatively, poling may be performed after substantially the entire optical polymer stack 110 is formed. In such embodiments, the upper poling electrode may be an upper electrode 116, 136 that remains with and is configured to modulate the device.

As an alternative to the configuration of FIG. 4, a conductive via may be formed to couple to the poling pad 402 and electrical contact made to the conductive via during poling. The poling pad 402 is configured to receive the poling voltage, either through a penetrating poling probe 406, through a conductive via (not shown), or by scraping the polymer stack 110 to expose the poling pad 402. Generally, the poling pad 402 is only exposed to a source of the poling voltage during a manufacturing process. The poling pad 402 and/or the upper poling electrode 405 may be removed after poling. In operation, the lower electrode 118 may be configured to receive a modulation voltage from a driver circuit portion 408 and the upper electrode 116 may be configured to receive a modulation voltage from a second driver circuit portion 410. To protect the semiconductor integrated circuit portions 408, 410 from dielectric breakdown damage during poling, the poling electrode 405, which is electrically isolated from semiconductor circuitry, typically receives a poling voltage while the poling pad, and hence the bottom electrode, is held at ground. Subsequent to poling, a conductive via 412 may be formed to form a conductive path between the top high speed electrode (not shown) and a conductive pad 414.

Figure 6:
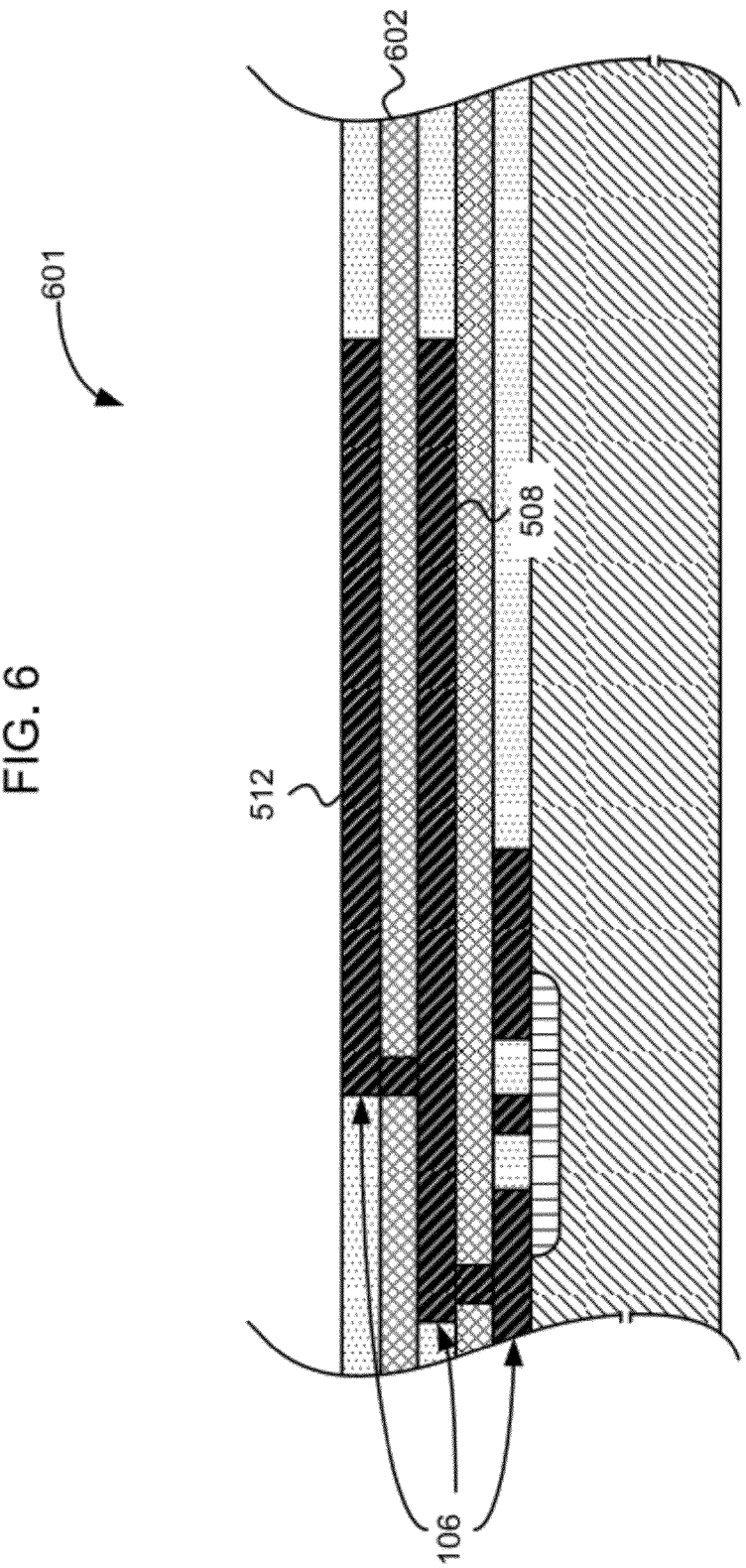
FIG. 6 is a side sectional view of a planarized semiconductor integrated circuit configured to drive a bottom electrode of an electro-optic device, according to another embodiment.
Figure 7:
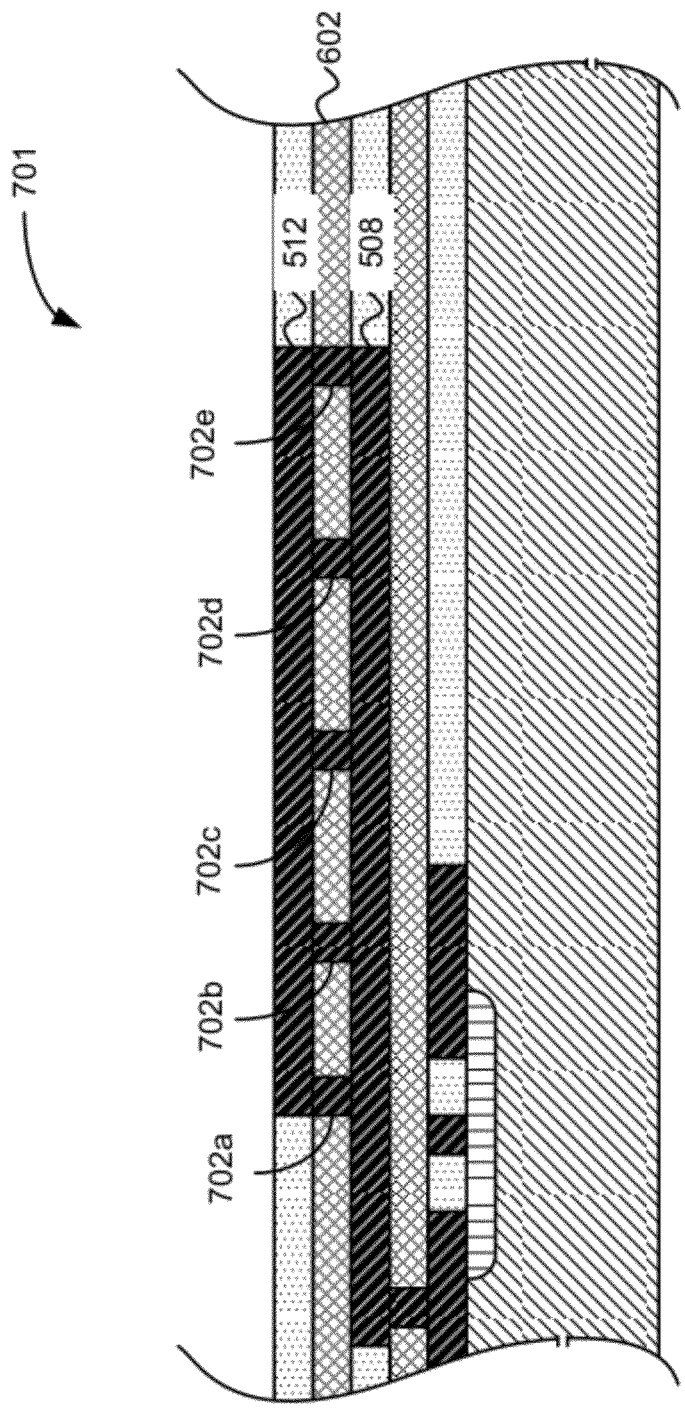
FIG. 7 is a side sectional view of a planarized semiconductor integrated circuit configured to drive a bottom electrode of an electro-optic device, according to another embodiment.

FIGS. 5, 6 and 7 illustrate embodiments for forming bottom electrodes that include semiconductor metallization layers in the circuit layer 105

FIG. 5 is a partial side sectional diagram of an integrated circuit configured for optical communication 501, according to an embodiment.

A semiconductor integrated circuit 102 includes a semiconductor substrate with at least one conductor layer 106 formed at or near its top surface. Semiconductor devices 502, 504 may be formed in regions of a patterned doped layer at the surface of the semiconductor substrate, such as by methods including p and n doping, etc. The conductor layer 106 may be formed as a single conductor layer, for example. Alternatively, the conductor layer 104 may include one or more of a plurality of conductor layers 506, 508, 510.

According to an embodiment, a portion of the conductor layer 106 may be formed by successively forming a first layer of conductive material 512 and then a second layer of conductive material 514 one above the other. Such successively formed layers may be made such that the successive layers are substantially in direct contact with one another, such as with no intervening material or with only a relatively thin adhesion layer formed therebetween.

FIG. 6 is a side sectional view of a planarized semiconductor integrated circuit 601 configured to drive a bottom electrode of an electro-optic device, according to another embodiment.

The conductor layer 106 may include an upper layer 512 of a plurality of conductor layers 106. An upper conductive layer 512 may be formed over one or more similarly shaped lower (e.g. "buried") conductor layers 508, but with one or more layers of insulating material 602 disposed therebetween.

FIG. 6 is a side sectional view of a planarized semiconductor integrated circuit configured to drive a bottom electrode of an electro-optic device, according to another embodiment.

FIG. 7 is a side sectional view of a planarized semiconductor integrated circuit 701 configured to drive a bottom electrode of an electro-optic device, according to another embodiment.

Alternatively, the at least one conductor layer 106 may include an upper conductor layer 512 may be held in electrical continuity with one or more lower conductor layers 508, such as by forming and filling a plurality of conductive vias 702a, 702b, 702c, 702d, and 702e through one or more insulating layers 602 between the respective conductive layers 512, 508.

At least portions of the one or more conductive layers 106 may, for example, be formed to include a metal such as aluminum, copper, gold, and/or silver and alloys thereof. The one or more conductive layers 106 may additionally or alternatively be formed from a semiconductor material such as doped polysilicon.

Referring to FIG. 5, the conductive layer 106 may include a first portion 512 formed according to a photolithographically defined process such as CVD, etc. and a second portion 514 formed by electroplating the first portion. Accordingly, the actual and/or effective thickness of the conductive layer 106 may vary rather significantly, according to various embodiments. Additionally or alternatively, the conductive layer 106 may correspond to a conductive channel formed in the semiconductor substrate itself.

Referring to FIGS. 1A and 1B, one or more conductive layers 106 may be formed to provide separated structures 118, 138 as described above. Such separated structures 118, 138 may for example be formed as separated electrodes including, for example, ground electrodes or high speed strip electrodes. While the one or more conductive layers 106 is shown as being formed as separated structures 118, 138, alternatively the one or more conductive layers 106 may be formed as a substantially continuous structure, such as a ground electrode, for example.

Figure 8:
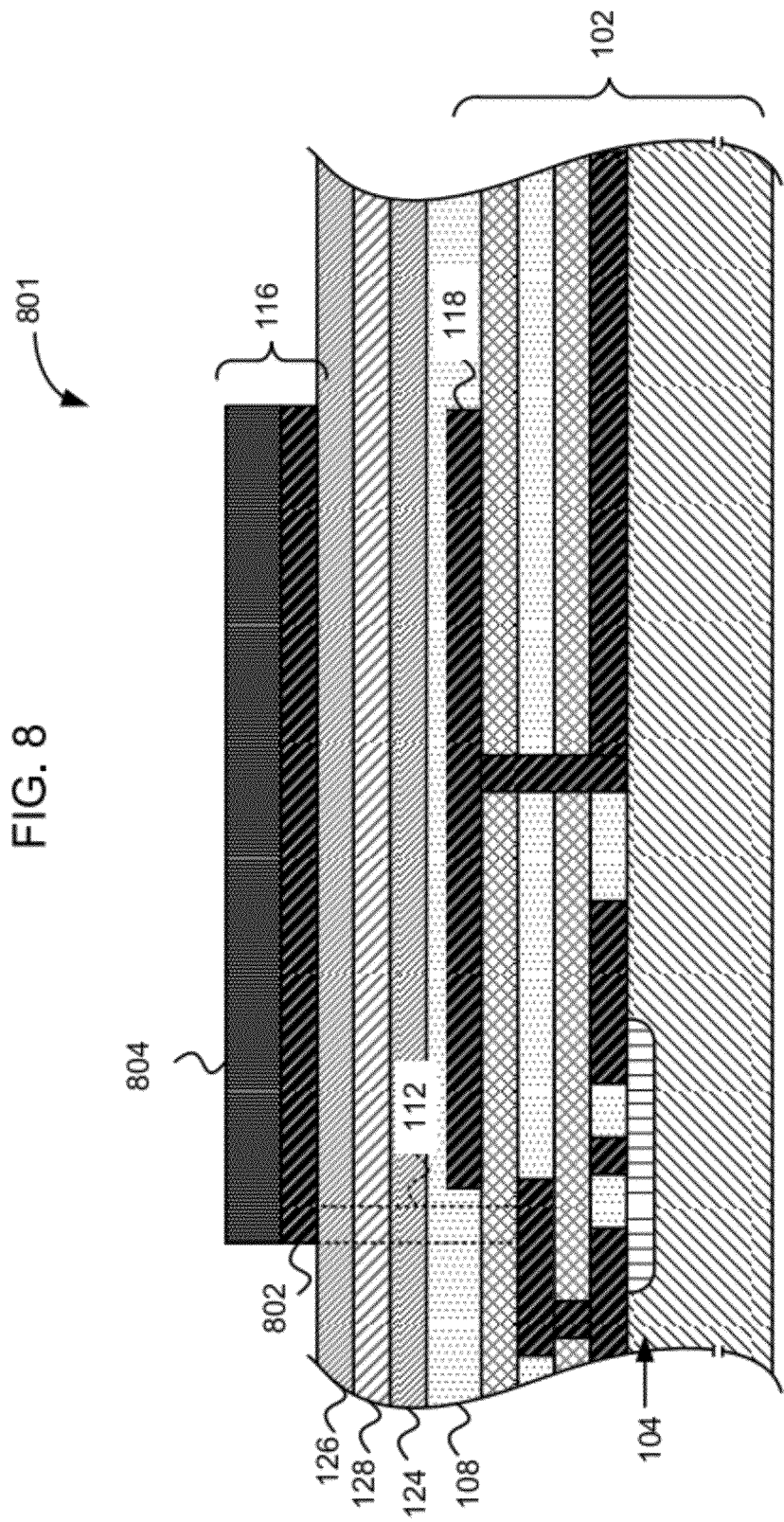
FIG. 8 is a side sectional view of an electro-optic polymer semiconductor integrated circuit including top and bottom electrodes, according to an embodiment.

FIG. 8 is a side sectional view of an electro-optic polymer semiconductor integrated circuit 801 including upper and bottom electrodes 116, 118, respectively, according to an embodiment. The upper electrode 116 may be formed from two layers 802 and 804 and may be driven by a semiconductor integrated device including a doped region 104 through a conductive via 112 as shown.

The optical polymer stack 110 may include one or more bottom cladding layers 124, a waveguide core 128, and one or more top cladding layers 126. Typically the refractive indices of the one or more bottom cladding layers 124, waveguide core 128, and one or more top cladding layers 126 are selected to guide at least one wavelength of light along the core. For example, the top and bottom clad layers 126, 124 may be selected have an index of refraction of about 1.35 to 1.60 and the waveguide core 128 may be selected to have a nominal index of refraction of about 1.57 to 1.9. According to one illustrative embodiment, the top and bottom clad layers 126, 124 have an index of refraction of about 1.50 and the waveguide core 128 has an index of refraction of about 1.74.

The at least one wavelength of light may include light in the C or L band at about 1510 to 1620 nanometers wavelength. According to one embodiment, the light is at about 1550 nanometers wavelength. According to embodiments, the one or more bottom clad, side clad, and/or one or more top clad layers may include materials such as polymers (e.g., crosslinkable acrylates or epoxies or electro-optic polymers with a lower refractive index than electro-optic polymer layer), inorganic-organic hybrids (e.g., "sol-gels"), and inorganic materials (e.g., SiOx).

According to an embodiment, at least a portion of the waveguide core 128 includes an electro-optic polymer core. For example, the electro-optic polymer core 120 may include poled electro-optic chromophores whose index of refraction is variable as a function of electric field strength passed therethrough. (Optionally, one or more portions of the bottom and/or top clad layers 124, 126 may also include electro-optic material.)

The electro-optic polymer may be, for example, a guest-host system, a side chain polymer, a crosslinkable system, or a combination thereof. Various taper and butted structures may form borders between non-electro-optic and electro-optic portions of the optical polymer waveguide core 128.

According to an embodiment, the voltage of the upper electrode 116 may be toggled and the voltage of the lower electrode 118 may be maintained at a relatively constant (e.g. ground) potential to produce the modulated electrical field across the electro-optic portion(s) 120 of the waveguide core 128. According to another embodiment, the voltage of the upper electrode 116 may be maintained at a relatively constant (e.g. ground) potential and the voltage of the lower electrode 118 may be toggled. According to another embodiment, the voltage of both the upper electrode(s) 116 and the lower electrode(s) 118 may be toggled, for example in opposing directions. When both electrodes 116 and 118 are toggled, the magnitude of respective voltage swings may be balanced according to the current carrying capacity of the respective conductive layers, for example with a greater voltage toggle being impressed upon a thicker conductor structure.

According to an embodiment, an electrical propagation velocity through one or more electrodes 116, 118 may be approximately matched to an optical propagation velocity through the light guiding structures 130 and the electro-optic core 120. For example, referring to FIG. 1A, an electrode 118 formed in the conductor layer 106 may receive an electrical pulse at its left end, with the electrical pulse then traveling left-to-right along the electrode 118 while light energy 122 also travels left-to-right through the electro-optic core 120. Similarly, an electrode 116 may receive an electrical pulse at its left end, the electrical pulse then traveling left-to-right along its length, parallel to light 122 travel through the electro-optic core 120. Such electrode structures may be referred to as strip electrodes. Such velocity matching between the electrical and optical signals may provide enhanced modulation bandwidth, cleaner modulated signals, etc. compared to alternative electrode structures.

Referring to FIG. 1B, a two optical channel device 134 such as a Mach Zehnder modulator, a single optical channel device 132 such as a phase modulator or other combinations may be formed according to various embodiments. A plurality of devices may be formed on a given die.

While the light guiding structures 130, aka waveguides, are shown as being formed using a trench waveguide approach, other waveguide structures may be used. For example a quasi-trench, rib, quasi-rib, side clad, etc. may be used singly or in combination to provide light guiding functionality.

Figure 9:
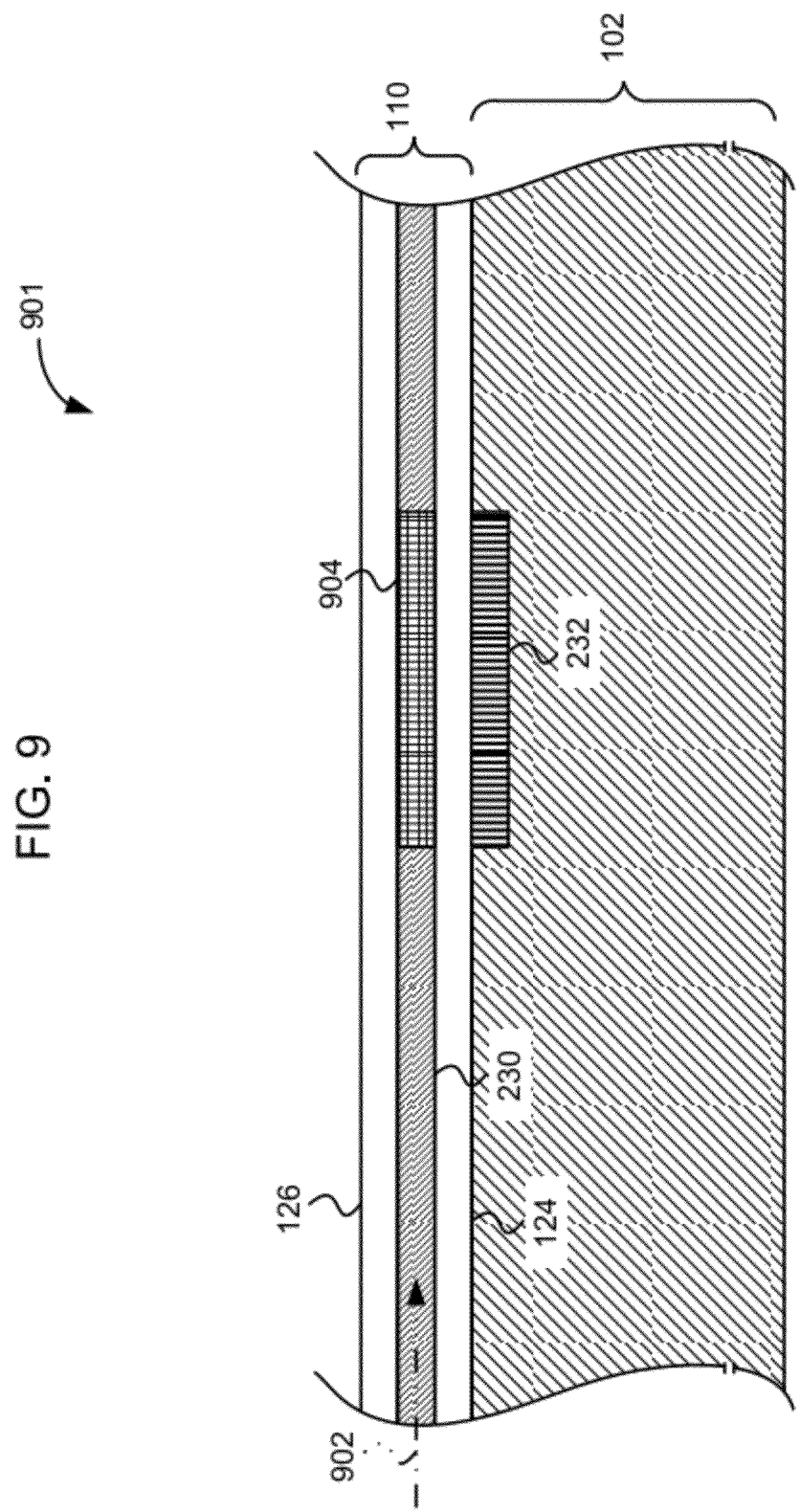
FIG. 9 is a sectional diagram of an integrated photodetector configured to provide a feedback signal to an integrated circuit with an optical data interface, according to an embodiment.

FIG. 9 illustrates an approach for forming the feedback photodetector 232 of FIG. 2, according to an embodiment. Tapped light 902 is received through the feedback waveguide 230 formed between the bottom and top cladding layers 124, 126. A scattering region 904 is formed to scatter the received tapped light 902. The scattering region may, for example, be loaded with a scattering agent such as titanium dioxide. Alternatively, the scattering region 904 may include one or more scattering faces etched into the waveguide 230 and configured to partially reflect, refract, or diffract the received light. At least a portion of the received light is launched downward where it is received and converted into an electrical signal by an integrated silicon photodetector 904. The integrated photodetector 904 may, for example, include a silicon photodiode.

Alternatively, the bottom of the output waveguide 226 (FIG. 2) or underlying bottom cladding layer 124 may be partially etched or otherwise modified to scatter a portion of the modulated output light travelling along the output waveguide 226 to impinge upon the integrated photodiode 904.

The photodetector 904 may be formed to include a photodiode, a photoresistor, or phototransistor. Alternatively, a photodetector may be coupled to the top surface of the optical polymer stack 104 and electrically coupled to the analog-to-digital converter 234 of FIG. 2. Alternatively, the photodetector 232 may include integrated analog-to-digital conversion circuitry, and a separate analog-to-digital converter may be omitted.

The chemistry, and resultant physical, optical, and electrical properties, of the optical polymer stack 110 can be important for achieving desired performance. Written description of preferred optical polymer compositions is provided next.

Optical Polymer Composition

According to embodiments, hyperpolarizable chromophores used in devices described herein may include second order nonlinear optical chromophores having the structure D-π-A, wherein D is a donor, π is a π-bridge, and A is an acceptor, and wherein at least one of D, π, or A is covalently attached to a substituent group including a substituent center that is directly bonded to at least two aryl groups, preferably three aryl groups. What is meant by terms such as donor, π-bridge, and acceptor; and general synthetic methods for forming D-π-A chromophores are known in the art, see for example U.S. Pat. No. 6,716,995, incorporated by reference herein.

A donor (represented in chemical structures by "D" or "D'" where n is an integer) includes an atom or group of atoms that has a low oxidation potential, wherein the atom or group of atoms can donate electrons to an acceptor "A" through a π-bridge. The donor (D) has a lower electron affinity that does the acceptor (A), so that, at least in the absence of an external electric field, the chromophore is generally polarized, with relatively less electron density on the donor (D). Typically, a donor group contains at least one heteroatom that has a lone pair of electrons capable of being in conjugation with the p-orbitals of an atom directly attached to the heteroatom such that a resonance structure can be drawn that moves the lone pair of electrons into a bond with the p-orbital of the atom directly attached to the heteroatom to formally increase the multiplicity of the bond between the heteroatom and the atom directly attached to the heteroatom (i.e., a single bond is formally converted to double bond, or a double bond is formally converted to a triple bond) so that the heteroatom gains formal positive charge. The p-orbitals of the atom directly attached to the heteroatom may be vacant or part of a multiple bond to another atom other than the heteroatom. The heteroatom may be a substituent of an atom that has pi bonds or may be in a heterocyclic ring. Exemplary donor groups include but are not limited to $R_2N$— and, $R_nX^1$—, where R is alkyl, aryl or heteroaryl, $X^1$ is O, S, P, Se, or Te, and n is 1 or 2. The total number of heteroatoms and carbons in a donor group may be about 30, and the donor group may be substituted further with alkyl, aryl, or heteroaryl. The "donor" and "acceptor" terminology is well known and understood in the art. See, e.g., U.S. Pat. Nos. 5,670,091, 5,679,763, and 6,090,332.

An acceptor (represented in chemical structures by "A" or "A'" where n is an integer) is an atom or group of atoms that has a low reduction potential, wherein the atom or group of atoms can accept electrons from a donor through a π-bridge. The acceptor (A) has a higher electron affinity that does the donor (D), so that, at least in the absence of an external electric field, the chromophore is generally polarized, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to —$NO_2$, —CN, —CHO, COR, $CO_2R$, —PO$(OR)_3$, —SOR, —$SO_2$, and —$SO_3R$ where R is alkyl, aryl, or heteroaryl. The total number of heteroatoms and carbons in a acceptor group is about 30, and the acceptor group may be substituted further with alkyl, aryl, and/or heteroaryl. The "donor" and "acceptor" terminology is well known and understood in the art. See, e.g., U.S. Pat. Nos. 5,670,091, 5,679,763, and 6,090,332.

A "π-bridge" or "electronically conjugated bridge" (represented in chemical structures by "π" or "π'" where n is an integer) includes an atom or group of atoms through which electrons may be delocalized from an electron donor (defined above) to an electron acceptor (defined above) through the orbitals of atoms in the bridge. Such groups are very well known in the art. Typically, the orbitals will be p-orbitals on double ($sp^2$) or triple (sp) bonded carbon atoms such as those found in alkenes, alkynes, neutral or charged aromatic rings, and neutral or charged heteroaromatic ring systems. Additionally, the orbitals may be p-orbitals on atoms such as boron or nitrogen. Additionally, the orbitals may be p, d or f organometallic orbitals or hybrid organometallic orbitals. The atoms of the bridge that contain the orbitals through which electrons are delocalized are referred to here as the "critical atoms." The number of critical atoms in a bridge may be a number from 1 to about 30. The critical atoms may be substituted with an organic or inorganic group. The substituent may be selected with a view to improving the solubility of the chromophore in a polymer matrix, to enhancing the stability of the chromophore, or for other purpose.

The substituent group (or any of multiple substituent groups) may be covalently attached to one or more of D, π, and A through a variety of linkages including single bonds, single atoms, heteroatoms, metal atoms (e.g., organometallics), aliphatic chains, aryl rings, functional groups, or combinations thereof. The substituent center may have multiple atoms (e.g., an aryl or aliphatic ring), may be a single atom (e.g., a carbon, silicon, or metal atom), or may be a combination thereof (e.g., a ring system where one aryl group is bonded to one atom of the ring system and the other two aryl groups are bonded to another atom in the ring system).

For example, in some embodiments the substituent center includes a carbon atom, a heteroatom, or a metal atom. In other embodiments, the substituent center may be a carbon atom, a silicon atom, a tin atom, a sulfur atom, a nitrogen atom, or a phosphorous atom. In an embodiment, the substituent center may be a 3-, 4-, 5-, or 6-membered ring like a benzene ring, thiophene ring, furan ring, pyridine ring, imidazole ring, pyrrole ring, thiazole ring, oxazole ring, pyrazole ring, isothiazole ring, isooxazole ring, or triazole ring.

The aryl groups bonded to the substituent center may be further substituted with alkyl groups, heteroatoms, aryl groups, or a combination thereof. For example, in some embodiments, the aryl groups may, independently at each position, comprise a phenyl ring, a naphthyl ring, a biphenyl group, a pyridyl ring, a bipyridyl group, thiophene group, furan group, imidazole group, pyrrole group, thiazole group, oxazole group, pyrazole group, isothiazole group, isooxazole group, triazole group or an anthracenyl group.

In an embodiment, the substituent group includes the structure:

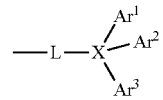

wherein: X is the substituent center; $Ar^1$, $Ar^2$, and $Ar^3$ are the aryl groups; and L is a covalent linker attached to D, π, or A. According to various embodiments, X may be C, Si, N, Sn, S, S(O), $SO_2$, P(O), aromatic ring, or P; $Ar^1$, $Ar^2$, and $Ar^3$ each independently include a substituted or un-substituted phenyl ring, a substituted or un-substituted benzyl ring, a substituted or un-substituted naphthyl ring, a substituted or un-substituted biphenyl group, a substituted or un-substituted pyridyl ring, a substituted or un-substituted bipyridyl group, a substituted or un-substituted thiophene ring, a substituted or un-substituted benzothiophenene ring, a substituted or un-substituted imidazole ring, a substituted or un-substituted thiozale ring, substituted or un-substituted thienothiophene group, substituted or un-substituted a substituted or un-substituted quinoline group, or a substituted or un-substituted anthracenyl group; and L includes the structure:

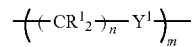

wherein: $R^1$ is independently at each occurrence an H, an alkyl group, or a halogen; $Y^1$ is —$C(R^1)_2$—, O, S, —$N(R^1)$—, —$N(R^1)C(O)$—, —$C(O)_2$—, —$C_6H_6$—, or —$OC_6H_6$—, thiophenyl; n is 0-6; and m is 1-3.

Donors, acceptors, and π-bridge moieties may include functional groups that may be covalently bonded to the L group.

According to embodiments, D includes:

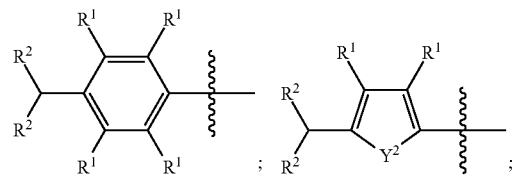

-continued
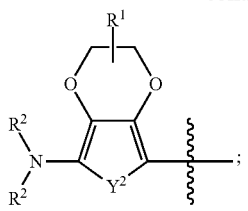
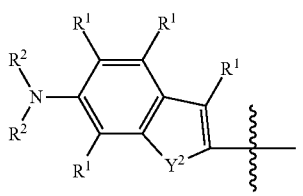
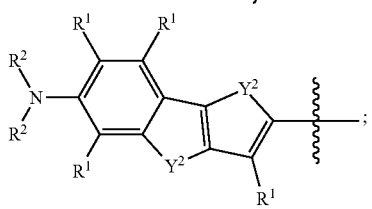
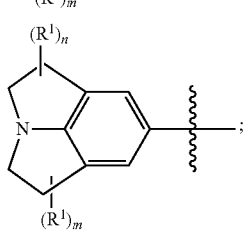
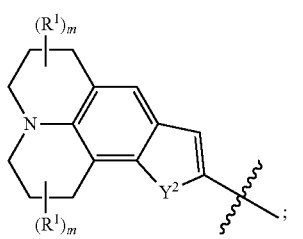
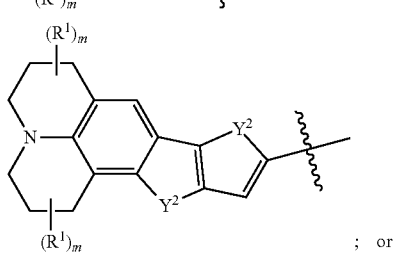
; or
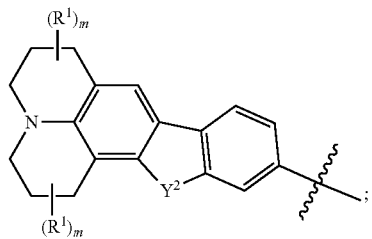
π includes:
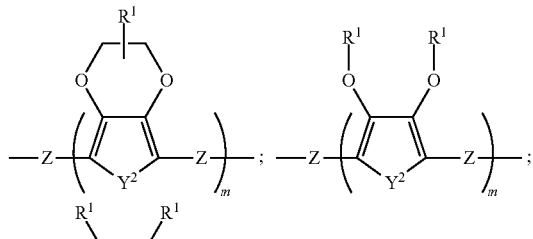
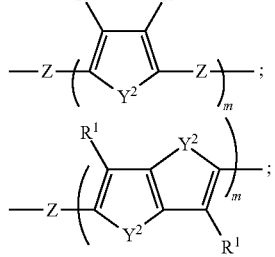
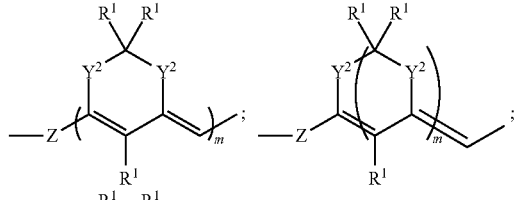
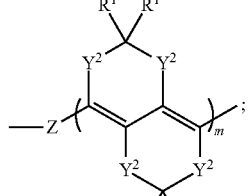
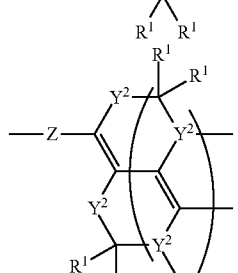
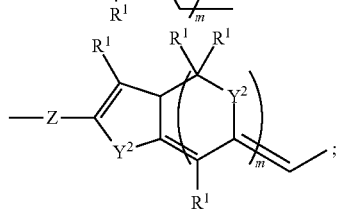

-continued

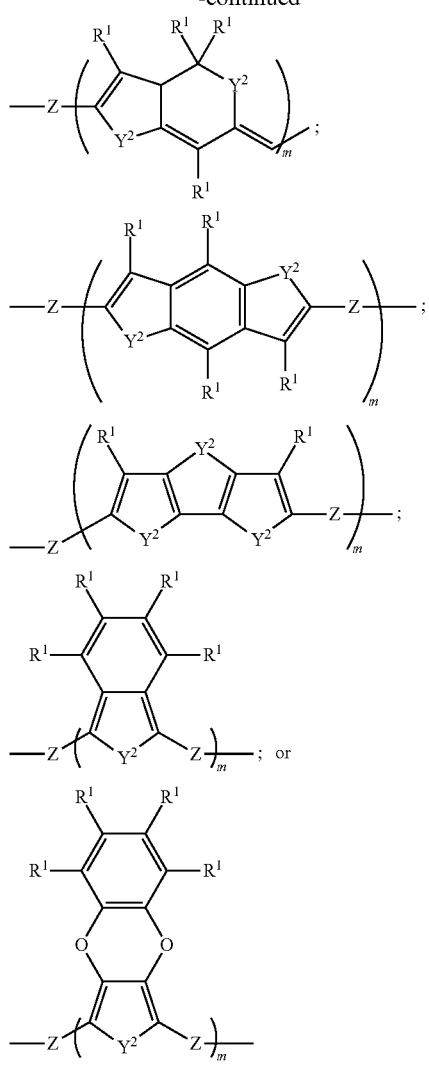

and
A includes:

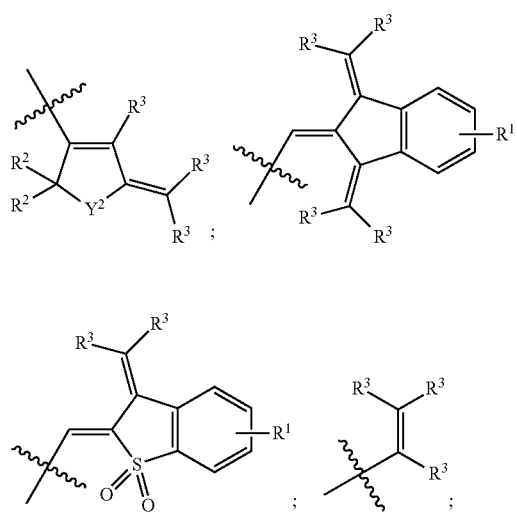

-continued

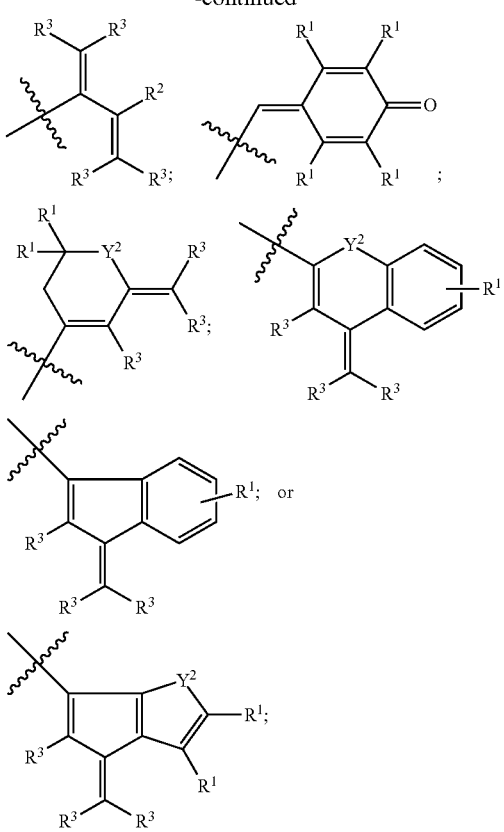

wherein: $R^1$, independently at each occurrence is H, an aliphatic group such as an alkyl or alkoxyl group, or an aryl group. $R^2$, independently at each occurrence, is an alkyl group, a halogenated alkyl group, a halogenated aryl group, or an aryl group with or without substitutions; Z is a single bond, —CH=CH—, —C≡C—, —N=N—, or —N=CH—; $Y^2$, independently at each occurrence, is $CH_2$, O, S, $N(R^1)$, $Si(R^1)$, S(O), $SO_2$, —$CH(R^1)$— or —$C(R^1)_2$—; $R^3$ independently at each occurrence is a cyano group, a nitro group, an ester group, or a halogen; and at least one $R^1$, $R^2$, or $R^3$ includes the substituent group. m is 1-6 and n is 1-4.

In another embodiment, D has one of the structures:

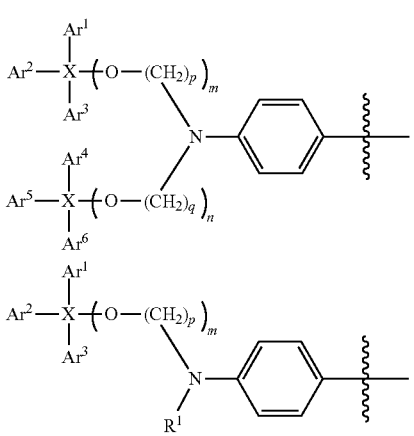

-continued

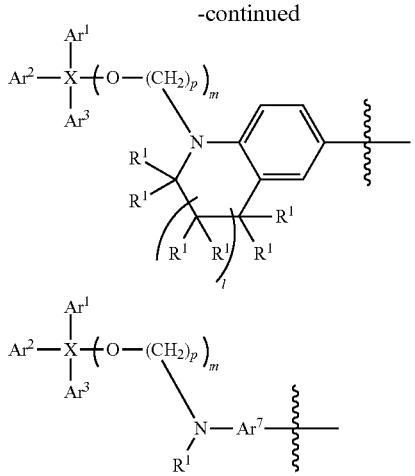

wherein X is a substituent center; $Ar^1$, $Ar^2$, $Ar^3$, $Ar^4$, $Ar^5$, and $Ar^6$ are aryl groups; $Ar^7$ is a conjugated aromatic group; $R^1$ of D independently at each occurrence is H, an alkyl group, a heteroalkyl group, an aryl group, or a hetero aryl group; p is 2-6; l is 0-2; m is 1-3; and n is 1-3; π includes:

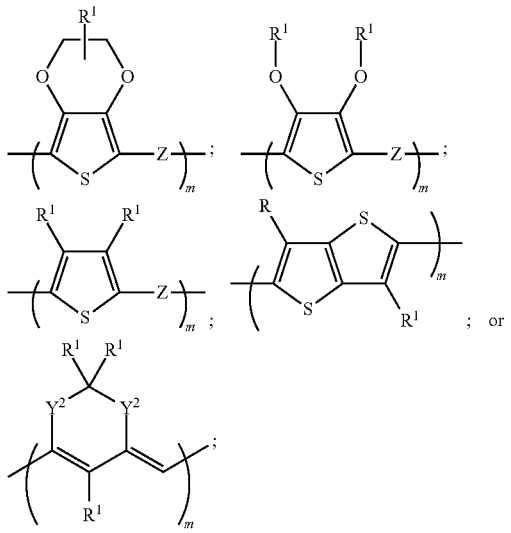

and A is:

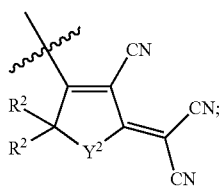

wherein: $R^1$ is independently at each occurrence an H, an alkyl group, or a halogen; Z is a single bond or —CH═CH—; $Y^2$ is O, S, —C(R^1)_2—; $R^2$ is independently at each occurrence an alkyl group or an aryl group; and m=1-3. In embodiments, the nonlinear optical chromophore includes one of the structures shown in FIG. 10 wherein X, $R^1$, and $R^2$ may be as described above.

According to an embodiment, a nonlinear optical chromophore has the structure D-π-A, wherein D is a donor, π is a π-bridge, and A is an acceptor; and wherein at least one of D, π, or A is covalently attached to a substituent group including at least one of:

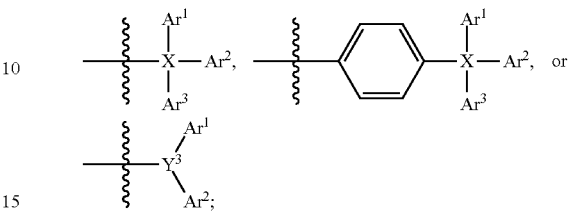

and wherein: X is C or Si; $Y^1$ is —C(R^1)_2—, O, S, —N(R^1)—, —N(R^1)C(O)—, —C(O)_2—; $Y^3$ is N or P; and $Ar^1$, $Ar^2$, and $Ar^3$ are aryl groups. The aryl groups, D, π, and A may be, as described above for example.

Other embodiments include electro-optic composites and polymers including one or more of the nonlinear optical chromophores described above. Typically, the polymer is poled with an electric field to induce electro-optic activity. Other techniques such as self-organization or photo-induced poling may also be used. The nonlinear optical chromophore may be covalently attached to the polymer matrix (e.g., as in a side-chain polymer or a crosslinked polymer) or may be present as a guest in a polymer matrix host (e.g., a composite material). The nonlinear chromophore may also be present as guest in the polymer matrix and then be covalently bonded or crosslinked to the matrix before, during, or after poling. Polymers that may be used as a matrix include, for example, polycarbonates, poly(arylene ether)s, polysulfones, polyimides, polyesters, polyacrylates, and copolymers thereof.

In some embodiments, bulky groups on the chromophore are used to change the Tg and to reduce the optical loss of electro-optic (EO) polymers by changing the physical interaction between polymer host and chromophore guest. We found that the physical interaction between host polymer and guest molecular can be increased by selecting specific chemical structure of the isolating (e.g., bulky) group on the chromophore. Physical interactions may include, for example, pi-pi interactions, size interactions that block chromophore movement significantly below Tg (e.g., there is not enough free volume in the polymer composite at Tg for translation of the bulky group, and hence the chromophore, which is generally required for chromophore relaxation), and preorganized binding interactions where the bulky groups fit preferentially into conformationally defined spaces in the polymer, or any combination thereof. In some embodiment, the physical interactions are controlled or supplemented by van der Waals forces (e.g., Keesom, Debye, or London forces) among the moiety of the bulky groups and aryl groups on polymer chains. Such non-covalent interactions may increase temporal stability below Tg and decrease optical loss while improving chromophore loading density and avoiding the deleterious effects of crosslinking on the degree of poling-induced alignment.

Pi-pi interactions are known in the art and may include interaction, for example, between a pi-system and another pi-system (e.g., an aromatic, a heteroaromatic, an alkene, an alkyne, or carbonyl function), a partially charged atoms or groups of atoms (e.g., —H in a polar bond, —F), or a fully charged atom or groups of atoms (e.g., —NR(H)_3^+, —BR(H)_3^−). pi-interaction may increase affinity of the chromophore guest for the polymer host and increase energy barriers to chromophore movement, which is generally required for chromophore relaxation and depoling. In some embodiments, pi-interactions may be used to raise the Tg of a polymer (e.g., by increasing interactions between polymer chains) or the Tg of a polymer composite (e.g., by increasing interactions between the polymer host and the chromophore guest). In some embodiments, the pi-interactions of the bulky groups increase the Tg of the polymer composite compared to when pi-interacting moieties on the bulky groups are replaced with moieties that have no or weak pi-interactions. In some embodiments, pi-interacting groups on the chromophore are chosen to interact preferentially with pi-interacting groups on the polymer chain. Such preferential interactions may include, for example, pi-interacting donors/acceptors on the bulky group with complementary pi-interacting acceptors/donors of the polymer chain, or spatial face-to-face and/or edge-to-face interactions between pi-interacting groups on the chromophores and polymer chains, or any combination thereof. In some embodiments, multiple interactions such as a face-to-face and face-to-edge between one or multiple moieties on the chromophore bulky group with multiple or one moieties on the polymer chain may increase interaction strength and temporal stability. The pi-interactions between the aryl bulky group/s on the chromophore and the aryl groups on the polymer may be enhanced by complementary geometric dispositions of the aryl groups that enhance the pi interactions (e.g., aryl groups tetrahedrally disposed around a substituent center in the chromophore bulky group may favorably pi-interact (e.g., stack) more efficiently with aryl groups tetrahedrally disposed around a carbon in the polymer backbone as shown in a top view (FIG. 23A) and the side view (FIG. 23B), with partial pi-interactions shown) from rotating 90° around the x-axis). In other embodiments, the polymer may be chosen because the chain adopts certain conformations and spatial distributions (e.g., preorganization) of pi-interacting groups that favor face-to-face (FIG. 24A) or face-to-edge (FIG. 24B) interactions with the pi-interacting groups on the chromophore. Some embodiments may have multiple face-to-face interactions between pi-interacting groups on the polymer and the chromophore (e.g., FIG. 24C) or a combination of face-to-face and face-to-edge pi-interactions (e.g., FIG. 24D). In other embodiments, pi-interacting donors generally have electron rich p-systems or orbitals and pi-interacting acceptors generally have electron poor p-systems or orbitals. In some embodiments, the bulky groups on the chromophore have pi-interacting donors or pi-interacting acceptors that are complimentary to pi-interacting acceptors or pi-interacting donors on the polymer chain. In some embodiments, such pi-interacting acceptors may include, for example, heterocycles such as pyridines, pyrazines, oxadiazoles, etc, and pi-interacting donors may include, for example, heterocycles such as thiophene, furan, carbazole, etc. The pi-interacting donors/acceptors may also include aryl groups that are electron rich/poor from electron donating/withdrawing substituents. In some embodiments, the bulky group includes at least one pi-interacting acceptor complementary to a pi-interacting donor on the polymer chain. In some embodiments, the bulky group includes at least one pi-interacting donor complementary to a pi-interacting acceptor on the polymer chain.

In some embodiments, the size of the bulky groups prevents translation/depoling of the chromophore in the polymer free volume significantly (e.g., 20° C.) below the Tg of the composite. In some embodiments, the bulky group is substantially 3-dimensional (e.g., the bulky group has bulk-forming moieties tetrahedrally or trigonal bipyramidally disposed around a substituent center atom rather than having a substantially planar or linear arrangement of the bulk-forming moieties around the substituent center atom). Such 3-dimensionality may reduce the possibility of the bulky group, and hence the chromophore, form translating through free volume compared to a planar or linear bulky group. The bulk-forming groups may independently comprise, for example, and an organic moiety having 5 or more carbon atoms. In some embodiments, the bulk-forming groups may independently comprise conformationally rigidified structures such as rings. The rings may be aliphatic, aromatic, or any combination thereof. In some embodiments, the bulk-forming groups may independently comprise aryl groups (aromatics, polycyclic aromatics, substituted aromatics, heteroaromatics, polycyclic heteroaromatics, and substituted heteroaromatics.

In other embodiments, the bulky groups fit preferentially into conformationally/spatially defined areas (e.g., pockets) of the polymer. Such areas may be referred to as preorganized for interaction with the bulky groups. Such preorganization may result from the polymer backbone adopting a predetermined conformation or from groups (e.g., pendant groups) of the polymer adopting predetermined conformation. In some embodiments, the preorganized area of the polymer may have pi-interacting groups, pi-interacting atoms, shape-interacting groups, H-bonding groups, etc that are spatially disposed to preferentially interact with complementary moieties on the bulky group. The interactions of the preorganized area on the polymer and the bulky group may comprise any interaction described above or any multiple combinations thereof. In some embodiments, preorganization provides additional stability compared to just the stabilizing interaction alone. For example, one part of the preorganized pocket may pi-interact with a pi-interacting moiety on the bulky group and another part of the preorganized pocket may interact with the same or different moiety of the bulky group with van der Waals forces.

In other embodiments, the chromophore may comprise more than one bulky group. In some embodiments, the chromophore has at least one bulky group on the donor and at least one bulky group on the p-bridge or acceptor. More than one bulky group on different parts of the chromophore may increase interactions with the polymer backbone and make translation and depoling more difficult.

Compatibility and stability of composites comprising chromophores having bulky groups with various host polymers were studied, including the EO properties. Low optical loss is achieved due to good compatibility, which also is proven by a clean, single Tg transition. EO coefficients with various host polymers are characterized and their thermal stability is monitored at different temperatures. Meanwhile, modulators were fabricated out of those EO composites and their stability is further confirmed.

Some embodiments have a chromophore structure that comprises bulky groups. Such chromophores show good compatibility with host polymers and lead to high glass transition temperature. Examples of two chromophores are shown in FIGS. 10-13. Guest-host systems were studied using these chromophores with various host polymers with different glass transition temperature. Host polymers such as 28, 29, and 30 in FIG. 15 belong to polycarbonate family with low to high Tg. In some embodiments, high Tg of the host polymers will lead to higher Tg of the EO composites with the same chromophore.

According to embodiments, EO composites having high Tg (>120° C.) may be fabricated by using a host polymer with a glass transition temperature>120° C. In other embodiments, EO composites having high Tg (>120° C.) may be fabricated by using a host polymer with a glass transition temperature>120° C. and a chromophore with a melting point or Tg>120° C. For example, an EO composite including chromophore 23b (FIG. 13) in 28 (Tg=286° C.) to have a composite Tg of 167° C. Similarly, results showed an EO composite including 23b chromophore in host polymer 29 (Tg=165° C.) to have a composite Tg of 193° C. Both systems showed improved stability for long term applications having a maximum service temperature of 85° C. Chromophore 23a has similar improved stability (Tables 1 and 2 below). In another embodiment, an electro-optic composite comprises greater than 35% loading by weight of a chromophore in a host polymer, wherein the Tg of the composite is higher than the melting point, or Tg, of the chromophore itself. In some embodiments, the chromophore loading by weight is at least 45% and the Tg of the composite is greater than 150° C. In another embodiment, the host polymer may be a semi-crystalline polymer with a low Tg that, when mixed with a chromophore, forms an amorphous composite with high Tg. In some embodiments, noncovalent interactions between bulky groups on the chromophore and moieties of the semi-crystalline host polymer increase the Tg of the amorphous composite.

According to embodiments, other host polymers with Tg higher than 150° C. may be used in combination with chromophores having bulky groups to produce composite EO materials having high Tg, and therefore high temperature stability over short and/or long terms. Illustrative high Tg host polymers may be formed from the following polymeric systems and/or their combinations: polysulfones; polyesters; polycarbonates; polyimides; polyimideesters; polyarylethers; poly(methacrylic acid esters); poly(ether ketones); polybenzothiazoles; polybenzoxazoles; polybenzobisthiazoles; polybenzobisoxazoles; poly(aryl oxide)s; polyetherimides; polyfluorenes; polyarylenevinylenes; polyquinolines, polyvinylcarbazole; and their copolymers.

According to an embodiment, an electro-optic polymer includes a nonlinear optical chromophore having the structure D-π-A, wherein D is a donor, π is a π-bridge, A is an acceptor, and at least one of D, π, or A is covalently attached to a substituent group including a substituent center X that is directly bonded to an aryl group, and wherein the electro-optic polymer has greater temporal stability than when an alkyl group is substituted for the aryl group. The electro-optic polymer may be a side-chain, crosslinked, dendrimeric, or composite material. According to an embodiment, the substituent center X is bonded to at least three aryl groups, and the electro-optic polymer has greater temporal stability than when alkyl groups independently are substituted for the aryl groups. According to an embodiment, the electro-optic composite has greater than 80% temporal stability at 85° C. after 100 hours.

Other embodiments include various methods for making electro-optic composites, and devices therefrom, where the electro-optic composite includes a chromophore as described above. According to an embodiment, a method includes: a) providing a polymer including a nonlinear optical chromophore having the structure D-π-A, wherein D is a donor, π is a π-bridge, A is an acceptor, and at least one of D, π, or A is covalently attached to a substituent group including a substituent center that is directly bonded to an aryl group; and b) poling the polymer to form and electro-optic polymer, wherein the electro-optic polymer has greater temporal stability than when an alkyl group is substituted for the aryl group.

Typically, an aryl group is sterically larger than an alkyl group. Typically, the polymer may be provided as a film by, for example, spin deposition, dip coating, or screen printing. The thin film may also be modified into device structures by, for example, dry etching, laser ablation, and photochemical bleaching. Alternatively, the polymer may be provided by, for example, molding or hot embossing a polymer melt. The poling may include, for example, contact or corona poling. In another method embodiment, the substituent center is bonded to or substituted with at least three aryl groups, and the electro-optic polymer has greater temporal stability than when alkyl groups independently are substituted for the aryl groups.

In some embodiments, the polymer is a composite. In some method embodiments, the aryl group is sterically larger than the alkyl group. In another method embodiment, the polymer has a $T_g$; the $T_g$ of the polymer is within approximately 5° C. compared to when an alkyl group is substituted for the aryl group, and the temporal stability of the polymer is greater compared to when an alkyl group is substituted for the aryl group.

Another embodiment is an electro-optic polymer comprising a nonlinear optical chromophore comprising the donor (24, FIG. 14):

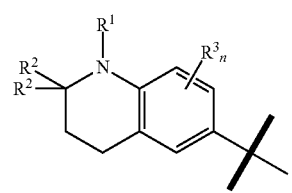

wherein $R^1$ independently comprises and alkyl, heteroalkyl, aryl, or heteroaryl group; $R^2$ independently at each occurrence comprises an H, alkyl group, heteroalkyl group, aryl group, or heteroaryl group; $R^3$ independently at each occurrence comprises a halogen, an alkyl group, and heteroalkyl group, an aryl group, or a heteroaryl group; and n is 0-3. Chromophores according to this embodiment may be prepared, for example, according to the general scheme 25 to 27 shown in FIG. 14. Chromophore according to this embodiment have good nonlinearity due to the strong donating group and can be derivatized with a number of functional groups at the $—R^1$ position. In one embodiment, $—R^1$ comprises a bulky group that interactions with the polymer host and the π-bridge includes a bulky group that interacts with the polymer host.

Other embodiments are electro-optic devices including the nonlinear optical chromophores, electro-optic composites, and electro-optic polymers as described above. The devices may include planar waveguides, free standing thin films, single and multi-mode optical waveguides, and other polymers that are passive (e.g., clad polymers such as acrylates). The devices may also have polymers having combinations of any one of the chromophores and/or with other nonlinear optical chromophores. Additionally, a particular device may have two or more different composites and/or polymers including any one of the chromophores above (e.g., a electro-optic waveguide core polymer having one chromophore with a relatively high refractive index and a clad polymer having either the same chromophore in less concentration or a different chromophore so that the refractive index of the clad is lower). In some embodiments, the electro-optic device includes a Mach-Zehnder interferometer, a Michelson interferometer, a micro-ring resonator, or a directional coupler.

EXAMPLES

Figure 11:
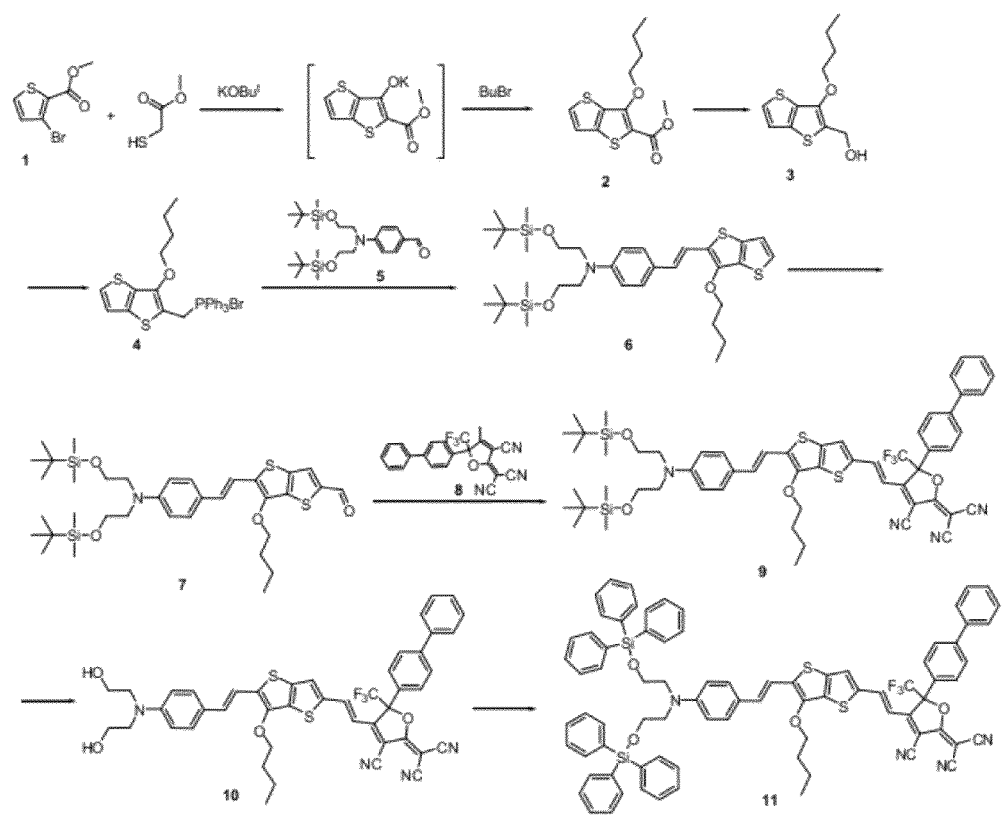
FIG. 11 shows a synthesis of an illustrative chromophore, according to an embodiment.

The following synthetic example refers to FIG. 11.

Compound 2:

To compound 1 (10.00 grams) in dioxane (50 ml) in ice bath was added t-BuOK (1M, 55 ml) and Methyl thioglycolate (5.279 grams). The reactants were heated to 80° C. for 2 hours and then to 120° C. for 30 min. Then, most of dioxane was distilled off. 1-Bromobutane (20 ml) and DMSO (80 ml) was added. The reaction was heated to 150° C. for 2 hours. After the reaction was cooled to room temperature, acetic acid in ice water was used to acidify the reaction. The product was extracted with dichloromethane. The dichloromethane layer was separated, dried over $MgSO_4$, filtered, and evaporated to give crude product, which was purified by column chromatography on silica gel to give 10.7 grams of liquid product 2.

Compound 3:

Compound 2 (7.72 grams) was dissolved in dry ether under nitrogen. The flask was cooled in dry ice-acetone cooling bath. $LiAlH_4$ (1.08 grams) was added. The cooling bath was removed so that the reaction temperature was brought to room temperature, at which the reaction was kept for 6 hours. The flask was cooled in ice bath. Methanol was added drop-wise to quench the reaction. Brine was added. The organic layer was separated. The aqueous layer was extracted with ether. The combined organic layers were dried over $MgSO_4$, filtered through silica gel packed in funnel. After evaporation, compound 3 was obtained in 4.65 grams.

Compound 4:

Compound 3 (4.65 grams) was dissolved in chloroform (100 ml). The flask was cooled in ice bath while triphenylphosphine hydrobromide was added. The reaction was stirred at 0° C. for 30 min, then room temperature for 14 hours, then refluxed for 3 hours. The reaction mixture was precipitated in ether two times to give 8.93 g of product 4.

Compound 6:

Compound 4 (6.71 grams) and compound 5 (5.22 grams) were mixed in dry THF (100 ml) under nitrogen and cooled in an ice bath. t-BuOK (1M in THF, 15 ml) was dropped into the mixture via needle. The reaction was stirred at room temperature overnight and quenched with water. The mixture was neutralized with acetic acid. The product was extracted with methylene chloride and purified by flash column using a hexane-methylene chloride mixture to give 3.10 grams of compound 6.

Compound 7:

Compound 6 (1.68 grams) was dissolved in dry THF (35 ml) under nitrogen. n-BuLi (2.5M, 1.15 ml) was dropped in via needle at −78° C. The reaction was kept at −30° C. for 70 min. Then, DMF (0.30 ml) was added via needle at −78° C. After 45 min, the reaction was terminated with ice water. The product was extracted with methylene chloride, dried over $MgSO_4$, evaporated, and purified by flash column to give compound 7 (1.32 grams).

Compound 9:

Compounds 7 (1.264 grams) and 8 (0.767 grams) (see U.S. Pat. No. 7,078,542 and references therein for preparation of acceptor compounds of this type) were mixed in 10 ml ethanol and 5 ml dry THF under nitrogen. The mixture was heated to 45° C. The reaction was monitored by TLC. When compound 7 disappeared from reaction mixture, the solvent was evaporated on rotary evaporator. The residue was purified by flash column and precipitation of methylene chloride solution in methanol to give 1.03 grams of compound 9 as black powder. U.S. Pat. No. 7,078,542 is incorporated by reference herein.

Compound 10:

A total of 5.69 grams of 9 was dissolved in THF (100 ml) under nitrogen. 5 ml of 2N HCl was added. The reaction was stirred at room temperature and monitored by TLC. When the compound 9 disappeared from the reaction mixture, methylene chloride (200 ml) and brine (100 ml) was added. The mixture was neutralized with saturated sodium bicarbonate solution. The organic layer was separated, dried over $MgSO_4$, evaporated, and purified by flash column successively to give 5.69 g of compound 10.

Compound 11:

Compound 10 (5.68 grams) was mixed with methylene chloride (50 ml). The flask was cooled in ice bath. triphenylchlorosilane (6.10 grams) and imadazole (1.40 grams) was added successively. The reaction was stirred and monitored by TLC. After about 30 minutes, compound 10 disappeared from the reaction mixture. The salt was filtered out. The product was purified by flash column and precipitation of methylene chloride solution in methanol to give 4.10 grams of compound 11.

Other chromophores were prepared using similar reactions and other starting materials. For example, when X=C, trityl chloride ($Ph_3C$—Cl) may be used in a reaction analogous to that for compound 11.

30 wt % of compound 11 in APC (APC=[biphenyl A carbonate-co-4,4'-(3,3,5-trimethylcyclo-hexylidene)diphenol carbonate] (28), see U.S. Pat. No. 6,750,603) showed very good EO activity of $r_{33}$=81 pm/V and very good temporal stability of 92% retention after 20 hours at 85° C. Temporal stability tests on a Mach-Zehnder modulator showed better than 95% retention of $V_\pi$ after 100 hours at 85° C.

Figure 12:
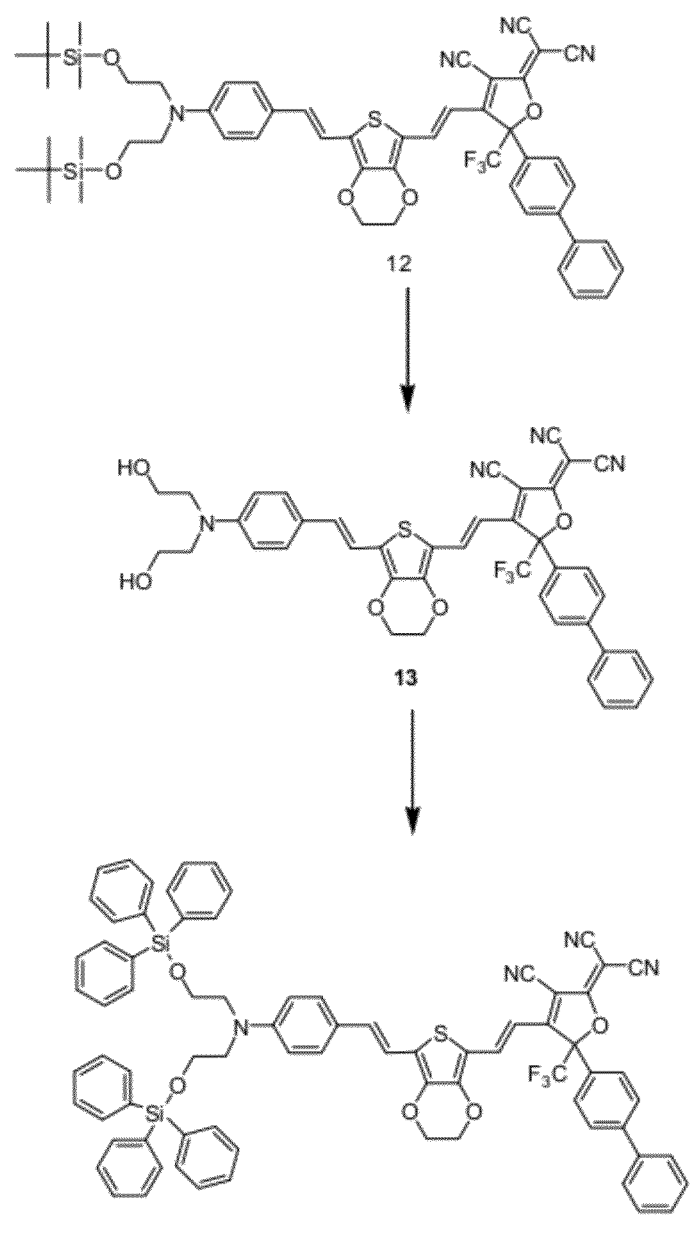
FIG. 12 illustrates the substitution of aryl groups onto another chromophore, according to an embodiment.
Figure 13:
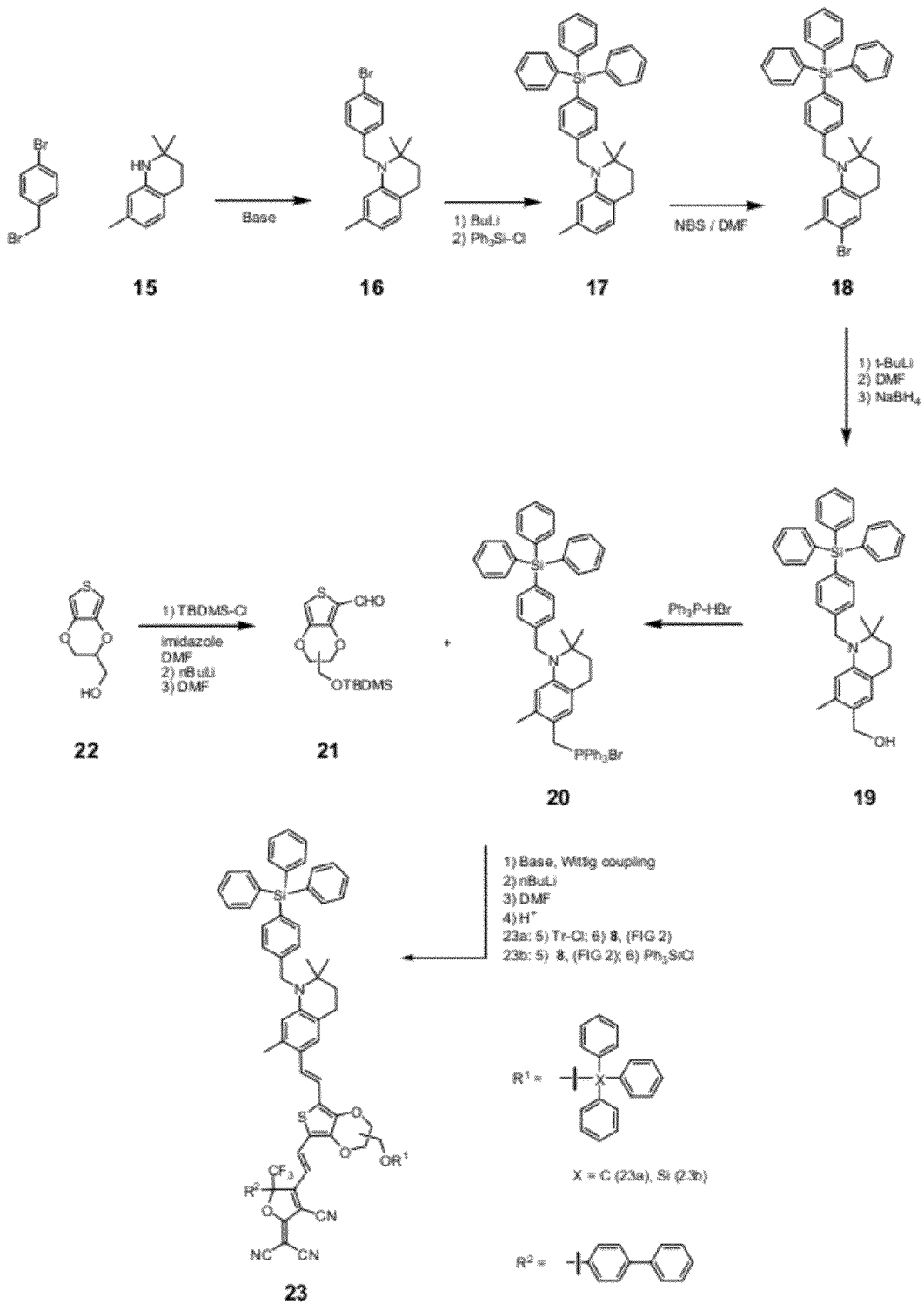
FIG. 13 illustrates the synthesis of chromophores including bulky substituents, according to an embodiment.

The following synthetic example refers to FIG. 12.

Compound 13:

Compound 12 was dissolved in 70 mL THF while 1N HCl solution (20 mL) was added. It was stirred at room temperature for 2 hours. The mixture was extracted with $CH_2Cl_2$, washed with $NaHCO_3$ solution and water, and dried over $MgSO_4$. After evaporating solvent under reduced pressure, it was purified by column chromatography with $CH_2Cl_2$/MeOH (5/0.5) as eluting solvents. At total of 1.65 g of compound 13 was obtained in 67% yield.

Compound 14:

Compound 13 (0.8 g, 1.07 mmol) and triphenylsilyl chloride (0.945 g, 3.2 mmol) were dissolved in 20 mL of $CH_2Cl_2$. After imidazole (0.22 g, 3.2 mmol) was added, the mixture was stirred at room temperature for 1.5 hours. It was then filtered and the solvent was removed under reduced pressure. It was purified by column chromatography to give compound 14 as a solid.

A 50% compound 14 in amorphous polycarbonate (APC) composite had an $r_{33}$ of 90 pm/V, an optical loss of 0.881 dB/cm, a $T_g$ of 140° C., an index of refraction of 1.6711 at 1.55 microns, and a temporal stability in Mach-Zehnder modulators similar to 30% compound 11 in APC as described above. A 24% compound 12 in APC composite, in which the aryl groups are substituted (replaced) with alkyl groups, had an $r_{33}$ of 50 pm/V, an optical loss of 1.44 dB/cm, $T_g$ of 140° C., an index of refraction of 1.6038 at 1.55, and a much lower temporal stability.

Compound 16:

To a 3-L three necked flask with a stir bar was charged 125 grams of trimethyl-tetrahydroquinoline (15), and 102 grams of anhydrous potassium carbonate ($K_2CO_3$). Set the flask with a condenser, and an additional funnel containing 173.3 grams of p-bromobenzyl bromide in 500 ml dry DMF. The air in flask was flash with nitrogen. 700 ml of dry DMF was added to flask. The flask was cooled in ice-water bath. p-bromobenzyl bromide was dropped into the flask from the additional funnel attached to flask while stirring is on. After completion of the addition, the reaction was kept at room temperature for 3 hours. The reaction was heated in 55-60° C. for 14 hours (overnight). The content was allowed to cool down to room temperature, 1 liter of hexanes was added to flask. After stirring for 10 min, the solid was filtered off. The solution was evaporated on rotary evaporator to dryness. The mixture was dissolved in ethyl acetate (1 L), washed with brine two times, dried over MgSO4, filtered, and evaporated. The product was purified by chromatography on silica gel packed in chromatographic column with hexanes/DCM as mobile phase.

Compound 17:

A 2-l flask equipped with additional funnel and stir bar was charged with 66.66 grams of compound 16 from previous step. The flask was degassed and filled with dry nitrogen. Anhydrous THF (800 ml) was added into flask. The flask was cooled in dry ice-acetone bath. n-BuLi (83 ml) was added from the additional funnel slowly. The reaction was kept at −60° C. for 2.5 hours. In another 3-liter 3-necked flask with 55.7 grams of triphenylchlorosilane and 200 ml anhydrous THF was prepared and cooed in dry ice-acetone bath. Under stirring, the lithiated solution from the first flask was added into the second flask with stirring during 1 hour. The reaction was stirred overnight and was quenched with acetic acid aqueous solution (0.19 mol acetic acid in 300 ml water) and some brine solution. The organic layer was separated and washed with brine once, dried over MgSO4, filtered, and evaporated to dryness. The product was purified by silica gel columns using hexanes/DCM as mobile phase.

Compound 18:

147 grams of compound 17 was dissolved in 1000 ml of dry DMF in a 3-L flask under nitrogen. NBS (51.23 grams) together with 500 ml of DMF was charged in an additional funnel. The flask was cooled in ice bath and wrapped with aluminum foil to keep light from the reaction. Te NBS solution was dropped into LM-667 drop wise. The reaction was stirred at room temperature overnight. DMF was evaporated. The mixture was stirred in Hexanes/ethyl acetate (3:1). The precipitation was filtered off. The solution was evaporated. The residual mixture was stirred in methanol. The solid was collected by filtering. Repeat the methanol wash one more time. The solid was purified by silica gel column chromatography (Hexane/DCM=2:1) and dried under vacuum. Yield of compound 18 is 95%.

Compound 19:

150 grams of compound 18 was charged into a 3-l 3-necked flask with a stir bar and additional funnel. The flask was flashed with nitrogen 4 times. 1200 ml of anhydrous THF was added via cannulation. The flask was cooled in dry ice-acetone bath. 286 ml of t-BuLi (1.7M) was added drop wise from the additional funnel. After completion of dropping, the funnel was washed with 25 ml of THF. Then, DMF (anhydrous, 35.81 g) in THF (200 ml) was added drop wise from the funnel. The cooling bath was removed to allow the reaction temperature to reach 0° C. in ice bath-water bath. The reaction was quenched with acetic acid aqueous solution (5:1) until PH value is about 7. Some brine and 500 ml of hexanes were poured into the mixture. The organic layer was separated, dried over MgSO4, filtered, and evaporated. The product was purified by silica gel column chromatography using hexane/DCM (3:1 to 1:1) and methanol wash. Yield of the corresponding aldehyde was 85%. The aldehyde (27.8 grams) was charged into a 1 liter flask with a stir bar. Dry THF (500 ml) was added. The mixture was stirred with some heat to form homogenous solution. The flask was cooled in ice bath. 1.86 grams of sodium borohydride (NaBH4) was added. The flask was flashed with nitrogen. 25 ml of ethanol in 50 ml THF was added from an additional funnel during two hours. The reaction was kept stirring at room temperature for 18 hours. The reaction is reached full conversion when the solution is near clear. When the reaction is finished, brine (50 ml) was added to the reaction and kept stirring for 45 min under high speed. The organic layer was separated, dried over MgSO4, evaporate. The product was purified with flash column chromatography using hexanes/ethyl acetate. The yield of compound 19 is 95%, which was used directly for next step without further characterization.

Compound 20:

A total of 25 grams of compound 19 was dissolved in chloroform (200 ml) in a 1-L flask. The flask was cooled in ice bath. Ph3PHBr (15.2 g) dissolved in chloroform (200 ml) was dropped into LM-671 during 1 hour or so. After stirring at room temperature for 3 hours, the reaction was reconfigured with Deans-Stark reflux trap to separate water by azeotropic removing chloroform-water distillate for 6 hours. The reaction was cooled down, evaporated to about 100 ml solution. This thick solution was precipitated in dry ethyl ether while stirring is on. The product collected by filtering was dissolved in DCM and precipitated again in dry ether. The greenish product was dried over vacuum for a day. Yield of compound 20 is 85%. Proton NMR was collected for characterize the compound structure.

Compound 21:

A Total of 0.1 mol of compound 22 in 200 ml dry dichloromethane in a flask was cooled in ice water. Imidazole (0.15 mol) was added. The flask was flashed with nitrogen. t-butyldimethylchlorosilane was added dropwise using syringe. The reaction was stirred for 1 hour. The precipitation was filtered out. The solution was washed with brine, dried over magnesium sulfate and evaporated. The product 10 was purified by flash chromatography over silica gel. The yield of the corresponding TBDMS ether is 85%. The TBDMS ether (8.37 g) was charged in a flask with a stir bar. The flask was degassed and refilled with nitrogen. n-Buli in hexane was added dropwise from a needle. The reaction was kept between −10° C. and −20° C. for 2 hours. Then DMF was added at −78° C. The reaction was quenched by acetic acid in water. The organic layer was separated, washed with brine, dried over magnesium, and evaporated. The product mixture of two regioisomers was purified by chromatographic column. The yield of compound 21 is 60%.

Compound 23:

To a flask, compound 20 (27.01 g) was charged and degassed. Dry THF was added to the flask. n-BuLi in hexane was added dropwise at −20° C. The reactants were stirred in ice bath for 1 hour. To a second flask, compound 21 (9.511 g) was dissolved in dry THF. The mixture in flask one was added to the second flask under cooling and stirring. The mixture was stir 16 hour at room temperature. The reaction was stop by adding water and some brine. The organic layer was separated, dried over magnesium sulfate, filtered, and evaporated to dryness. The mixture was purified by flash chromatography to give the corresponding Wittig coupling product in a yield of 66%. The coupling product was dissolved in dry THF in a flask with a stir bar. n-Buli in hexane was added using syringe. The reaction was kept at −20° C. for 2 hours. DMF in THF was added. The reaction was quenched by brine and acetic acid. The organic layer was separated, washed with water, dried over magnesium sulfate, filter using Buchner funnel, The mixture was purified by silica gel column chromatography using dichloromethane-hexane mixture as mobile phase to give the corresponding aldehyde. The aldehyde was dissolved in acetone in a flask under nitrogen. 3N HCl aqueous solution was added. The mixture was stirred at room temperature and monitored by TLC. When the reaction reached the end. The mixture was neutralized with saturated sodium bicarbonate solution. Acetone was evaporated. The product was extracted with THF and purified further by flash column chromatography using THF-DCM as mobile phase to give the corresponding deprotected alcohol. (23a): The deprotected alcohol in a flask was dissolved in dry dichloromethane. Trityl chloride, diisopropylethylamine, 4-dimethylaminopyridine was added. The reaction was stirred for 16 hours. The precipitation was filtered. The solution was washed with water, dried with magnesium sulfate, filtered, and evaporated. The product was purified with flash chromatography to give the corresponding trityl ether. The trityl ether and 2-dicyanomethylene-3-cyano-4-methyl-5-trifluoromethyl-5-(4'-phenyl)phenyl-2,5-dihydrofuran (8, FIG. 11) were mixed in ethanol in a flask. The reaction was heated at 60° C. for 6 hours. The content was cooled to room temperature. The mixture was filtered. The filtrate was purified by column chromatography combined with methanol or ethanol washed to give chromophore compound 23a; (23b) The deprotected alcohol and 2-dicyanomethylene-3-cyano-4-methyl-5-trifluoromethyl-5-(4'-phenyl)phenyl-2,5-dihydrofuran (8, FIG. 11) were stirred in ethanol in a flask under nitrogen at 60° C. The reaction was monitored by TLC. After 6 hours, the content was cooled to room temperature. The dark solid was collected by filtration on Buchner funnel. The material was further purified by silica gel column chromatography and re-crystallization to give a black powder of the chromophore-alcohol with a yield of 60%. The chromophore-alcohol was dissolved in dry dichloromethane in a flask with a stir bar. Imidazole and triphenylchlorosilane was added. The reaction was monitored by thin layer chromatography. After 30 min. the precipitation was filtered. The solution was washed with brine, dried over magnesium sulfate, filtered, and evaporated. The compound was further purified by flash column chromatography, crystallization and wash with hexanes. Yield of compound 23b is 70%.

Guest-host EO polymers were prepared with chromophores 23a and 23b with host polymers 28-30 (FIG. 15). The properties of the EO polymer are shown in Table 1 and Table 2. The number in parentheses behind the material reference numbers is the loading % by weight of the chromophore. High Tg of host polymers will lead to higher Tg of the EO composites with the same chromophore. In Table 1 and Table 2, composites with 29 show higher Tg than 28 composites with the same loading. The composites have similar optical loss and EO coefficient.

TABLE 1

Major EO properties of chromophore 23a.

| Property | 28-23a (50%) | 28-23a (55%) | 29-23a (50%) | 30-23a (55%) |
|---|---|---|---|---|
| $r_{33}$ @ 1.3 µm (pm/V) (corrected) | 92 | 95 | 90 | High leak through current |
| Optical Loss @ 1.55 µm (dB/cm) | 1.1-1.2 | 1.2-1.3 | 1.3 | 1.4 |
| Chromophore $T_g$ (° C.) | 159 | 159 | 159 | 159 |
| EO Polymer $T_g$ (° C.) | 175 | 174 | 199 | >202 |
| Refractive Index @ 1.5 µm (TM) (poled) | 1.7141 | 1.7300 | 1.7116 | 1.6793 (unpoled) |

TABLE 2

Major EO properties of chromophore 23b

| Property | 28-23b (50%) | 29-23b (50%) | 29-23b (55%) | 30-23b (55%) |
|---|---|---|---|---|
| $r_{33}$ @ 1.3 µm (pm/V) (corrected) | 87-107 | — | 80-95 | — |
| Optical Loss @ 1.55 µm (dB/cm) | 1.2-1.3 | 1.3 | 1.3 | 1.3 |
| Chromophore $T_g$ (° C.) | 157 | 157 | 157 | 157 |
| EO Polymer $T_g$ (° C.) | 167 | 199 | 193 | — |
| Refractive Index @ 1.5 µm (TM) (poled) | 1.7339 | 1.6625 (unpoled) | 1.7320 | 1.6926 (unpoled) |

To study the long-term stability of EO polymers, accelerated aging tests have been performed. In these tests the EO polymer films were poled using Indium Tin Oxide (ITO) as substrate. The poled samples were then sealed in a vacuum environment to avoid the possible oxygen related degradation and placed into ovens set at various elevated temperatures. The decay of the EO coefficient $r_{33}$ was monitored as a function of time up to 2000 hours. EO polymer composite 28-23a (50%) (Tg 175° C.) was studied at 85, 100, and 110° C. (FIG. 16A). At 85° C., $r_{33}$ remained at 94% of the initial $r_{33}$ after 2000 hours of testing. We also studied 28-23b (55%) and 29-23b (55%) at 85° C., 100° C., and 110° C. (FIGS. 16B, 16C, 16D, respectively). The Tg of 28 and 29 is respectively 167° C. and 193° C. The graphs FIGS. 16B-D show normalized tested $r_{33}$ values at aging times up to 1800 hours at each temperature. In FIG. 16B, a 29 composition showed stability marginally better than the 28 composition. The difference in stability is relatively small because of the large temperature difference between their respective Tg and the 85° C. test conditions. At 100° C. (FIG. 16C), the 29 system had 2.5% better stability than the 28 system. At 110° C. (FIG. 16D), the 29 system showed 9% better stability than the 28 system. The 29 system was found to have higher thermal stability than the 28 system at each temperature, with the difference in stability being more marked at higher application temperatures. The effect of the higher host polymer Tg was to significantly enhance the composite Tg, and hence to enhance the stability of the measured EO coefficient.

Among different models proposed in the literature we discovered that the one published by Lindsay et al., *Polymer* 48 (2007), 6605-6616 showed good consistency between the experimental data and model prediction and is most relevant to our work. We applied the isothermal aging model Jonscher equation:

$$V_\pi(t)/V_\pi(0)=1+(t/\tau)^j$$

together with Lindsay's hyperbolic tangent approach:

$$\ln(\tau/\tau_P)=E_R(1+\tan h[(T_c-T)/D])/2RT+E_P/RT$$

to model the temperature dependence of the relaxation and to derive the activation energy of our poled EO polymer systems. In the model, $E_R$ and $E_P$ are the activation energies of the rigid glassy state and the pliable state, respectively. $T_c$ and D are the central temperature and the width of the transition zone.

The experimental data and the curve fitting results using the Jonscher equation for 28-23a (50%) at three different temperatures 85, 100 and 110° C. are shown in FIG. 16E. It can be seen that there is a good consistency between our experimental data and the modeling results. Based on the Jonscher equation fitting, we obtained the fitting parameters τ (time constant) and j (the exponent) for all five temperatures tested. We then used these τ and j to further extrapolate the $r_{33}$ decay (or $V_\pi$ increase) of our EO materials at 25 years. FIG. 16B shows the extrapolation of the normalized $V_\pi$ increase in 25 years for 28-23a (50%) at 85, 100 and 110° C. Under 85° C. operation, the model predicts a $V_\pi$ increase of only 1.14 times. This is a significant improvement in the long-term stability compared to other existing EO polymer systems such as CLD-PI (80° C., FIG. 16B) reported in Lindsay.

We also show the curve fitting results using the hyperbolic tangent model (FIG. 17):

$$\ln(\tau/\tau_P) = E_R(1 + \tanh[(T_c - T)/D])/2RT + E_P/RT$$

proposed in Lindsay for EO polymers 28-14 (50%) and 28-23a (50%). For comparison purposes, we also re-plotted the curve for CLD-PI (CLD-APEC). The activation energies of 28-14 (50%) (1.09 eV) and 28-23a (1.14 eV) systems are in a similar range. Additionally, switching from 28-14 (50%) (Tg=140° C.) to 28-23a (Tg=174° C.), the transition zone where the material stability drastically degrades is pushed significantly toward higher temperature range (in this case about 20° C. higher).

Figure 18:
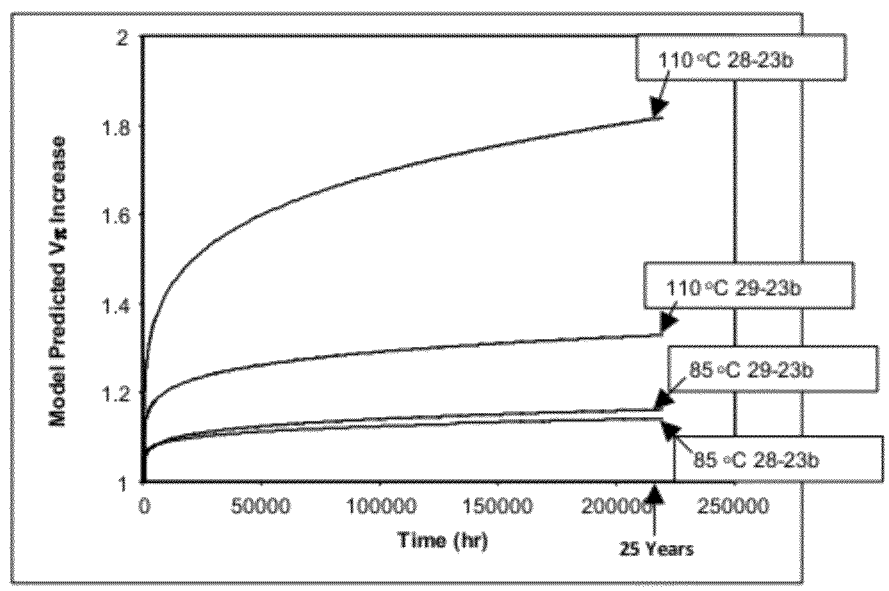
FIG. 18 is a graph showing Jonscher analysis of temporal stability of illustrative electro-optic polymers, according to embodiments.

The Jonscher equation was also used to compare 28-23b (55%) with 29-23b (55%) at 85° C. and 110° C. (FIG. 18). At 85° C., there was no significant difference in long term stability. At 110° C., 29-23b (55%) exhibited a 33% increase and 28-23b (55%) showed an 81% increase. This indicates that higher Tg polymer systems (e.g., 29) show advantages at higher operation temperature in long term performance.

Figure 19:
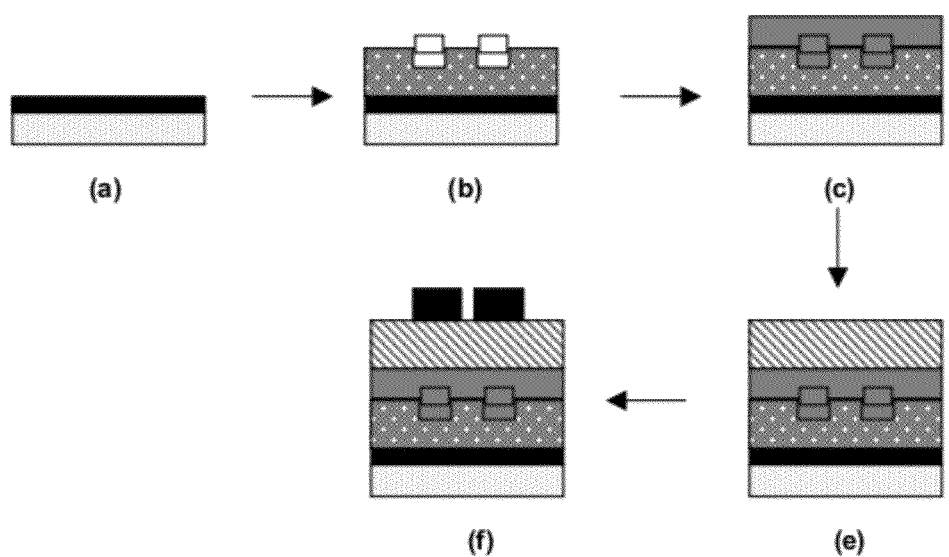
FIG. 19 illustrates fabrication steps for an electro-optic polymer modulator, according to an embodiment.
Figure 20:
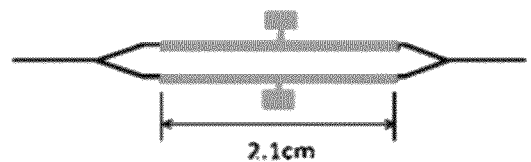
FIG. 20 is a conceptual view of a Mach-Zehnder interferometer and electrodes, according to embodiments.
Figure 21:
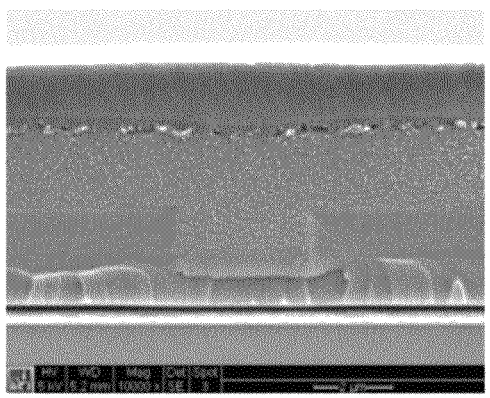
FIG. 21 is a photomicrograph showing a cross section of a fabricated optical polymer stack taken across an electro-optic modulator, according to an embodiment.

Mach-Zehnder EO polymer modulators with 23a and 23b with inverted-rib waveguides were fabricated on 3 inch wafers. The device process flow is illustrated in FIG. 19. Bottom electrodes were sputtered and patterned, then the wafer was treated with an adhesion promoter having thiol and polar groups, then a layer of bottom clad (LP202C (a thermally curable, crosslinked sol-gel material), or UV15LV) was spun and cured. Inverted-rib waveguides were then fabricated on the bottom clad. After a plasma surface treatment of the bottom clad and the rib waveguides, the core layer of composites comprised of host polymer and chromophore 23a or 23b was deposited and thermally cured. The top clad LP33ND (a thermally curable, crosslinked sol-gel material) was spun and thermal cured after a surface treatment of the core layer. After the entire optical material stack of the device was built, the poling electrodes were deposited and patterned, followed by a poling process that was performed at a temperature range from 164° C. to 220° C. with a bias voltage range from 750V to 950V to align the chromophores. The choice of poling temperature and voltage depends on the core materials. The poling electrodes were also designed to serve as working electrodes with an active length of 2.1 cm. The devices were diced into individual chips for testing. The electrode configuration is shown in FIG. 20 and the cross sectional view of one of the polymer modulators is shown in FIG. 21.

Optical insertion loss, half-wave voltage ($V_\pi$), and extinction ratio were measured. Device $V_\pi$ and insertion loss are tabulated in Table 3. There is no significant difference between 23a and 23b with 28 as host polymer. Their insertion losses are also similar. When using 23b with 29 as host polymer, the $V_\pi$ is higher.

TABLE 3

$V_\pi$ and Insertion Loss of EO polymer modulators

| EO Polymer | Chip ID | $V_\pi$ (V) | Insertion Loss (-dB/cm) |
|---|---|---|---|
| 28-23a (50%) | V25-25-A | 1.28 | 9.1 |
| 28-23a (55%) | V25-8-C | 1.09 | 10.8 |
| 28-23b (55%) | V25-43-C | 1.16 | 9.8 |
| 29-23b (55%) | V26-14-B | 1.42 | 8.3 |

Mach-Zehnder devices using 28-23b (55%) were studied at 85° C. for up to 1300-3000 hr (FIG. 22A). The normalized $V_\pi$ of the 28-23b (55%) device was found to increase to about 1.02-1.04 times the baseline (initial) $V_\pi$ which corresponds to a 2-4% decrease of $r_{33}$, which corresponds well to thin film $r_{33}$ tests. Using a Jonscher model to project 25-year performance (FIG. 22B), it is expected that devices made with 28-23b (55%) materials will exhibit an 11% $V_\pi$ increase over 25 years.

Device $V_\pi$ stability was also studied for the higher Tg core 29-23b (55%). After 265 hr at 100 and 110° C., respectively, $V_\pi$ was found to increase by 1.04 and 1.07 over the initial $V_\pi$. We observed better stability of devices using a higher Tg core including the higher Tg host polymer 29. We further tested 29-23b (55%) up to 150° C. and 170° C. for 30 minutes, and found $V_\pi$ increases from the initial $V_\pi$ of 1.12 and 1.49 times, respectively. This indicates that short time exposures to high elevated temperatures does not ruin the device performance, thus making devices fabricated from this material more compatible with elevated temperature processing and/or more immune to failure resultant from short term over-temperature conditions.

Integrated Circuit Examples

Figure 25:
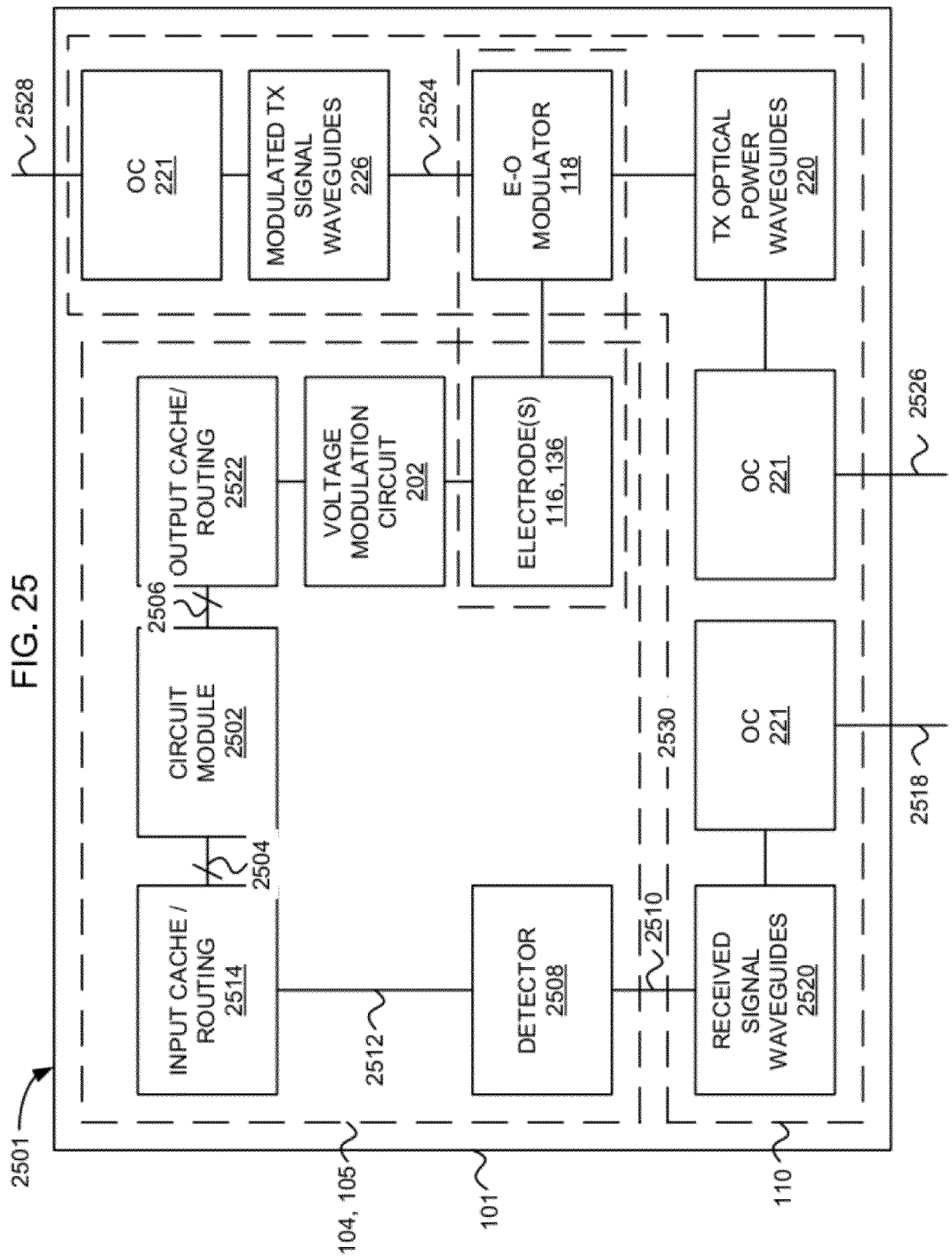
FIG. 25 is a block diagram illustrating an integrated circuit configured for optical communication, according to another embodiment.

FIG. 25 is a block diagram of an integrated circuit 101 configured for optical communication, according to an embodiment 2501. The integrated circuit 2501 is formed on a substrate 101, and includes electrical circuitry 104, 105; and an optical polymer stack 110 including optical components formed on the electrical circuitry 104, 105. An optical detector 2508 may be formed at least partially in the electrical circuitry 104, 105, and may be configured to receive a modulated optical signal 2510 from one or more received signal waveguides 2520 formed in the optical polymer stack 110. The optical detector 2508 may convert the optical signal 2510 to a first electrical signal 2512. A circuit module 2502 formed as a portion of the integrated circuit 101 and the electrical circuitry 104, 105 may be operatively coupled to the optical detector 2508 to receive first data 2504 corresponding to the first electrical signal 2512 and responsively output second data 2506. An electro-optic modulator 118 including an electro-optic polymer may be formed at least partially in the optical polymer stack 110, be operatively coupled to the circuit module 2502, and may be configured to modulate light to output optical data 2524 corresponding to the second data 2506.

According to an embodiment, the integrated circuit 101 includes electrical circuitry 104, 105 including a complex of metal conductors, vias, and dielectric (not shown) and doped semiconductor regions (not shown) formed on a semiconductor substrate. A patterned optical polymer stack 110 can be formed over the surface of the electrical circuitry 104, 105. The electrical circuitry 104, 105 includes one or more circuit modules 2502 configured to receive first data 2504 and output second data 2506 responsive to the first data. For example, the one or more circuit modules 2502 can include one or more or a combination of all or portions of a volatile memory circuit, a memory access circuit, a non-volatile memory (e.g., storage) circuit, a logic circuit, a processor core, a multiprocessor core, a communications interface, a GPU, an ASIC, a gate array, and/or a FPGA. For example, if the circuit module 2502 is a processor (or multiprocessor), the received first data can include instructions and data, and the output second data can include data that includes a result of the processing. In another example, if the circuit module 2502 is a memory (or memory access circuit), then the first data can include a memory address and read command and the second data can include the requested data; or the first data can include a memory address and write command, and the second data can include an acknowledgement of the write.

The optical detector 2508 can be operably coupled to the circuit module 2502 and configured to receive optical first data 2510 and convert the optical first data to a first electrical signal 2512 corresponding to the first data 2404. According to an embodiment, the optical first data 2510 and the first electrical signal 2512 can be unidirectional serial data. An optional input cache and/or router 2514 can include data parallelization and/or may be configured as a simple (serial or parallel data) input buffer.

Optionally, the optical detector 2508 may be included in a top-mounted component mounted on top of the optical polymer stack 110. For example, the optical detector may include a PIN diode. According to another embodiment, the optical detector may include a third-order nonlinear optical chromophore configured to undergo a charge separation responsive to receiving a photon of modulated light. A pair of electrodes may provide a DC or AC bias, and light may be sensed by detecting current flow carried by the separated charges from the third-order nonlinear optical chromophore.

Optionally, the detector 2508 can be configured to receive a free space or Z-axis modulated beam. Optionally the optical first data 2510 can be received from an external source (not shown) through an optical fiber 2518 coupled to one or more received signal waveguides 2520 formed in the patterned optical polymer stack 110 via an optical coupler 221. Optionally, the optical coupler 221 may also be formed at least partly as structures within the patterned optical polymer stack 110. Optionally, the optical coupler 221 can introduce the optical first data to the optical polymer stack 110 and the received signal waveguides 2520 through a facet (not shown) formed at the edge of the optical polymer stack 110 or a Z-axis input mirror (shown elsewhere herein) formed in the optical polymer stack 110.

The second (output) data 2506 from the circuit module 2502 can be output to an optional output cache and/or router 2522. The optional input cache and/or router 2522 can include a UART configured to convert parallel data to serial data. Optionally, the output cache and/or router 2522 can include a data multiplexer (see FIG. 2, 210) that can convert relatively slowly modulated electrical signals into high speed modulation for insertion onto an optical carrier. Optionally, the output cache and/or router 2522 can be configured as a simple (serial or parallel data) output buffer.

A voltage modulation circuit 202 can be configured to receive data from one or more data sources (for example, a plurality of output caches and/or routers 2522 operating in parallel) data source and provide a modulated voltage signal to electrodes 116, 136 located proximate to an electro-optic modulator 118. According to an embodiment, the electrodes 116, 136, an electro-optic core, and associated waveguide structures can be viewed as an electro-optic polymer device 120. Thus, the polymer electro-optic modulator 118 can be disposed at least partially over the integrated electrical circuitry 104, 105 and operably coupled to the integrated electrical circuitry 104, 105 to receive the second data and modulate light as optical second data. Typically, the voltage modulation circuit 202 can be configured to modulate a very high speed (e.g. up to 40 Gbps or greater) voltage modulated signal onto one or more of the electrodes 116, 136, and optionally complementary electrodes (not shown) as a substantially equal or inverted voltage modulated signal. The electro-optic modulator 118 can take a variety of forms such as a phase modulator, a Mach-Zehnder modulator, a Michelson interferometer, a micro-ring resonator, a modulated Bragg grating, or other format.

The patterned optical polymer stack 110 disposed at least partially over the integrated electrical circuitry 104, 105 may include passive waveguides including a first waveguide 2820 configured to convey the optical first data 2510 to the optical detector 2508 and a second waveguide 226 configured to convey the optical second data 2524 from the polymer electro-optic modulator 118.

The electro-optic modulator 118 may include an electro-optic polymer configured to change its index of refraction responsive to an applied electric field. The electro-optic polymer may include a host polymer including aryl groups and poled chromophores that include two or more aryl substituents. The aryl substituents on the chromophores may be configured to interact with the aryl groups of the host polymer to hinder rotation of the chromophore after poling.

For example, the poled chromophore may include a structure D-$\pi$-A in electronic conjugation, where D, $\pi$, and A are defined above. The two or more aryl substituents may include three aryl groups covalently bound to a substituent center, which is, in turn, covalently bound to the chromophore. As described above, providing this interaction between the host polymer and chromophores of the electro-optic polymer may significantly improve thermal and temporal stability in service, and may allow for elevated temperature and/or more complex fabrication steps.

The integrated circuit configured for optical communication 2501 may further include a light source (not shown) arranged to provide substantially continuous output light to the electro-optic modulator 118 for modulation by the electro-optic modulator 118. For example, the light source may includes a vertical cavity laser, a distributed feedback laser, and/or a vertical cavity laser configured for distributed feedback. Optionally, the light source (not shown) may be formed at least partially in the integrated electrical circuit 104, 105. One embodiment may be visualized with reference to FIG. 29. Alternatively, the light source (not shown) may be included in a top-mounted component mounted on top of the optical polymer stack 110. One embodiment of this may be visualized with reference to FIG. 30.

The integrated circuit 101 and the integrated electrical circuit 104, 105 may also include an input cache or router 2514 operatively coupled to receive the electrical signal 2512 from the optical detector 2508 and provide the first data 2504 to the integrated circuit module 2502. For example, the input signal 2512 a serial signal and the input cache or router 2514 may include a serial-to-parallel converter configured to convert the serial electrical signal 2512 received from the optical detector 2508 to parallel data 2504 for use by the integrated circuit module 2502. The input cache or router 2514 may optionally include a de-multiplexer configured to split a high speed received first signal 2512 to a plurality of lower data rate sets of first data 2504.

The integrated circuit 101 and the integrated electrical circuit 104, 105 may also include an output cache or router 2522 configured to receive the second data 2506 from the circuit module 2502, and convert the second data 2506 to a second electrical signal corresponding to the modulated optical signal 2524. Optionally, the output cache or router 2522 may also include a multiplexer configured to receive a plurality of sets of second data 2506, and convert the plurality of sets of second data 2506 to a high speed second electrical signal (not shown).

A voltage modulation circuit 202 may be configured to receive the second electrical signal (not shown) from the output cache or router 2522 and responsively modulate at least one electrode 116, 136 of the electro-optic polymer modulator 118 at a voltage selected to cause the electro-optic polymer modulator 118 to modulate the optical signal 2524 to a desired modulation depth.

As indicated above, the optical polymer stack 110 may include a range of optical devices. For example, a first optical coupler 221 may be configured to couple a first data optical fiber 2518 to the first (received signal) waveguide(s) 2520. A second optical coupler 221 may be configured to couple second (modulated optical power) waveguide(s) 226 to a second data optical fiber 2528. An optical power optical coupler 221 may be configured to couple light from an input optical power optical fiber 2526 to transmission optical power waveguides 220 for delivery to the electro-optic modulator 118. Optionally, the optical coupler 221 or Tx optical power waveguide 220 may include a directional coupler (not shown) to reduce launching modulation onto what is supposed to be a constant power source 2526.

FIG. 26 is a sectional view of an integrated circuit 2601 configured for optical communication showing a bottom clad layer 124 configured act as a planarization layer 108, according to another embodiment. A semiconductor substrate 102 includes a pattern of doped wells 104 on the surface of the semiconductor substrate 102. A plurality of patterned conductor layers and patterned dielectric layers are disposed over the surface of the semiconductor substrate 102 to form a circuit layer 105. An optical polymer 124 may form a planarization layer 108 disposed over the circuit layer 105. A planarized surface 2602 of the optical polymer 124 may be a result of spin coating the optical polymer 124 under conditions favorable for leveling, and/or may be a result of chemistry such as an in situ crosslinking reaction. The optical polymer forming the planarization layer 108 may be a portion of an optical polymer stack 110 disposed over the circuit layer 105. For example, the optical polymer forming the planarization layer 108 may be a bottom polymer clad 124.

Figure 27A:
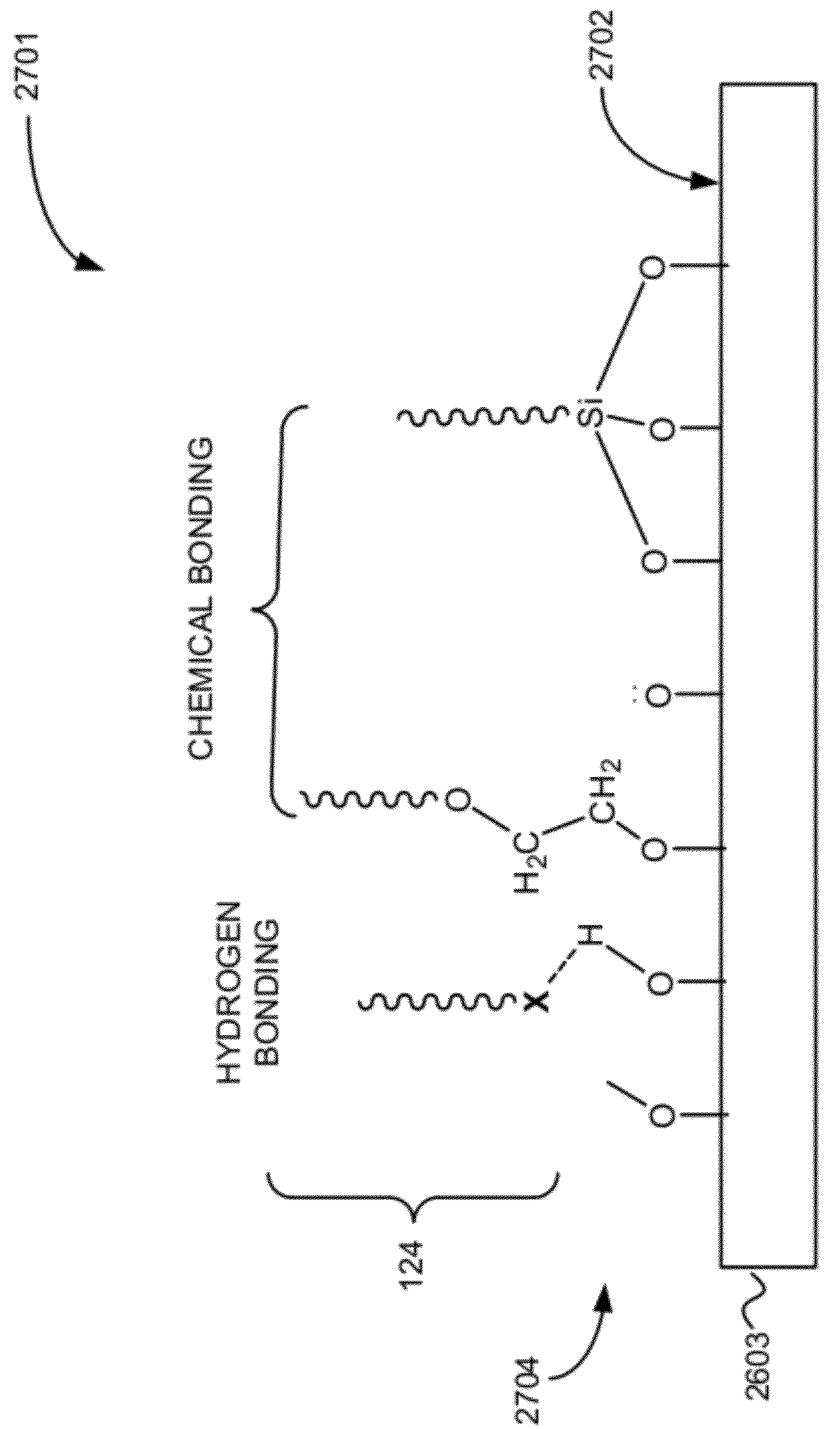
FIG. 27A is a diagram illustrative of a surface adhesion treatment, according to an embodiment.

The plurality of patterned conductor layers and patterned dielectric layers forming the circuit layer 105 disposed over the surface of the semiconductor substrate 102 may include one or more exposed conductors 2603. The one or more exposed conductors 2603 may be treated to promote adhesion to the optical polymer forming the planarization layer. For example, the treatment of the one or more exposed conductors 2603 may include oxidation to form a metal oxide. An illustrative interaction is shown in FIG. 27A.

The integrated circuit 2601 may include at least one electrical via 112 at least partially extending through the optical polymer stack 110 and operatively coupled to a corresponding at least one location 2604 on the one or more exposed conductors 2603. A top conductor layer 2606 may be disposed over the optical polymer stack 110 and in electrical continuity with the at least one electrical via 112. An electrical via 112 may be only one type of electrical connection between a location 2604 on the conductors 2603 and the top conductor 2606. More generically, the electrical via 112 may be described as at least one conductor 112 at least partially extending through the (horizontal) plane of the optical polymer stack 110. Accordingly, the arrangement may be described as at least one conductor 112 at least partially extending through the plane of the optical polymer stack 110 and operatively coupled to a corresponding location 2604 on the one or more exposed conductors 2603. The top conductor layer 2606 may be disposed over the optical polymer stack 110 and in continuity with the at least one conductor 112 at least partially extending through the plane of the optical polymer stack 110. This may also place the top conductor 2606 in electrical continuity with the location 2604. Optionally, the location 2604 may not be an exposed conductor 2603 per se. The location 2604 may correspond to a buried conductor, a via from a buried conductor, and/or another device such as a plate of a diode (or back-coupled transistor) that is AC coupled to portions of the integrated circuit layer(s) 104, 105.

The at least one conductor 112 may be formed using a variety of approaches. For example, as described above, the conductor 112 may be an electrical via. Alternatively (or additionally), the at least one conductor 112 may include a wire bond, a conductive bump, and/or an anisotropic conductive region. The top conductor layer 2606 may include a metal layer and/or a conductive polymer.

According to an embodiment, the circuit 2601 may include at least one high speed electrode 116, 116a, 116b formed as a pattern in the top conductor layer 2606. The high speed electrode 116, 116a, 116b may be operatively coupled to receive a signal from the at least one conductor 112 at least partially extending through the plane of the optical polymer stack 110.

According to an embodiment, at least a portion of the one or more exposed conductors 2603 may be configured to form a ground electrode 118 parallel to the at least one high speed electrode 116, 116a, 116b.

A region 120, 120, 120b of the optical polymer stack 110 juxtaposed to the high speed electrode 116, 116a, 116b and the ground electrode 118 may include a poled region including an electro-optic polymer. A semiconductor circuit formed from a complex of the doped wells 104 and a portion of the plurality of patterned conductor layers in the circuit layer 105 may be operable to drive the electrodes 116, 116a, 116b, 118 with a series of modulated electrical pulses to modulate light passed through the poled electro-optic polymer 128, 120, 120a, and/or 120b.

According to an embodiment, the integrated circuit or another integrated electro-optic device may include a velocity-matching layer 2608. The electro-optic polymer layer 128 may have a variable optical propagation velocity of light passed through it, which may, for example, be dependent on an electric field provided by a high speed electrode 116 in cooperation with a ground electrode 118. The high-speed electrode 116 may be disposed over the top clad 126 and under the velocity-matching layer 2608, the high-speed electrode 2608 having an electrical propagation velocity of electrical pulses passed through it. The velocity-matching layer may be configured cause the electrical propagation velocity through the high speed electrode 116 to approximate the optical propagation velocity through the electro-optic polymer layer 128. A top cladding 126 may be disposed over the electro-optic polymer layer 128 and below the velocity-matching layer 2608, and be configured to guide the light to pass substantially through the electro-optic polymer layer 128. For typical waveguide applications, the top cladding layer 126 may be configured to convey a portion of light energy that is nominally passed through the electro-optic polymer layer 128. According to an alternative embodiment, the velocity-matching layer 2608 may be formed under the electrodes 116, 116a, 116b.

For example, the velocity-matching layer may be configured to substantially match the electrical velocity to the optical velocity. Since the optical propagation velocity may be electro-optically modulated, for example to provide phase-coding of data and/or to provide amplitude modulation of data on the light signal, the velocity-matching layer 2608 may be configured to cause the electrical propagation velocity through the high speed electrode 116 to approximate an average value of the optical propagation velocity through the electro-optic polymer 128. To provide the velocity matching, the permittivity of the velocity-matching layer 2608 may be selected to cause the electrical propagation velocity through the high speed electrode 116 to approximate the optical propagation velocity through the electro-optic polymer layer 128, and particularly through the electro-optic core 120.

According to an embodiment, the velocity-matching layer includes a polymer made from the monomer:

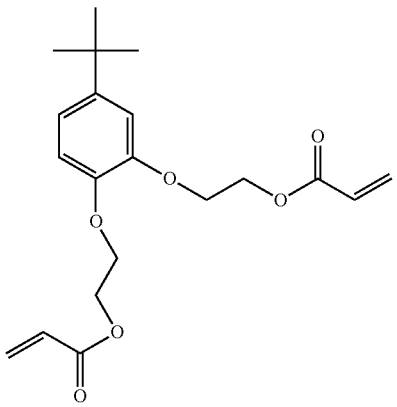 [SMILES: C=CC(=O)OCCOc1ccc(C(C)(C)C)cc1OCCOC(=O)C=C]

Polymerization of the velocity-matching layer may be radiation-initiated. For example, the velocity-matching layer may include a photoinitiator.

According to embodiments, an integrated circuit 104, 105 may be configured to form a substrate below the electro-optic polymer layer 128. As described elsewhere herein, the integrated circuit 104, 105 may be configured to output the electrical pulses to the high speed electrode 116. A bottom clad 124 may be disposed between the integrated circuit 104, 105 and the electro-optic polymer layer 128.

According to an embodiment, the integrated circuit including an electro-optic polymer stack 2601 may be configured to resist water infiltration. In a particular example, one or more upper polymer layers 126 and/or 2608 may be configured to protect a water-sensitive area such as an electro-optic core 120 formed in an electro-optic polymer layer 128. In a typical embodiment, the electro-optic core may be formed from a relatively polar molecule. The relatively polar molecule, e.g., a second order nonlinear chromophore, (aka hyperpolarizable chromophore) may be poled and modulated in a way that may tend to attract water. One or more upper polymer layers 126 and/or 208 disposed over the electro-optic polymer layer 128 may include at least one relatively non-polar polymer configured to substantially prevent water vapor from migrating through the one or more upper polymer layers to the electro-optic polymer layer. As depicted in FIG. 26, the one or more upper polymer layers may include a top clad 126 and/or a velocity-matching layer 2608. According to an embodiment, the one or more upper polymer layers 126, 2608 may include a polymer made from at least the monomer:

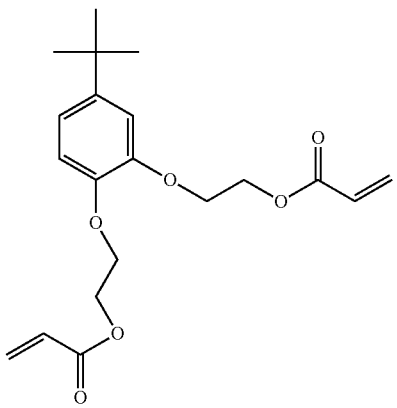 [SMILES: C=CC(=O)OCCOc1ccc(C(C)(C)C)cc1OCCOC(=O)C=C]

A polymer made from the monomer shown above, which may be referred to as LM251 elsewhere herein, was characterized by a water contact angle greater than 80°. A low surface energy polymer such as one having a water contact angle greater than 80° may tend to exclude water molecules from interstitual locations between crosslinked chains, thus substantially preventing migration of water from a porous semiconductor package and/or an atmosphere contacting the upper surface of the polymer stack 110 through to the electro-optic polymer layer 128. Other polymers may be substituted to provide this function.

The polymer LM251 that formed layer 2608 was UV cured without any substantial elevation in temperature. This may be useful for preventing depoling of chromophores in the electro-optic polymer 128, which may happen during subsequent processing at elevated temperatures near Tg of the electro-optic polymer layer 128. Another useful property of LM251 was a reduction or elimination of possible chemical attack to exposed electro-optic polymer 128. The polymer LM251 was found to be particularly useful as a velocity-matching layer 2608 because it exhibited low RF loss (attenuation of the electrical pulse as it traveled along the high speed electrode 116, 116a, 116b).

According to embodiments, the integrated circuit configured for optical communication 2601 may include one or more upper polymer layers including at least one 126 and/or 2608 characterized by a coefficient of thermal expansion lower than a coefficient of thermal expansion of one or more layers 124, 128 in the polymer stack 110 disposed between the semiconductor substrate 102 (and 105, 2603) and the one or more upper polymer layers 126, 2608.

Table 4 illustrates a relationship between coefficients of thermal expansion among layers in the integrated circuit 2601 and especially the optical polymer stack 110 in relationship to the substrate 102, 104, 105 and an illustrative conductor 2603 material, according to an embodiment.

TABLE 4

| Index No. | Name | Example Material | CTE |
|---|---|---|---|
| 2608 | Velocity-Matching | LM251 | 11.7 |
| 126 | Top Clad | LP33ND | 13.4 |
| 128 | E-O Polymer | 29-23b | 8.2 |
| 124 | Bottom Clad | UV15LV | 5.8 |

TABLE 4-continued

| Index No. | Name | Example Material | CTE |
|---|---|---|---|
| 118 | Bottom Electrode | Au | 1.4 |
| 105, 104, 102 | Substrate | ~Si | ~0.3 |

Where CTE, the coefficient of thermal expansion, is expressed as a coefficient x $10^{}5°$ C.$^{}$-1. LM 251 is a name for the polymer made from the monomer structure shown immediately above, which may be available from Gig-Optix, Inc. LP33ND was disclosed in an earlier patent application by the applicant (U.S. patent application Ser. No. 12/559,690, entitled LOW REFRACTIVE INDEX HYBRID OPTICAL CLADDING AND ELECTRO-OPTIC DEVICES MADE THEREFORM, filed Sep. 15, 2009, which, to the extent not inconsistent with the disclosure herein, is incorporated by reference. The electro-optic polymer 29-23b is shown above. The bottom clad 124 was made from UV15LV, available from Master Bond, Inc.

The relationship between coefficients of thermal expansion CTE shown in Table 4 may include two or more layers that generally taper in CTE from a substrate 102, 104, 105 CTE to a different CTE of a material that is disposed elsewhere in the optical polymer stack 110. In other words, the integrated circuit or other substrate 102, 104, 105 may have a substrate coefficient of thermal expansion (e.g. ~0.3). A first polymer layer 124 disposed over the substrate 102, 104, 105 may have a first coefficient of thermal expansion (5.8). A second polymer layer 128 disposed over the first polymer layer 124 may have a second coefficient of thermal expansion (8.2). The first coefficient of thermal expansion CT1=5.8 may have a value between the substrate coefficient of thermal expansion CTS=0.3 and the second coefficient of thermal expansion CT2=8.2.

At least a portion of the gradation in coefficients of thermal expansion may monotonically change as they progress away from the substrate 102, 105, 2603; as is shown in the example optical polymer stack listed in Table 4 and shown as 110 in FIG. 26. The progression of coefficients of thermal expansion may act as a form of mechanical strain relief that may be encountered as the IC 102, 104, 105 and/or the optical polymer stack 110 thermally cycles in service and/or responsive to temperature transients that may be encountered during fabrication. The progression of coefficients of thermal expansion shown in Table 4 was found to provide relatively good mechanical robustness. According to an embodiment, providing a gradation in coefficients of thermal expansion CTE may also help to reduce or select polarization dependencies in optical devices 120, 120a, 120b that may arise as a result of stress concentrations in the optical stack 110.

According to embodiments, the layers 124, 128, 126, and 2608 may be formed by spin coating followed by cooling, polymerization, and/or cross-linking. According to embodiments, the bottom clad 124 may be formed to have a thickness of 2.4 to 2.8 micrometers. The trench waveguides 130 may be etched into the bottom clad 124 to a depth of 1.0 to 1.2 micrometers, leaving a 1.4 to 1.6 micrometer thickness of bottom clad 124 under the trench waveguides 130. The trench waveguides 130 may be etched to a width of 3.8 to 4.0 micrometers. The electro-optic polymer 128 may be formed to have a thickness of 2.15 to 2.2 micrometers over the bottom clad 124 surface, thus having a thickness of 3.15 to 3.4 micrometers through the trench waveguide 130. The top clad 126 may be formed to have a thickness of 1.4 to 1.6 micrometers. The velocity-matching layer 2608 may be formed to have a thickness of 6 to 8 micrometers. The top electrode 116, 116a, 116b width may be about 12 micrometers.

FIG. 27A is a diagram illustrative of a surface adhesion treatment 2701, according to an embodiment. A surface 2702 of a metal conductor 2603 may be oxidized to form an oxide 2704 on the surface 2702 of the metal conductor 2603. For example, the metal conductor 2603 may include aluminum, copper, and/or tungsten. An optical polymer such as a bottom polymer clad 124 may be coupled to the metal 2603 via hydrogen bonding or chemical bonding, as indicated. This can improve surface adhesion of the optical polymer 124 and thus improve yield, infant mortality, and/or service life, for example.

Figure 27B:
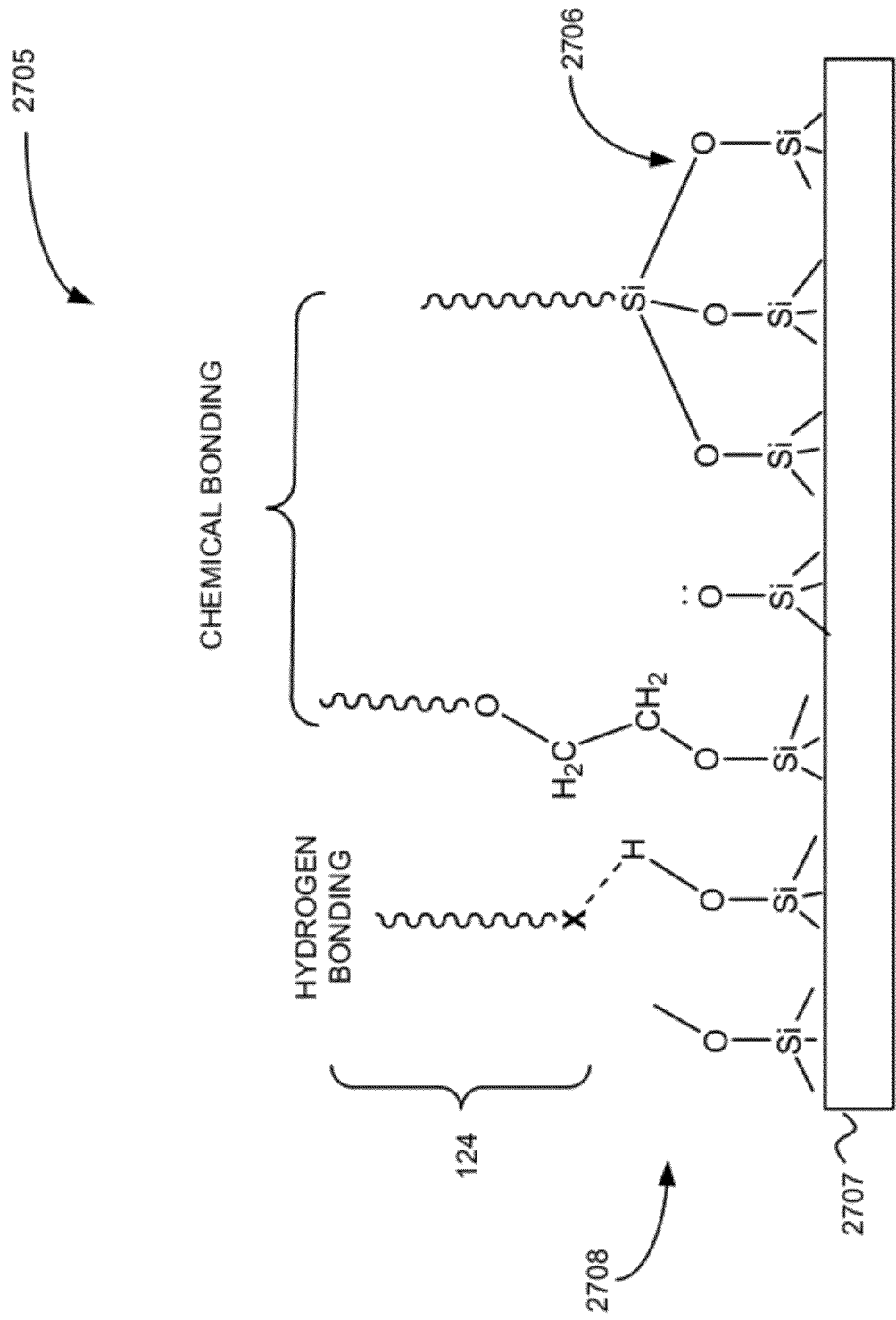
FIG. 27B is a diagram illustrative of another surface adhesion treatment, according to an embodiment.

FIG. 27B is a diagram illustrative of another surface adhesion treatment 2705, according to an embodiment. A surface 2706 of a dielectric 2707 may include an oxide such as $SiO_2$, and/or may include $Si_3N_4$, SiON, and/or unreacted Si, etc. The surface 2706 may be treated, and/or the bottom clad polymer may be selected such that the surface 2706 undergoes hydrogen bonding or chemical bonding with the bottom clad 124. This can improve surface adhesion of the optical polymer 124 and thus improve yield, infant mortality, and/or service life.

Figure 28:
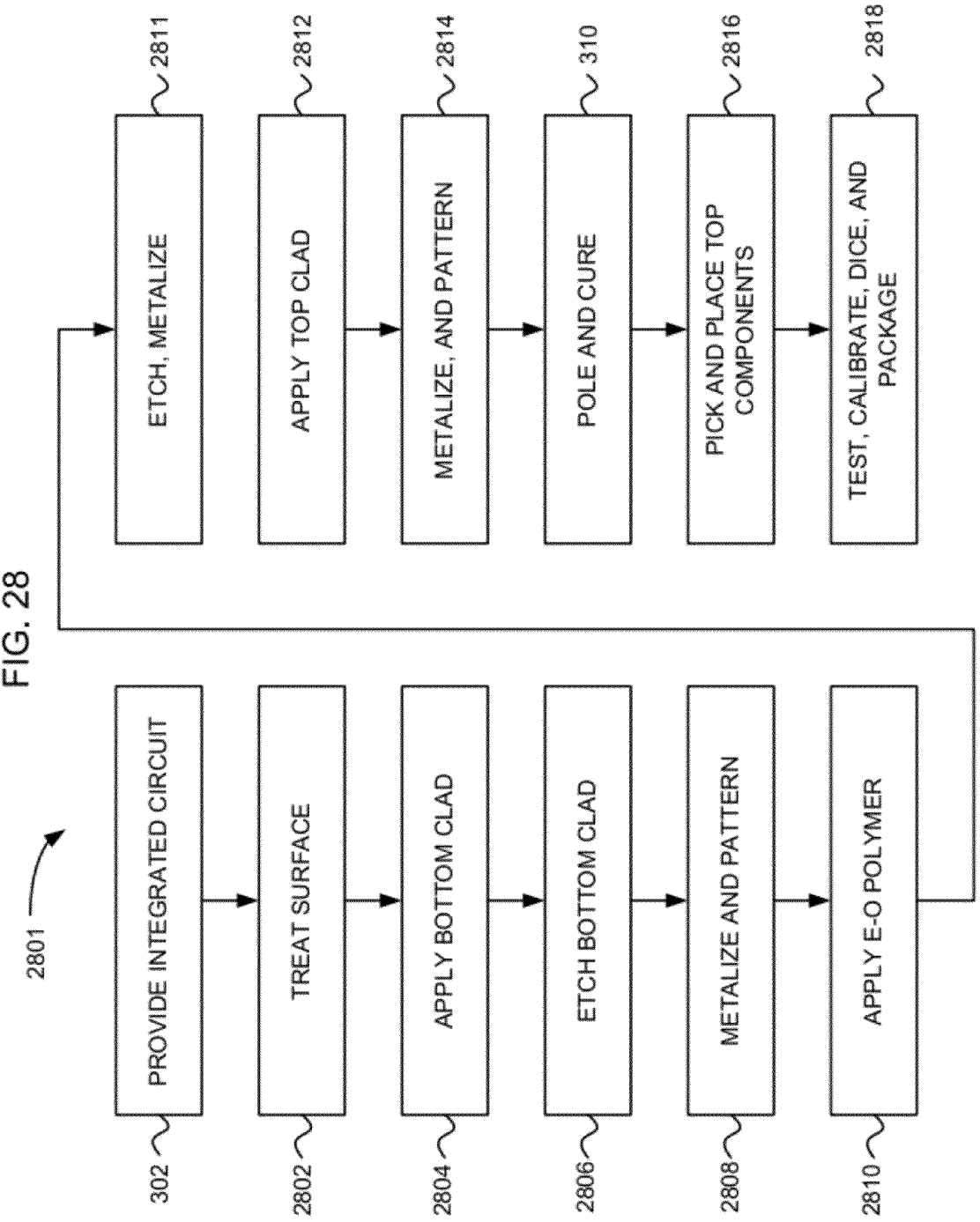
FIG. 28 is a flowchart showing a method for making an integrated circuit configured for optical communication, according to an embodiment.

FIG. 28 is a flowchart showing a method 2801 for making an integrated circuit configured for optical communication, according to an embodiment. Beginning with step 302, an integrated circuit including at least one first electrode is provided. For example, providing an integrated circuit can include receiving a semiconductor wafer including a plurality of integrated circuits formed thereon. Alternatively, providing an integrated circuit can include fabricating a plurality of integrated circuits on a semiconductor wafer. Optional step 2802, step 2804, step 2806, optional step 2808, step 2810, step 2818, step 2814, and step 310 together comprise forming an optical polymer stack over the integrated circuit. At least one second electrode can be applied to the optical polymer stack and located over at least a portion of an electro-optic polymer core and a first electrode formed in the integrated circuit to form an electro-optic polymer device configured to provide an optical interface for the integrated circuit.

Proceeding to optional step 2802, the surface of at least a portion of the integrated circuit surface can be treated to enhance adhesion of the optical polymer stack. For example, treating at least a portion of the surface of the integrated circuit can include oxidizing one or more exposed metal conductors, as shown diagrammatically by FIG. 27A. According to another example, treating at least a portion of the surface of the integrated circuit can include depositing a charge on one or more regions of exposed dielectric, for example using a corona wire, corotron, scorotron, or chemical reaction.

Proceeding to step 2804, a bottom optical clad is applied to the surface of the integrated circuit. FIGS. 1 and 2, for example, illustrate an optical polymer stack that is applied over a dielectric planarization layer. Alternatively, as shown in FIG. 26, the bottom optical clad can be applied over a non-planarized surface of the IC. Step 2804 can include applying a bottom cladding polymer over a non-planarized surface of the integrated circuit such that the surface of a cured bottom polymer clad is substantially planar. One approach for applying a bottom cladding polymer can includes spin coating the bottom cladding polymer.

Step 2804 can include curing the bottom cladding polymer to form a bottom polymer clad. For example, curing the bottom cladding can include cooling a thermoplastic optical polymer to below its glass transition point, Tg1. According to another example, the bottom cladding polymer can include a UV cured polymer or a heat set polymer, and curing the bottom polymer clad can include respectfully providing ultraviolet light or an elevated temperature. Alternatively, the bottom cladding polymer can be formed by polymerizing liquid phase monomers, such as siloxanes or titoxanes, and curing the bottom polymer clad can include allowing a polymerization reaction to progress, followed by driving off water or another solvent as a vapor. Curing the bottom polymer clad can include a succession of two or more curing steps, such as when a thermoplastic or UV-cured polymer is applied over a siloxane-based hybrid inorganic-organic polymer. According to embodiments, the bottom clad 124 may be formed to have a thickness of 2.4 to 2.8 micrometers.

Proceeding to step 2806, one or more features can be etched in the bottom polymer clad. For example, the one or more features in the bottom polymer clad can include one or more trench waveguides. Such waveguides are generally formed to guide light to and from polymer optical devices, and also provide light guidance for the electro-optic core of an electro-optic polymer device. Trench waveguides 130 are illustrated in cross-section in FIGS. 1A, 1B, and 26, for example. According to embodiments, the trench waveguides 130 may be etched into the bottom clad 124 to a depth of 1.0 to 1.2 micrometers, leaving a 1.4 to 1.6 micrometer thickness of bottom clad 124 under the trench waveguides 130. The trench waveguides 130 may be etched to a width of 3.8 to 4.0 micrometers.

Optionally, the optical polymer stack can include features configured to launch vertical light propagation from light received from a horizontal waveguide, or launch light into a horizontal waveguide from received vertically propagated light. Typically, such light is referred to as a beam, but it is to be understood that the term beam is not intended to be limiting. For example, FIG. 30 illustrates an optical polymer stack structure configured to provide such a transition from horizontal to vertical or from vertical to horizontal propagation.

Figure 30:
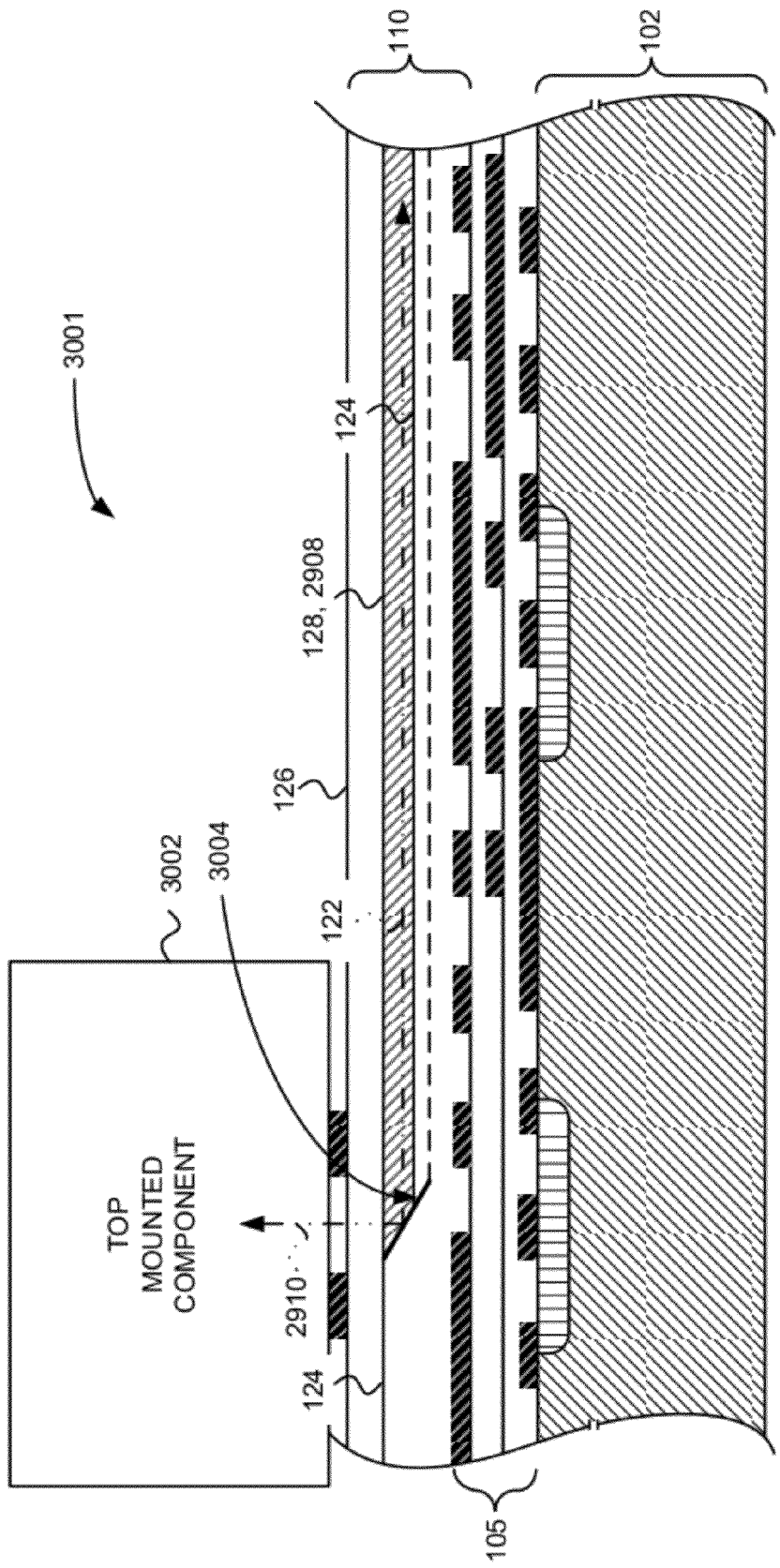
FIG. 30 is a sectional view of another optical stack structure including a coupling between a horizontal waveguide and a z-axis launch to or from a top-mounted component, according to an embodiment.

Referring to step 2806 in view of FIG. 30, etching one or more features in the bottom polymer clad can include using a grayscale mask to etch an angled surface 3304 (and a conventional mask to etch the waveguide indicated by the horizontal dashed line). In such a case, proceeding to step 2808, a mirror material can be patterned onto at least the angled surface etched in the bottom polymer clad to form a mirror configured to launch a beam received from a horizontal waveguide in an upward, substantially vertical direction or to launch a downward beam received from a substantially vertical direction into a horizontal waveguide. Such a vertical propagation path can correspond to a top-mounted component configured to emit or sense light above the optical polymer stack and vertically aligned to the angled surface, for example.

While FIG. 28 refers to applying metallization, step 2808 is not necessarily limited to, nor may it even include applying a metal. For example, applying a mirror material can include first applying a tie layer configured to promote adhesion between the bottom polymer clad and the mirror material. The mirror material may include a metal such as aluminum, gold, or silver. Alternatively, the mirror material may include a dielectric stack mirror. According to an embodiment, applying the mirror material to at least the angled surface can include applying the mirror material to substantially the entire surface of the etched bottom polymer clad and etching the mirror material off of at least a portion of the surface of the bottom clad not including the angled surface. Applying the mirror material to at least the angled surface may also include applying a seed layer using vacuum metallization and applying the mirror material to the seed layer using liquid phase plating. An illustrative seed layer can include a thin layer of vacuum deposited metal, for example.

Figure 29:
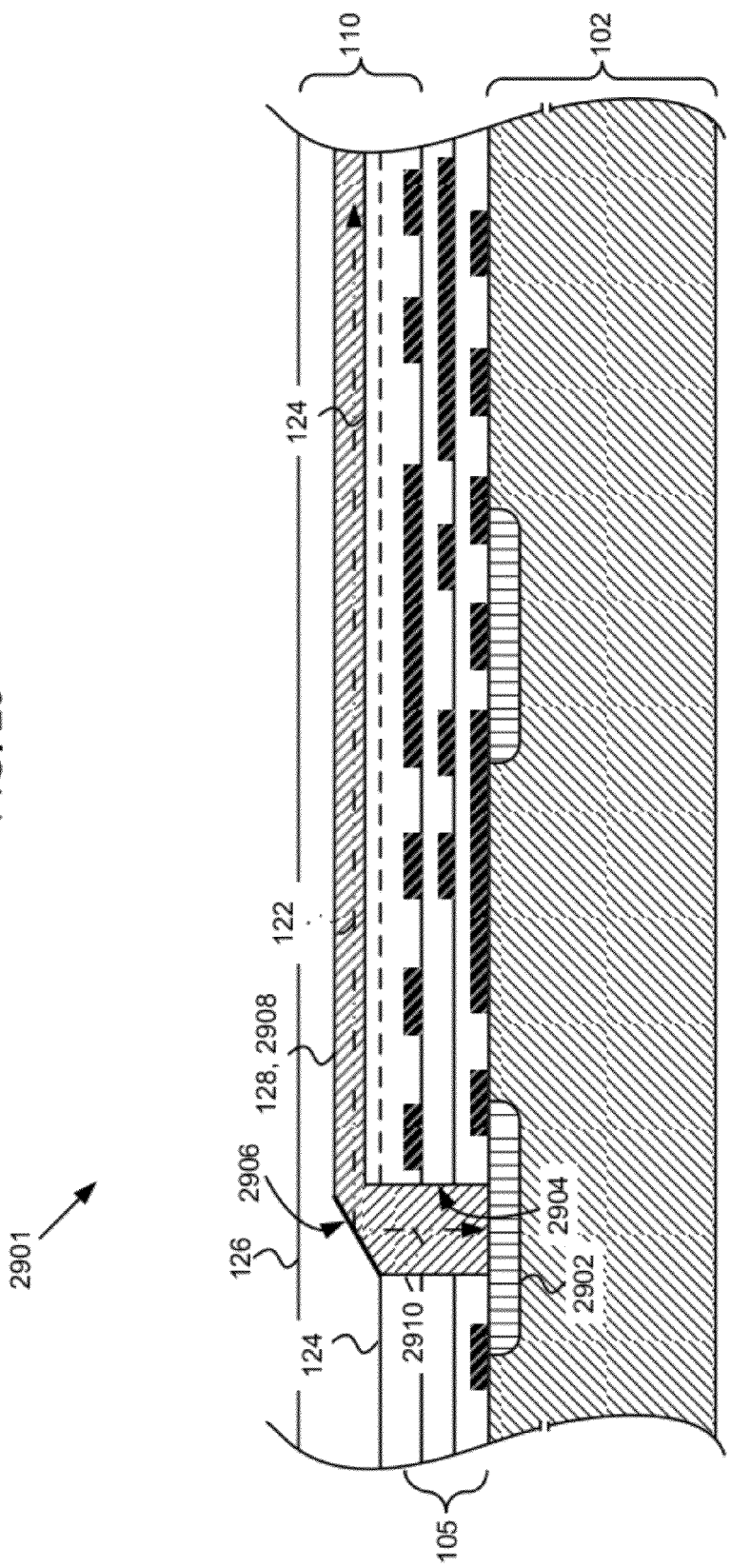
FIG. 29 is a sectional view of an optical stack structure including a coupling between a horizontal waveguide and a z-axis launch to or from a component formed at the surface of an IC, according to an embodiment.

Referring again to step 2806, etching one or more features in the bottom polymer clad can include etching substantially through the bottom polymer clad to form a z-axis optical via. For example, FIG. 29 shows a z-axis optical via 2904.

Figure 10:
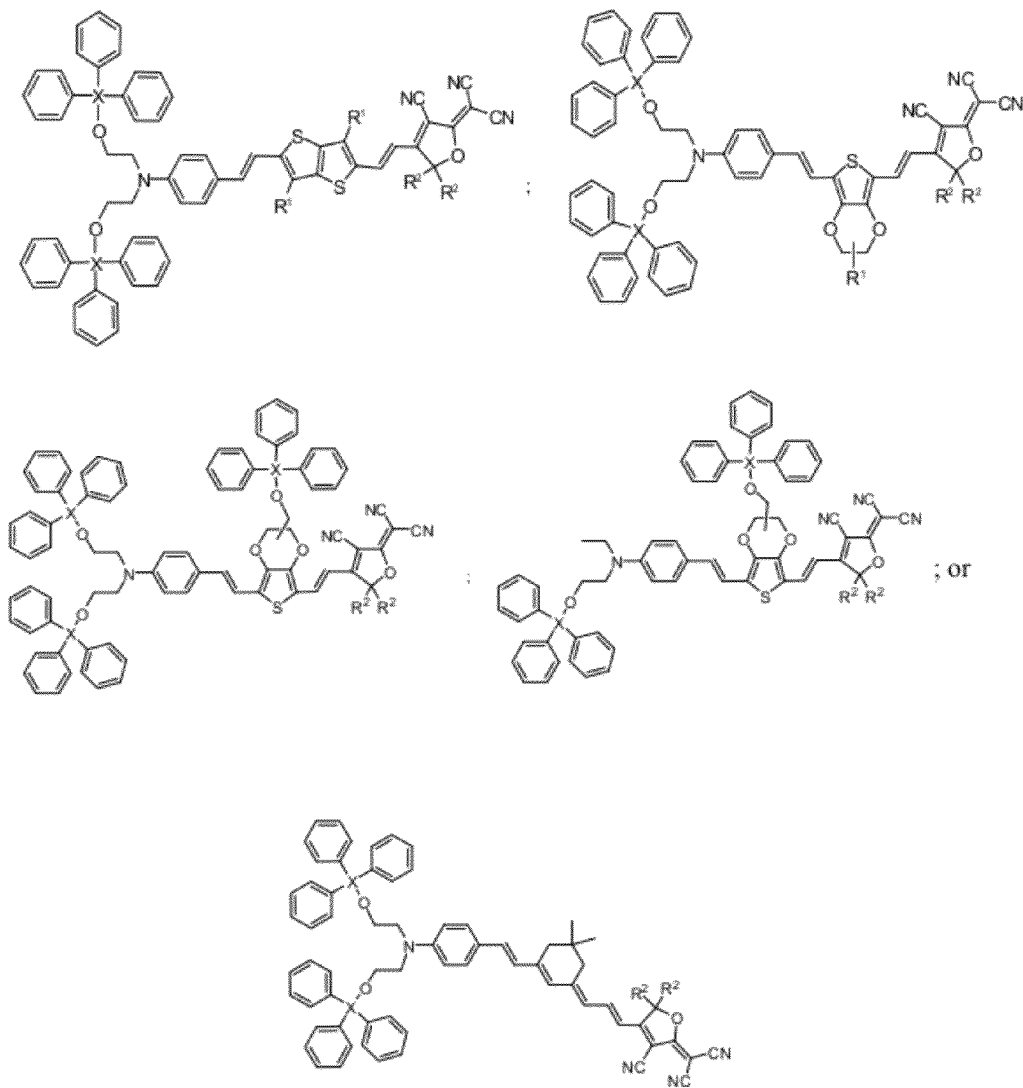
FIG. 10 shows illustrative molecular structures of several chromophores that can form a portion of an electro-optic polymer and an electro-optic polymer device used to provide an optical interface for an integrated circuit, according to embodiments.

Proceeding to step 2810, an electro-optic polymer can be applied over the etched bottom polymer clad. According to embodiments, the electro-optic polymer 128 may be formed to have a thickness of 2.15 to 2.2 micrometers over the bottom clad 124 surface, thus having a thickness of 3.15 to 3.4 micrometers through the trench waveguide 130. According to an embodiment, the electro-optic polymer includes a host polymer including at least one aryl group and a chromophore including two or more aryl substituents configured to interact with the at least one aryl group of the host polymer to hinder rotation of the chromophore after poling. Example chromophore structures are shown in FIG. 10. Example host chromophore structures are shown in FIG. 6. Examples of interactions between the aryl groups of the host polymer and aryl groups of the chromophore are shown in FIGS. 14 and 15.

The host polymer can have a relatively high glass transition temperature, and the electro-optic polymer can have a glass transition temperature higher than the host polymer glass transition temperature. According to an embodiment, the bottom polymer clad can have a first glass transition temperature $Tg1$ and the electro-optic polymer can have a second glass transition temperature $Tg2$ higher than the first glass transition temperature $Tg1$ of the bottom polymer clad. For example, the second glass transition temperature $Tg2$ of the electro-optic polymer can be equal to or greater than 150° C. According to an embodiment, the second glass transition temperature $Tg2$ of the electro-optic polymer is equal to or greater than 175° C.

Step 2810 can include covering substantially the entirety of the polymer bottom clad and filling features etched in the polymer bottom clad. For example, filling features etched in the polymer bottom clad can include filing a z-axis optical via 2904 etched in the polymer bottom clad, as shown in FIG. 29. Similarly, as shown in FIG. 30, applying the electro-optic polymer can include applying the electro-optic polymer over a mirror surface 3004 formed on a portion of the polymer bottom clad. According to an embodiment, applying the electro-optic polymer can include spin coating the electro-optic polymer.

Optionally, after step 2810, the process 2801 can proceed to step 2811, which can include etching one or more features in the electro-optic polymer. For example, etching one or more features in the electro-optic polymer can include etching a micro-ring resonator shape in the electro-optic polymer and/or etching one or more waveguide structures in the electro-optic polymer. Additionally or alternatively, etching one or more features in the electro-optic polymer can include using a grayscale mask to etch an angled surface, as shown in FIG. 29 as the surface 2906. In such a case, forming an optical polymer stack can further include applying a mirror material to at least the angled surface etched in the electro-optic polymer to form a mirror 2906 configured to launch a beam 122 received from a horizontal waveguide 2906 in a downward, substantially vertical direction or to launch an upward beam 2910 received from a substantially vertical direction into a horizontal waveguide 2906. For example, the angled surface 2906 can be vertically aligned with a portion of the integrated circuit 2902 configured to emit or sense light.

Applying a mirror material may include first applying a tie layer configured to promote adhesion between the electro-optic polymer and the mirror material. The mirror material can include a metal such as aluminum, gold, or silver, or alternatively, the mirror material can include a dielectric stack mirror. As with step 2808, applying the mirror material to at least the angled surface can include applying the mirror material to substantially the entire surface of the etched electro-optic polymer, and then etching the mirror material off of at least a portion of the surface of the electro-optic polymer not including the angled surface. Applying the mirror material to at least the angled surface can also include applying a seed layer using vacuum metallization, and applying the mirror material to the seed layer using liquid phase plating.

Proceeding to step 2812, a polymer cladding may be applied over the electro-optic polymer to form a top polymer clad 126. For example, applying a polymer cladding may include spin coating the polymer cladding. According to an embodiment, the top clad 126 may be formed to have a thickness of 1.4 to 1.6 micrometers. According to an embodiment, the top polymer clad can have a third glass transition temperature Tg3 that is lower than a second glass transition temperature Tg2 of the electro-optic polymer, or the top polymer clad can have a third glass transition temperature Tg3 that is higher than a second glass transition temperature Tg2 of the electro-optic polymer.

Proceeding to step 2814, at least one electrode may be applied or formed over the top polymer clad. For example, the at least one electrode applied over the top polymer clad may include a temporary electrode used for poling, in which case the temporary electrode is removed after poling. If the electrode(s) applied in step 2814 is (are) poling electrode(s), then a permanent electrode can be applied after the poling electrode is removed. Alternatively, the applied at least one electrode may include a permanent electrode used for both poling and for modulation once the circuit is in use. According to an embodiment, the top electrode 116, 116a, 116b width may be about 12 micrometers.

Proceeding to step 310, at least portions of the electro-optic polymer are poled and cured. For example, step 310 can include 1) raising the temperature of the integrated circuit and the optical polymer stack to near a glass transition temperature Tg2 of the electro-optic polymer; 2) applying a poling voltage across the top polymer clad, the electro-optic polymer, and the bottom polymer clad to induce alignment of molecules of the polar chromophore in the electro-optic polymer; and 3) lowering the temperature of the integrated circuit and the optical polymer stack to below the glass transition temperature Tg2 of the electro-optic polymer. "Near the glass transition temperature Tg2 of the electro-optic polymer" can mean within 10° C. of the glass transition temperature Tg2.

According to an embodiment, the glass transition temperature $T_{g2}$ of the electro-optic polymer can be equal to or greater than 150° C. For example, the glass transition temperature Tg2 of the electro-optic polymer can be about 167° C. as shown above for the electro-optic polymer 28-23b at 50% loading. According to another example, the glass transition temperature Tg2 of the electro-optic polymer can be about 175° C., as shown above for the electro-optic polymer 28-23a. According to another example, the glass transition temperature Tg2 of the electro-optic polymer can be about 199° C., as shown above for the electro-optic polymers 29-23a and 29-23b. Raising the temperature of the integrated circuit and the optical polymer stack to near a glass transition temperature Tg2 of the electro-optic polymer can include raising the temperature to between 164° C. and 220° C., for example.

The poling voltage applied across the top polymer clad, the electro-optic polymer, and the bottom polymer clad can be between 750V and 950V, for example. Applying the poling voltage can include holding the at least one electrode and other circuit nodes in the integrated circuit at a first potential, and holding an electrode above the optical polymer stack at a second potential separated from the first potential by the poling voltage. Holding circuit nodes at the bottom electrode poling voltage can help reduce yield loss caused by dielectric breakdown through dielectric and/or components of the integrated circuit.

According to an embodiment the first potential can be substantially at ground, and the second potential can be between about 750V and 950V. Holding the at least one electrode and other circuit nodes at a first potential includes contacting at least one pad on the integrated circuit with a poling probe that penetrates the optical polymer stack.

Optionally, before or after the poling step 310, the process 2801 may include a step (not shown) where a velocity-matching layer 2608 may be formed to have a thickness of 6 to 8 micrometers. As described above, the velocity matching layer 2608 may help to synchronize electrical and light propagation speeds.

After proceeding through step 310, the process 2801 may optionally proceed to step 2816, where at least one top-mounted component may be picked-and-placed over the optical polymer stack. For example, FIG. 30 shows a top-mounted component 3002. The top-mounted component 3002 may be configured to emit or sense light on top of the optical polymer stack. For example, the top-mounted component 3002 may include a distributed feedback laser configured to output a CW wavelength. Alternatively, the top-mounted component may include a photodiode or other optical detector configured convert an optical signal into an electrical signal.

After step 310 and/or optional step 2816, the process 2801 may proceed to step 2818. Step 2818 typically includes testing the integrated circuit and optical polymer stack. Optionally, the optical polymer stack can be reworked by stripping it off the wafer and making it again, if testing shows the optical polymer stack to be defective. Testing can be done prior to or after dicing a semiconductor wafer to singulate the integrated circuit. The integrated circuit and optical polymer stack can be packaged after singulation. Generally, packaging can include providing optical fiber pigtails that couple to optical couplers formed in, on, or adjacent to the optical polymer stack. Packaging can generally also include providing electrical contacts.

According to some embodiments, an optical device can be formed as an integrated circuit 104, 105 portion. For example a vertical cavity laser (VCSL) can emit a pattern of light in a substantially vertical axis (z-axis). In another example, an integrated light detector can exhibit highest sensitivity along a substantially vertical axis. FIG. 29 is a sectional view of an optical stack structure 110 including an embodiment 2901 including a coupling between a horizontal waveguide 2908 and a z-axis launch to or from a device 2902 formed at the surface of the IC 101. According to embodiments (that may, for example, be limited to elliptically polarized or nonpolarized light) light propagation paths can often be viewed as being independent of propagation direction. Accordingly, the device 2902 can be a light detecting or a light emitting device.

Optionally, a via 2904 can be formed through the bottom clad 124 and optionally through dielectric portions of the circuit layer 105. An electro-optic polymer layer 128 can be applied to the wafer such that the electro-optic polymer fills the via 2904. Placing the electro-optic polymer in contact or nearly in contact (for example, separated by an etch stop) with the surface of the IC 101 can reduce or eliminate loss surfaces, and thus transmit a larger portion of power in a light beam. Optionally, the via 2904 may be omitted and a vertical beam can propagate through dielectric in the circuit layer 105 and/or the bottom clad 124.

A turning mirror 2906 is configured to reflect a horizontal beam 122 received through a horizontal waveguide 2908 to a z-axis beam 2910. Alternatively, the turning mirror 2906 can reflect a z-axis beam 2910 to form a horizontal beam 122 guided substantially through the electro-optic polymer 128 by the horizontal waveguide 2908. The turning mirror surface can be formed by etching a pattern formed by a grayscale mask such that the amount of etching depth varies substantially linearly along the width of the turning mirror 2906. Alternatively, the turning mirror surface can be formed by off-axis dry etching, although mirror surface quality may suffer with this approach. After etching away a portion of the electro-optic polymer 128 and optionally a portion of the bottom clad 124, the etched surface may be coated or plated to form a mirror surface at coincident with the angled etched facet. The turning mirror 2906 can be a metal mirror (thus representing a portion of an intermediate patterned metalized layer, described in FIG. 28) or can be made by quarter-wavelength stacked dielectric or electro-optic layers. A top clad 126 can fill in the volume over and behind the mirror 2906 as well as form a top clad 126 configured to guide light along the horizontal waveguide 2908.

FIG. 30 is a sectional view of another optical stack structure 3001 including a coupling between a horizontal waveguide 2908 and a z-axis launch to or from a top-mounted component 3002, according to an embodiment. For example, the top-mounted component 2002 can include an optical coupler, an optical detector, or a laser light source. Alternatively, the top-mounted component 2002 can represent a corresponding location on a second, inverted integrated circuit and optical stack, which can either be in contact with the surface of the optical stack shown, or can be located a longer distance away with free-space propagation between the two, non-contacting optical stacks. Similarly, the top-mounted component can represent an optical coupler located a distance away, for example on an integrated circuit package, a multi-chip module, or a printed circuit board, such as for providing an optical interface to an integrated circuit that is mounted via a ball grid array (BGA) or other "flip-chip" technology.

The descriptions and figures presented herein are necessarily simplified to foster ease of understanding. While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. An integrated circuit configured for optical communication, comprising:
   an integrated circuit including at least one conductor layer; and
   an optical polymer stack disposed on the integrated circuit and the at least one conductor layer, the optical polymer stack including at least one electro-optic core;
   wherein the integrated circuit includes circuitry configured to modulate data onto at least one optical wavelength operatively coupled to the at least one electro-optic core; and
   wherein the electro-optic core includes a poled electro-optic polymer comprising:
   a host polymer including at least one aryl group; and
   a poled chromophore including two or more aryl substituents configured to interact with the at least one aryl group of the host polymer to hinder rotation of the chromophore after poling.

2. An integrated circuit configured for optical communication, comprising:
   an integrated circuit including at least one conductor layer; and
   an optical polymer stack disposed on the integrated circuit and the at least one conductor layer, the optical polymer stack including at least one electro-optic core;
   wherein the integrated circuit includes circuitry configured to modulate data onto at least one optical wavelength operatively coupled to the at least one electro-optic core; and
   wherein the electro-optic core includes a poled electro-optic polymer comprising:
   a host polymer including at least one aryl group; and
   a poled chromophore including two or more aryl substituents configured to interact with the at least one aryl group of the host polymer to hinder rotation of the chromophore after poling,
   wherein the poled chromophore includes a structure D-π-A in electronic conjugation;
   wherein the two or more aryl substituents include three aryl groups covalently bound to a substituent center; and
   wherein:
   D is an electron donor group;
   π is a pi-orbital electron conjugated bridge; and
   A is an electron acceptor group configured to receive electron density from D via π.

3. The integrated circuit configured for optical communication of claim 1, wherein each of the two or more aryl substituents include the structure:

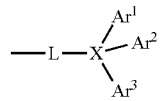

wherein: X is the substituent center; $Ar^1$, $Ar^2$ and $Ar^3$ are the aryl groups;
L is a covalent linker attached to D, p, or A;
X is C, Si, N, Sn, S, S(O), SO2, P(O), aromatic ring, or P;
$Ar^1$, $Ar^2$ and $Ar^3$ each independently include a substituted or un-substituted phenyl ring, a substituted or un-substituted benzyl ring, a substituted or un-substituted naphthyl ring, a substituted or un-substituted biphenyl group, a substituted or un-substituted pyridyl ring, a substituted or un-substituted bipyridyl group, a substituted or un-substituted thiophene ring, a substituted or un-substituted benzothiophenene ring, a substituted or un-substituted imidazole ring, a substituted or un-substituted thiozale ring, substituted or un-substituted thienothiophene group, substituted or un-substituted a substituted or un-substituted quinoline group, or a substituted or un-substituted anthracenyl group; and
L includes the structure:

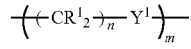

wherein: $R^1$ is independently at each occurrence an H, an alkyl group, or a halogen;
$Y^1$ is —$C(R^1)_2$—, O, S, —$N(R^1)$—, —$N(R^1)C(O)$—, —$C(O)_2$—, —$C_6H_6$—, or —$OC_6H_6$—, or thiophenyl;
n is 0-6; and
m is 1-3.

4. The integrated circuit configured for optical communication of claim 1, wherein the conductor layer includes a first electrode; and
   wherein the electro-optic polymer stack includes an electro-optic polymer layer disposed over the first electrode; and wherein the semiconductor integrated circuit is configured to drive the first electrode with a voltage signal selected to drive the electro-optic polymer layer.

5. The integrated circuit configured for optical communication of claim 4, wherein the electro-optic polymer layer includes the electro-optic core.

6. The integrated circuit configured for optical communication of claim 4, wherein the first electrode is driven with a toggled voltage to drive the electro-optic polymer layer.

7. The integrated circuit configured for optical communication of claim 4, wherein the first electrode is driven with a ground voltage to drive the electro-optic polymer layer.

8. The integrated circuit configured for optical communication of claim 1, further comprising:
a planarization layer adjacent to the at least one conductor layer and a dielectric layer disposed between patterned conductors in the at least one conductor layer.

9. The integrated circuit configured for optical communication of claim 1, wherein the at least one conductor layer includes a first electrode;
wherein the integrated circuit includes circuitry configured to drive a traveling wave electrical pulse along the first electrode; and
wherein the electro-optic core is parallel to the first electrode and configured to receive the traveling wave electrical pulse from the first electrode.

10. The integrated circuit configured for optical communication of claim 9, wherein the traveling wave electrical pulse travels at a first propagation rate substantially corresponding to a second propagation rate of light traveling through the electro-optic core.

11. The integrated circuit configured for optical communication of claim 1, wherein the optical polymer stack includes a guiding structure including at least one selected from the group consisting of a trench waveguide, a rib waveguide, a quasi-trench waveguide, a quasi-rib waveguide, and a side clad.

12. The integrated circuit configured for optical communication of claim 1, further comprising:
a second electrode disposed on top of the optical polymer stack, the second electrode being operatively coupled to the semiconductor integrated circuit.

13. The integrated circuit configured for optical communication of claim 12, wherein the at least one conductor layer of the integrated circuit includes a first electrode;
wherein the first electrode and the second electrode are coupled to receive electrical signals from the semiconductor integrated circuit and responsively cooperate to provide an electric field across the electro-optic core.

14. The integrated circuit configured for optical communication of claim 13, wherein the semiconductor integrated circuit is configured to provide a toggled signal to the first electrode.

15. The integrated circuit configured for optical communication of claim 13, wherein the semiconductor integrated circuit is configured to provide a toggled signal to the second electrode.

16. The integrated circuit configured for optical communication of claim 13, further comprising at least a second conductor layer below the first electrode, the second conductor layer being configured to form a buried electrode operatively coupled to the first electrode.

17. The integrated circuit configured for optical communication of claim 16, wherein the buried electrode is separated from the first electrode by a dielectric layer.

18. The integrated circuit configured for optical communication of claim 17, wherein the buried electrode is electrically coupled to the first electrode by a plurality of vias through the dielectric layer.

19. The integrated circuit configured for optical communication of claim 13, wherein the integrated circuit includes a driver circuit coupled to drive the first and second electrodes.

20. The integrated circuit configured for optical communication of claim 19, wherein the integrated circuit includes a multiplexer configured to receive a plurality of input electrical signals, multiplex the plurality of input electrical signals, and output at least one multiplexed signal to the driver circuit.

21. The integrated circuit configured for optical communication of claim 19, wherein the integrated circuit includes a matching circuit coupled to receive signals from at least one of the first and second electrodes.

22. The integrated circuit configured for optical communication of claim 1, wherein the at least one conductor layer includes a first electrode and a poling coupling pad electrically coupled to the first electrode.

23. The integrated circuit configured for optical communication of claim 1, wherein the semiconductor integrated circuit includes an integrated circuit formed using at least one process selected from the group consisting of MOS, NMOS, PMOS, and CMOS.

24. The integrated circuit configured for optical communication of claim 1, wherein the integrated circuit includes a plurality of doped semiconductor devices coupled to drive at least one electrode formed in the at least one conductor layer.

25. The integrated circuit configured for optical communication of claim 1, wherein the at least one conductor layer includes a plurality of substantially planar discontinuous structures including at least one poling voltage coupling pad and at least one optical channel driving electrode that can be held at least temporarily in electrical continuity with at least one poling voltage coupling pad.

26. The integrated circuit configured for optical communication of claim 25, wherein the poling voltage coupling pad is configured to receive a first poling potential; and wherein
the top of the optical polymer stack is configured to receive a second poling potential.

27. The integrated circuit configured for optical communication of claim 1, wherein:
the at least one electro-optic core forms a portion of an electro-optic device;
and wherein the integrated circuit further comprises:
a feedback circuit configured to receive a second light signal and responsively control modulation of a first light signal by the electro-optic device.

28. The integrated circuit configured for optical communication of claim 27, wherein the electro-optic device is configured to modulate the first light signal to produce the second light signal.

29. The integrated circuit configured for optical communication of claim 1, further comprising:
an optical detector included in or operatively coupled to the integrated circuit and configured to receive input optical data from one or more external sources; and
wherein the at least one electro-optic core forms a portion of an electro-optic device configured to be driven by the integrated circuit to output optical data to one or more external destinations.

30. The integrated circuit configured for optical communication of claim 29, wherein the optical detector is a portion of the integrated circuit.

31. The integrated circuit configured for optical communication of claim 29, wherein the optical detector is mounted on top of the optical polymer stack.

32. The integrated circuit configured for optical communication of claim 29, wherein the optical polymer stack further comprises:
one or more passive waveguides configured to convey the input optical data to the optical detector.

33. The integrated circuit configured for optical communication of claim 1, wherein the at least one electro-optic core is a portion of an optical phase modulator.

34. The integrated circuit configured for optical communication of claim 1, wherein the at least one electro-optic core is a portion of a Mach-Zehnder modulator.

35. The integrated circuit configured for optical communication of claim 1, wherein the at least one electro-optic core is a portion of a micro-ring modulator.

36. The integrated circuit configured for optical communication of claim 1, further comprising:
an optical detector configured to receive a modulated optical signal and convert the optical signal to a first electrical signal; and
a circuit module operatively coupled to the optical detector and the circuitry configured to modulate data onto at least one optical wavelength, the circuit module formed as a portion of the integrated circuit configured to receive first data corresponding to the first electrical signal and responsively output second data to the circuitry configured to modulate data onto the at least one optical wavelength;
wherein the electro-optic core is formed as an electro-optic modulator configured to cooperate with the circuitry configured to modulate data onto at least one optical wavelength and configured to output a modulated light signal corresponding to the second data on the at least one optical wavelength.

37. The integrated circuit configured for optical communication of claim 1, wherein the integrated circuit further comprises:
a semiconductor substrate;
a pattern of doped wells on the surface of the semiconductor substrate; and
a plurality of patterned conductor layers and patterned dielectric layers disposed over the surface of the semiconductor substrate and forming a circuit layer;
wherein the optical polymer stack further comprises:
an optical polymer forming a planarization layer disposed over the circuit layer.

38. The integrated circuit configured for optical communication of claim 1, wherein the electro-optic core has a variable optical propagation velocity of light passed therethrough;
wherein the optical polymer stack includes a velocity-matching layer disposed over the electro-optic core;
further comprising:
a high-speed electrode disposed over the velocity-matching layer operatively coupled to the integrated circuit, the high-speed electrode having an electrical propagation velocity of electrical pulses passed therethrough;
wherein the velocity-matching layer is configured cause the electrical propagation velocity through the high speed electrode to approximate the optical propagation velocity through the electro-optic core.

39. The integrated circuit configured for optical communication of claim 1, wherein the electro-optic core includes one or more polar species; and
wherein the optical polymer stack includes one or more upper polymer layers disposed over the electro-optic core;
wherein the one or more upper polymer layers includes at least one relatively non-polar polymer configured to substantially prevent water vapor from migrating through the one or more upper polymer layers to the electro-optic core.

40. The integrated circuit configured for optical communication of claim 1, wherein the integrated circuit has a substrate coefficient of thermal expansion; and
wherein the optical polymer stack further comprises:
a first polymer layer having a first coefficient of thermal expansion disposed over the integrated circuit; and
a second polymer layer having a second coefficient of thermal expansion, disposed over the first polymer layer;
wherein the first coefficient of thermal expansion has a value between the substrate coefficient of thermal expansion and the second coefficient of thermal expansion.

41. The integrated circuit configured for optical communication of claim 40, wherein the first polymer layer is a bottom clad and the second polymer layer is the electro-optic core.

* * * * *

UNITED STATES PATENT AND TRADEMARK OFFICE
CERTIFICATE OF CORRECTION

PATENT NO.         : 8,934,741 B2  
APPLICATION NO.    : 12/963479  
DATED              : January 13, 2015  
INVENTOR(S)        : Baoquan Chen et al.

Page 1 of 1

It is certified that error appears in the above-identified patent and that said Letters Patent is hereby corrected as shown below:

In the Claims

- In Claim 3, Column 54, Line 47-48 of the patent, "..substituted or un-substituted a substituted or un-substituted quinoline group,..." should read --a substituted or un-substituted quinoline group--.

Signed and Sealed this  
Twenty-eighth Day of April, 2015

Michelle K. Lee  
*Director of the United States Patent and Trademark Office*